US012720461B2

(12) United States Patent
Tiwari et al.

(10) Patent No.: US 12,720,461 B2
(45) Date of Patent: Aug. 25, 2026

(54) METHOD OF ACCESS AND MOBILITY MANAGEMENT FUNCTION (AMF), METHOD OF USER EQUIPMENT (UE), AMF AND UE

(71) Applicant: NEC Corporation, Tokyo (JP)

(72) Inventors: Kundan Tiwari, Tokyo (JP); Toshiyuki Tamura, Tokyo (JP); Iskren Ianev, Tokyo (JP)

(73) Assignee: NEC CORPORATION, Tokyo (JP)

( * ) Notice: Subject to any disclaimer, the term of this patent is extended or adjusted under 35 U.S.C. 154(b) by 298 days.

(21) Appl. No.: 18/579,900

(22) PCT Filed: Jul. 19, 2022

(86) PCT No.: PCT/JP2022/028087
§ 371 (c)(1),
(2) Date: Jan. 17, 2024

(87) PCT Pub. No.: WO2023/002991
PCT Pub. Date: Jan. 26, 2023

(65) Prior Publication Data

US 2024/0259982 A1 Aug. 1, 2024

(30) Foreign Application Priority Data

Jul. 22, 2021 (IN) ............................ 202111032979

(51) Int. Cl.
*H04W 60/06* (2009.01)
*H04W 48/18* (2009.01)

(52) U.S. Cl.
CPC .......... *H04W 60/06* (2013.01); *H04W 48/18* (2013.01)

(58) Field of Classification Search
CPC ..... H04W 60/06; H04W 48/18; H04W 28/02; H04W 88/14
See application file for complete search history.

(56) References Cited

U.S. PATENT DOCUMENTS 11,202,330 B2 * 12/2021 Park ...................... H04W 12/06
2021/0306972 A1 * 9/2021 Watfa .................... H04W 12/61
(Continued)

OTHER PUBLICATIONS

International Search Report for PCT Application No. PCT/JP2022/028087, mailed on Sep. 20, 2022.
(Continued)

*Primary Examiner* — Kabir A Timory
(74) *Attorney, Agent, or Firm* — Sughrue Mion, PLLC

(57) ABSTRACT

An Access and Mobility Management Function (AMF) device for communicating with a User equipment (UE) and a Network Slice Admission Control Function (NSACF) device includes a receiver and a transmitter. The receiver is configured to receive, from the UE, a Registration Request message including first information indicating whether the UE supports a first function and requested Network Slice Selection Assistance Information (NSSAI). The transmitter is configured to transmit, to the UE, a Non-Access Stratum (NAS) message including a rejected NSSAI including a first cause value and a back-off timer value if the UE supports the first function. The transmitter is configured to transmit, to the UE, the NAS message including a rejected NSSAI including a second cause value if the UE does not support the first function.

8 Claims, 21 Drawing Sheets

(56) References Cited

U.S. PATENT DOCUMENTS

2024/0236912 A1* 7/2024 Velev .................... H04W 60/04
2024/0259979 A1* 8/2024 Merino Vazquez .. H04W 48/18

OTHER PUBLICATIONS

Written opinion for PCT Application No. PCT/JP2022/028087, mailed on Sep. 20, 2022.
3GPP TR 21.905: "Vocabulary for 3GPP Specifications". V17.0.0 (Jul. 2020).
3GPP TS 23.501: "System architecture for the 5G System (5GS)". V17.1.1 (Jun. 2021).
3GPP TS 23.502: "Procedures for the 5G System (5GS)". V17.1.0 (Jun. 2021).
3GPP TS 23.503: "Policy and charging control framework for the 5G System (5GS); Stage 2". V17.1.0 (Jun. 2021).
3GPP TS 23.288: "Architecture enhancements for 5G System (5GS) to support network data analytics services". V17.1.0 (Jun. 2021).
3GPP TS 24.501: "Non-Access-Stratum (NAS) protocol for 5G System (5GS); Stage 3". V17.3.1 (Jun. 2021).
3GPP TS 33.501: "Security architecture and procedures for 5G system". V17.2.1 (Jun. 2021).
3GPP TS 38.413: "NG-RAN; NG Application Protocol (Ngap)". V16.6.0 (Jul. 2021).
GSM Association Official Document NG.116: "Generic Network Slice Template". Version 2.0, Oct. 16, 2019.
3GPP TR 23.700-40: Study on enhancement of network.
3GPP TSG-CT WG1 Meeting #130-e C1-213693.
3GPP TSG-SA WG2 Meeting #145-E S2-2104897.
Extended European Search Report for EP Application No. 22845924.4, dated on Oct. 24, 2024.
3GPP TS 23.502 V17.0.0 (Mar. 2021), 3rd Generation Partnership Project; Technical Specification Group Services and System Aspects; Procedures for the 5G System (5GS); Stage 2 (Release 17), pp. 1-pp. 646.
Ericsson et al., "TS23.502 KI#1 Network Slice Admission Control Function (NSACF)—Result Update", 3GPP TSG-SA WG2 Meeting #145E e-meeting S2-2103805, May 17-28, 2021, pp. 1-pp. 5.
Ericsson et al., "TS23.502 KI#1 Network Slice Admission Control Function (NSACF)—Result Update", 3GPP TSG-SA WG2 Meeting #144E e-meeting S2-2102209, Apr. 12-16, 2021, pp. 1-pp. 5.
Samsung, "KI##1 Update to Solution & Removal of Editor-Note", 3GPP TSG-SA WG2 Meeting #145-e S2-2103827, May 17-28, 2021, pp. 1-pp. 24.

* cited by examiner

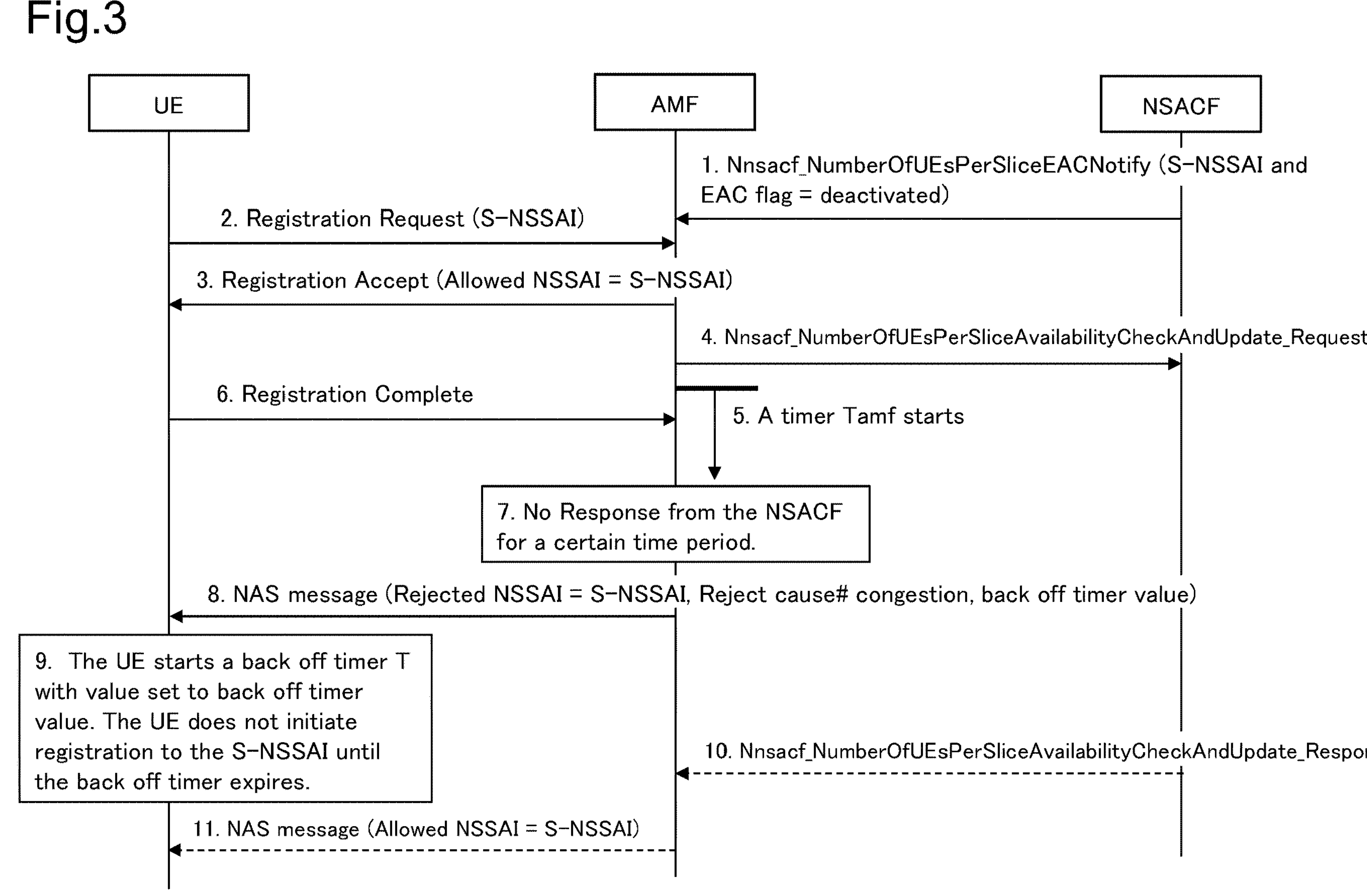
Fig.3
UE
AMF
NSACF
1. Nnsacf_NumberOfUEsPerSliceEACNotify (S-NSSAI and EAC flag = deactivated)
2. Registration Request (S-NSSAI)
3. Registration Accept (Allowed NSSAI = S-NSSAI)
4. Nnsacf_NumberOfUEsPerSliceAvailabilityCheckAndUpdate_Request
5. A timer Tamf starts
6. Registration Complete
7. No Response from the NSACF for a certain time period.
8. NAS message (Rejected NSSAI = S-NSSAI, Reject cause# congestion, back off timer value)
9. The UE starts a back off timer T with value set to back off timer value. The UE does not initiate registration to the S-NSSAI until the back off timer expires.
10. Nnsacf_NumberOfUEsPerSliceAvailabilityCheckAndUpdate_Response
11. NAS message (Allowed NSSAI = S-NSSAI)

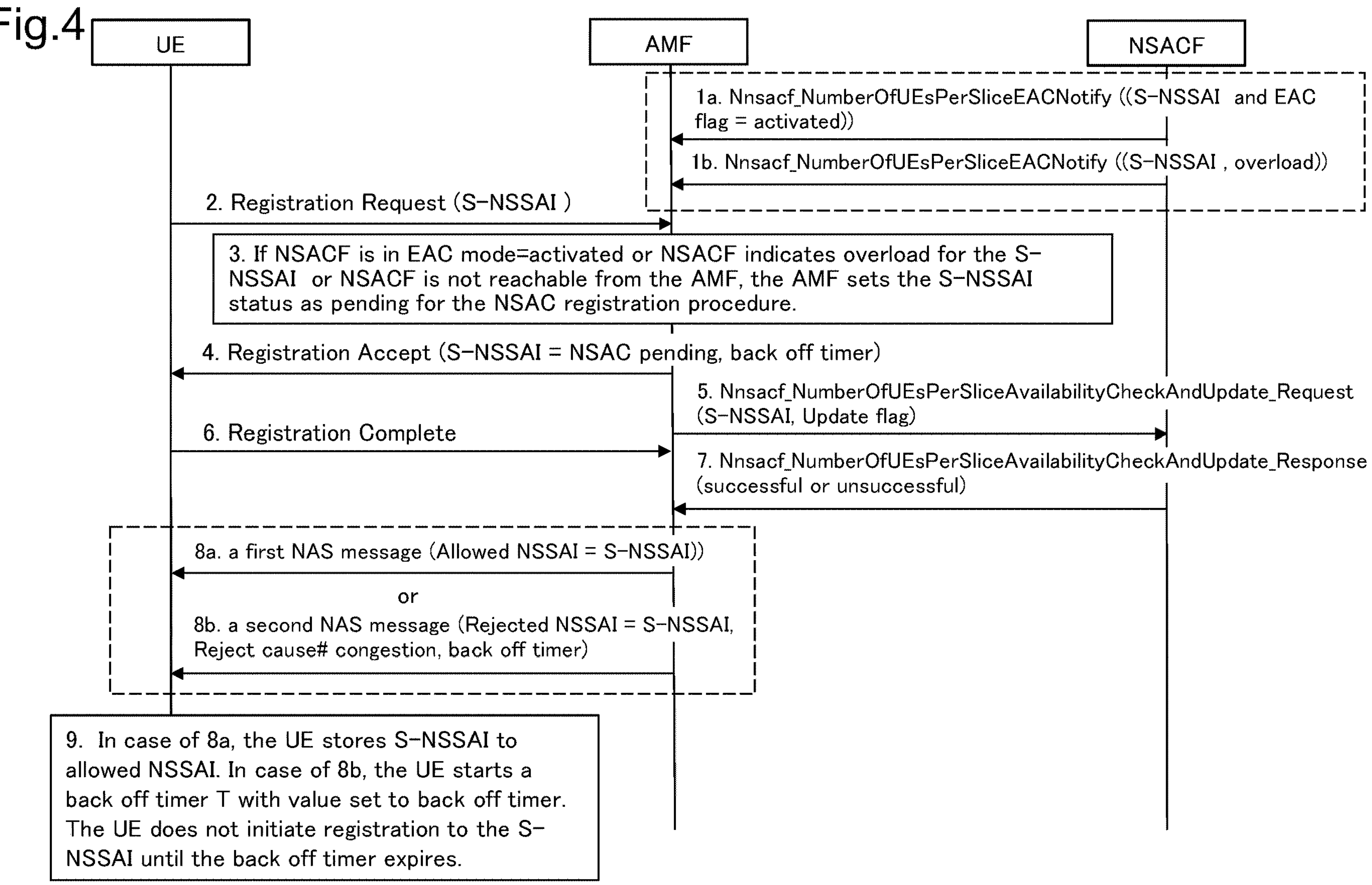
Fig.4
UE
AMF
NSACF
1a. Nnsacf_NumberOfUEsPerSliceEACNotify ((S-NSSAI and EAC flag = activated))
1b. Nnsacf_NumberOfUEsPerSliceEACNotify ((S-NSSAI , overload))
2. Registration Request (S-NSSAI )
3. If NSACF is in EAC mode=activated or NSACF indicates overload for the S-NSSAI or NSACF is not reachable from the AMF, the AMF sets the S-NSSAI status as pending for the NSAC registration procedure.
4. Registration Accept (S-NSSAI = NSAC pending, back off timer)
5. Nnsacf_NumberOfUEsPerSliceAvailabilityCheckAndUpdate_Request (S-NSSAI, Update flag)
6. Registration Complete
7. Nnsacf_NumberOfUEsPerSliceAvailabilityCheckAndUpdate_Response (successful or unsuccessful)
8a. a first NAS message (Allowed NSSAI = S-NSSAI))
or
8b. a second NAS message (Rejected NSSAI = S-NSSAI, Reject cause# congestion, back off timer)
9. In case of 8a, the UE stores S-NSSAI to allowed NSSAI. In case of 8b, the UE starts a back off timer T with value set to back off timer. The UE does not initiate registration to the S-NSSAI until the back off timer expires.

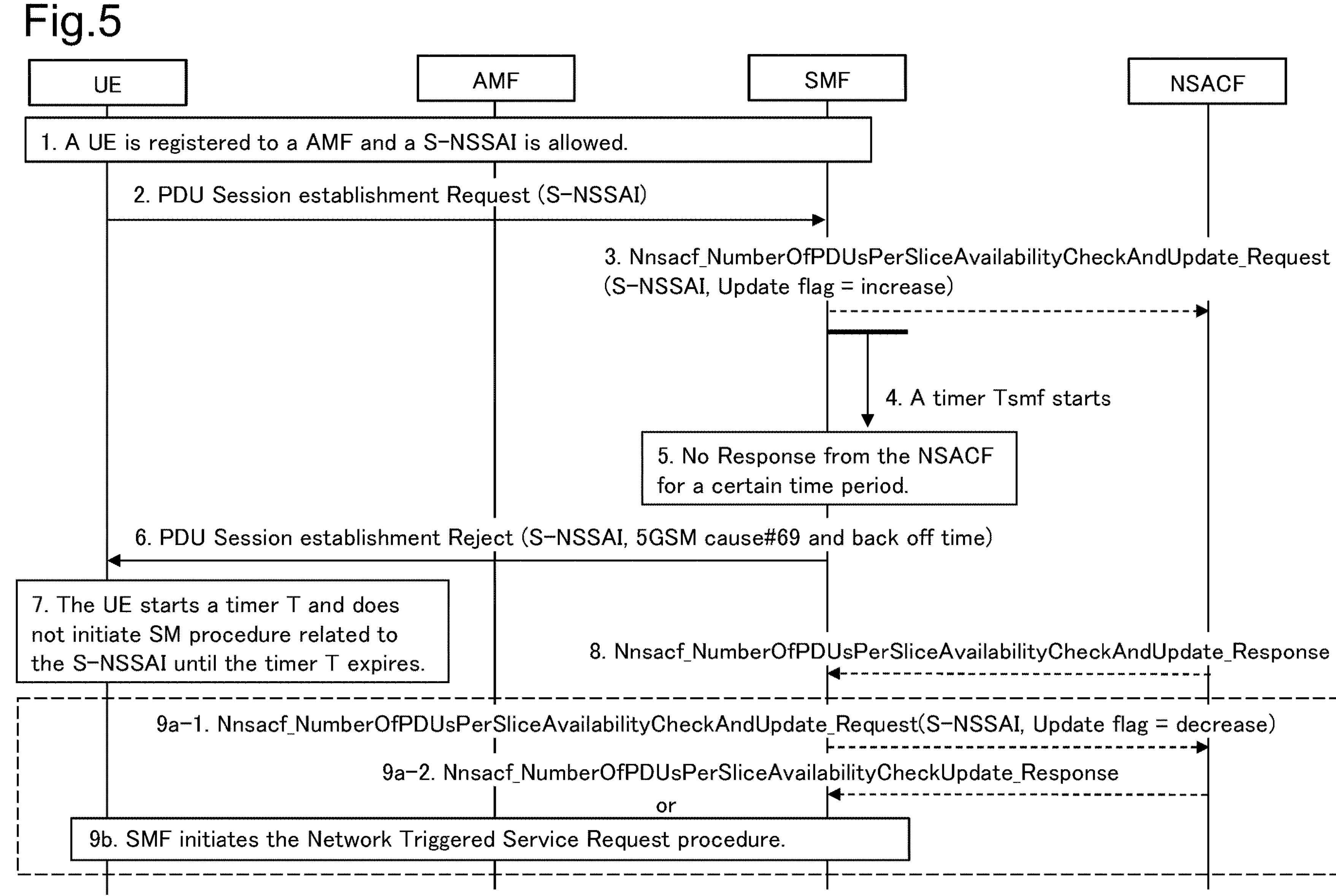
Fig.5
UE
AMF
SMF
NSACF
1. A UE is registered to a AMF and a S-NSSAI is allowed.
2. PDU Session establishment Request (S-NSSAI)
3. Nnsacf_NumberOfPDUsPerSliceAvailabilityCheckAndUpdate_Request (S-NSSAI, Update flag = increase)
4. A timer Tsmf starts
5. No Response from the NSACF for a certain time period.
6. PDU Session establishment Reject (S-NSSAI, 5GSM cause#69 and back off time)
7. The UE starts a timer T and does not initiate SM procedure related to the S-NSSAI until the timer T expires.
8. Nnsacf_NumberOfPDUsPerSliceAvailabilityCheckAndUpdate_Response
9a-1. Nnsacf_NumberOfPDUsPerSliceAvailabilityCheckAndUpdate_Request(S-NSSAI, Update flag = decrease)
9a-2. Nnsacf_NumberOfPDUsPerSliceAvailabilityCheckUpdate_Response
or
9b. SMF initiates the Network Triggered Service Request procedure.

System overview
1
3
Uu
5
(R)AN node
(e.g. ng-eNB/gNB)
Xn
other
RAN nodes
N1
N2/N3
7
core network
70
AMF
71
SMF
72
UPF
73
PCF
74
NEF
75
UDM
76
NWDAF
77
NSACF
N6
20
data network
e.g. the Internet

Figure 12:
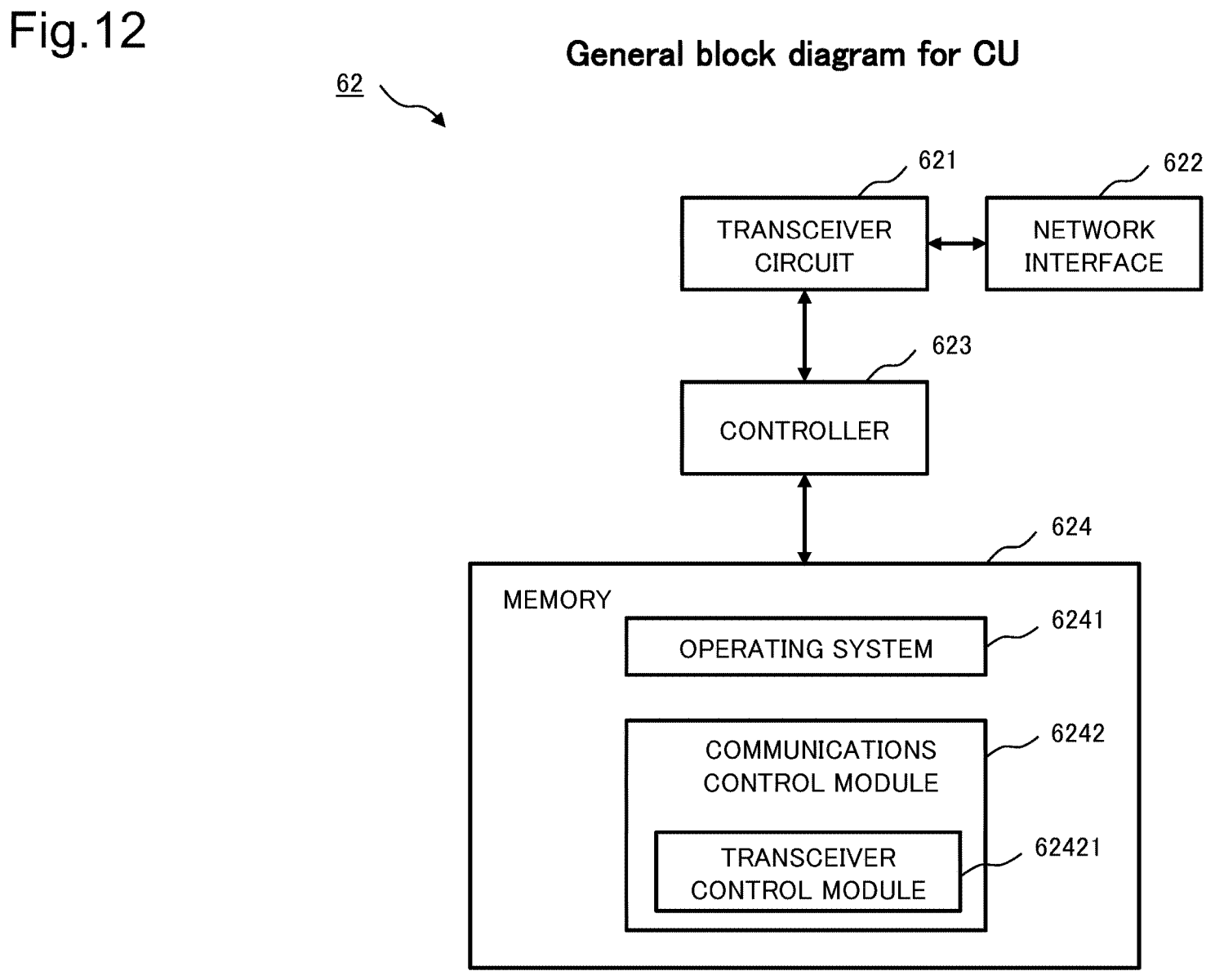

General block diagram for CU

621 TRANSCEIVER CIRCUIT

622 NETWORK INTERFACE

623 CONTROLLER

624 MEMORY

6241 OPERATING SYSTEM

6242 COMMUNICATIONS CONTROL MODULE

62421 TRANSCEIVER CONTROL MODULE

Fig.13

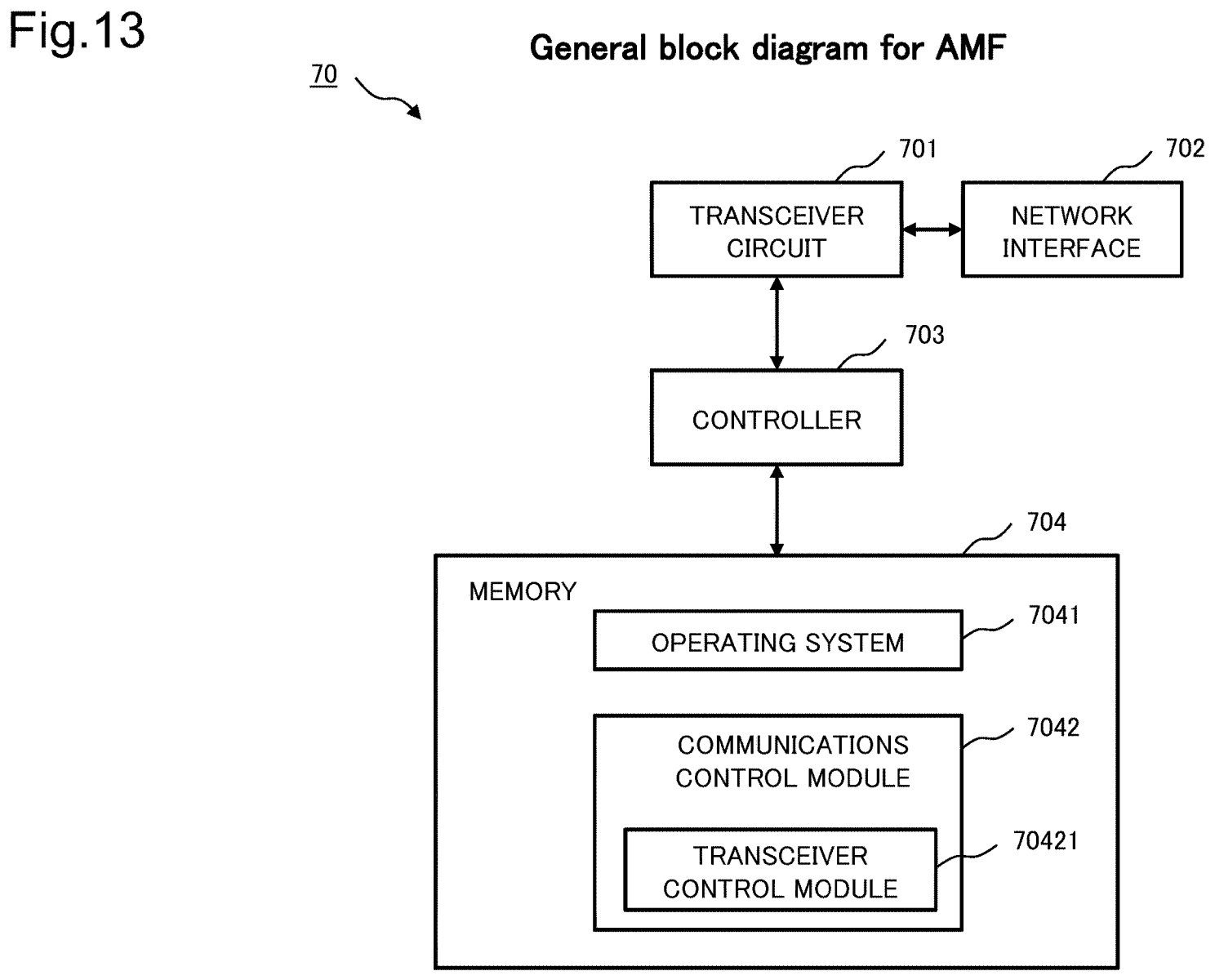

General block diagram for AMF

70

701
TRANSCEIVER CIRCUIT

702
NETWORK INTERFACE

703
CONTROLLER

704
MEMORY

7041
OPERATING SYSTEM

7042
COMMUNICATIONS CONTROL MODULE

70421
TRANSCEIVER CONTROL MODULE

Fig.14

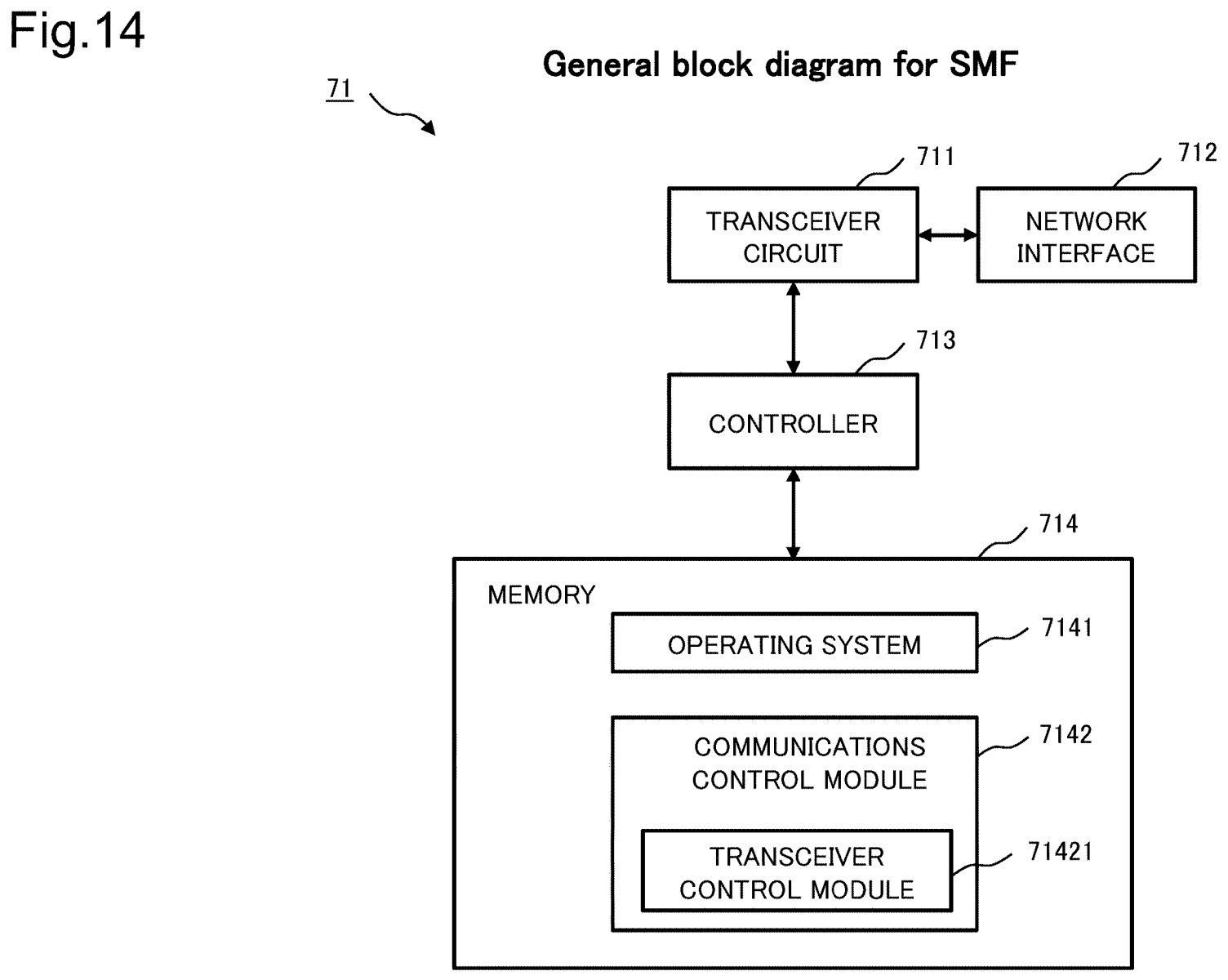

General block diagram for SMF

71

712
NETWORK INTERFACE

711
TRANSCEIVER CIRCUIT

713
CONTROLLER

714
MEMORY

7141
OPERATING SYSTEM

7142
COMMUNICATIONS CONTROL MODULE

71421
TRANSCEIVER CONTROL MODULE

Fig.15

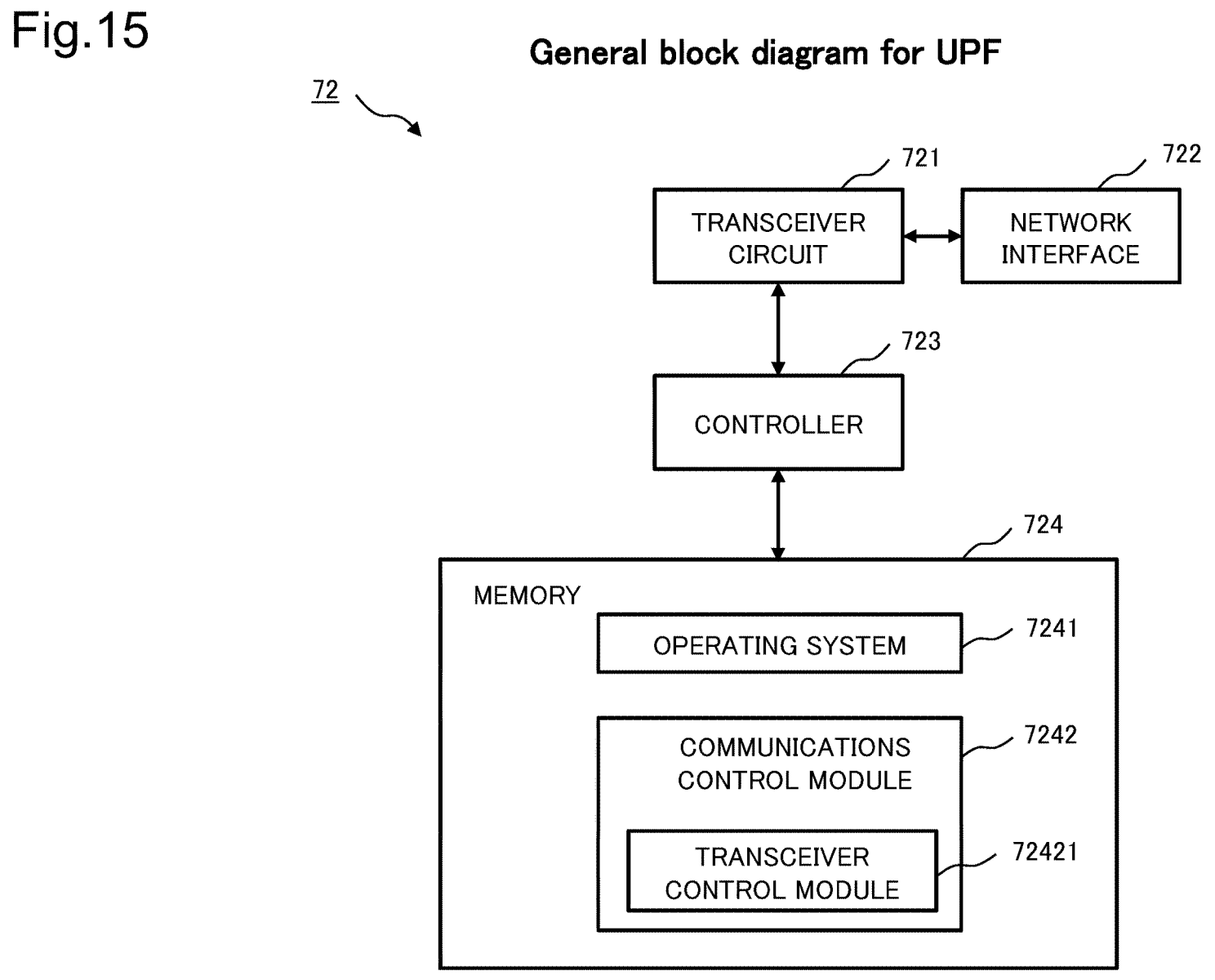

General block diagram for UPF

72

721 TRANSCEIVER CIRCUIT

722 NETWORK INTERFACE

723 CONTROLLER

724 MEMORY

7241 OPERATING SYSTEM

7242 COMMUNICATIONS CONTROL MODULE

72421 TRANSCEIVER CONTROL MODULE

METHOD OF ACCESS AND MOBILITY MANAGEMENT FUNCTION (AMF), METHOD OF USER EQUIPMENT (UE), AMF AND UE

This application is a National Stage Entry of PCT/JP2022/028087 filed on Jul. 19, 2022, which claims priority from Indian Patent Application number 202111032979 filed on Jul. 22, 2021, the contents of all of which are incorporated herein by reference, in their entirety.

TECHNICAL FIELD

This present disclosure relates to an Access and Mobility Management Function (AMF) device, a User equipment (UE), a method of an AMF device and a method of a UE.

BACKGROUND ART

Network slicing feature was defined in the 3GPP release 15 and release 16 normative specifications. GSMA 5GJA has introduced in NPL 9 the concept of Generic network Slice Template (GST) from which several Network Slice Types descriptions can be derived. Some of these parameters in the GST point explicitly to the definition of parameters and bounds on the service delivered to the end customer. For instance, the GST aims at the limitation of the number of PDU sessions/PDN connections per network slice, or the number of devices supported per network slice, or the maximum UL or DL data rate per network slice. NPL 10 identified and addressed the gaps that needed to be filled in providing support for the GST parameters enforcement and the suitable solutions to address these gaps.

CITATION LIST

Non Patent Literature

[NPL 1] 3GPP TR 21.905: "Vocabulary for 3GPP Specifications". V17.0.0 (2020-07)

[NPL 2] 3GPP TS 23.501: "System architecture for the 5G System (5GS)". V17.1.1 (2021-06)

[NPL 3] 3GPP TS 23.502: "Procedures for the 5G System (5GS)". V17.1.0 (2021-06)

[NPL 4] 3GPP TS 23.503: "Policy and charging control framework for the 5G System (5GS); Stage 2". V17.1.0 (2021-06)

[NPL 5] 3GPP TS 23.288: "Architecture enhancements for 5G System (5GS) to support network data analytics services". V17.1.0 (2021-06)

[NPL 6] 3GPP TS 24.501: "Non-Access-Stratum (NAS) protocol for 5G System (5GS); Stage 3". V17.3.1 (2021-06)

[NPL 7] 3GPP TS 33.501: "Security architecture and procedures for 5G system". V17.2.1 (2021-06)

[NPL 8] 3GPP TS 38.413: "NG-RAN; NG Application Protocol (NGAP)". V16.6.0 (2021-07)

[NPL 9] GSM Association Official Document NG.116: "Generic Network Slice Template". Version 2.0, 16 Oct. 2019

[NPL 10] 3GPP TR 23.700-40: "Study on enhancement of network slicing; Phase 2". V17.0.0 (2021-03)

SUMMARY OF INVENTION

Technical Problem

The Network Slice Admission Control (NSAC) procedure is defined in 5GS to manage the number of UEs registered to a network slice and also the number of PDU sessions established on the network slice. This procedure also defines a procedure to manage a scenario when a network receives a request from a UE to register for the network slice and the number of the UEs registered to the network slice meets or exceeds the quota of total number of the UEs that can be registered with the network slice at one point of time. Similar procedure is also defined for the scenario when the network receives a request from the UE to establish a PDU session on the network slice and the total number of the PDU sessions established on the network slice meets or exceeds the quota of total number of the PDU sessions that can be established on the network slice at one point of time.

However, there are still outstanding issues related to some situations in the 3GPP nodes or some situations in the connection between 3GPP nodes during the NSAC procedure.

For example, the 3GPP standard for the NSAC procedure has some ambiguous descriptions for some situations.

For example, it is unclear how an AMF is supposed to treat a UE during the Registration procedure if a Network Slice Admission Control Function (NSACF) does not respond to a request from the AMF.

For example, it is unclear how an SMF is supposed to treat a PDU session during the PDU session establishment procedure if a Network Slice Admission Control Function (NSACF) does not respond to a request from the SMF.

Solution to Problem

In an aspect of the present disclosure, an Access and Mobility Management Function (AMF) device for communicating with a User equipment (UE) and a Network Slice Admission Control Function (NSACF) device includes a receiver and a transmitter. The receiver is configured to receive, from the UE, a Registration Request message including first information indicating whether the UE supports a first function and requested Network Slice Selection Assistance Information (NSSAI). The transmitter is configured to transmit, to the UE, a Non-Access Stratum (NAS) message including a rejected NSSAI including a first cause value and a back-off timer value if the UE supports the first function. The transmitter is configured to transmit, to the UE, the NAS message including a rejected NSSAI including a second cause value if the UE does not support the first function.

In an aspect of the present disclosure, a User equipment (UE) for communicating with an Access and Mobility Management Function (AMF) device communicating with a Network Slice Admission Control Function (NSACF) device includes a receiver and a transmitter. The transmitter is configured to transmit, to the AMF device, a Registration Request message including first information indicating whether the UE supports a first function and requested Network Slice Selection Assistance Information (NSSAI). The receiver is configured to receive, from the AMF device, a Non-Access Stratum (NAS) message including a rejected NSSAI including a first cause value and a back-off timer value if the UE supports the first function. The receiver is configured to receive, from the AMF device, the NAS message including a rejected NSSAI including a second cause value if the UE does not support the first function.

In an aspect of the present disclosure, a method of an Access and Mobility Management Function (AMF) device for communicating with a User equipment (UE) and a Network Slice Admission Control Function (NSACF) device includes receiving, from the UE, a Registration Request message including first information indicating whether the UE supports a first function and requested Network Slice Selection Assistance Information (NSSAI). The method includes transmitting, to the UE, a Non-Access Stratum (NAS) message including a rejected NSSAI including a first cause value and a back-off timer value if the UE supports the first function. The method includes transmitting, to the UE, the NAS message including a rejected NSSAI including a second cause value if the UE does not support the first function.

In an aspect of the present disclosure, a method of a User equipment (UE) for communicating with an Access and Mobility Management Function (AMF) device communicating with a Network Slice Admission Control Function (NSACF) device includes transmitting, to the AMF device, a Registration Request message including first information indicating whether the UE supports a first function and requested Network Slice Selection Assistance Information (NSSAI). The method includes receiving, from the AMF device, a Non-Access Stratum (NAS) message including a rejected NSSAI including a first cause value and a back-off timer value if the UE supports the first function. The method includes receiving, from the AMF device, the NAS message including a rejected NSSAI including a second cause value if the UE does not support the first function.

BRIEF DESCRIPTION OF DRAWINGS

FIG. 3 illustrates Registration procedure of a UE for a S-NSSAI which is subject to NSAC.

FIG. 4 illustrates Registration procedure for S-NSSAI which is subject to NSAC.

FIG. 5 illustrates PDU session establishment procedure with Network Slice Admission Control.

FIG. 12 is a block diagram for a Centralized Unit (CU).

FIG. 13 is a block diagram for an AMF.

FIG. 14 is a block diagram for an SMF.

FIG. 15 is a block diagram for a UPF.

DESCRIPTION OF EMBODIMENTS

Abbreviations

Figure 1:
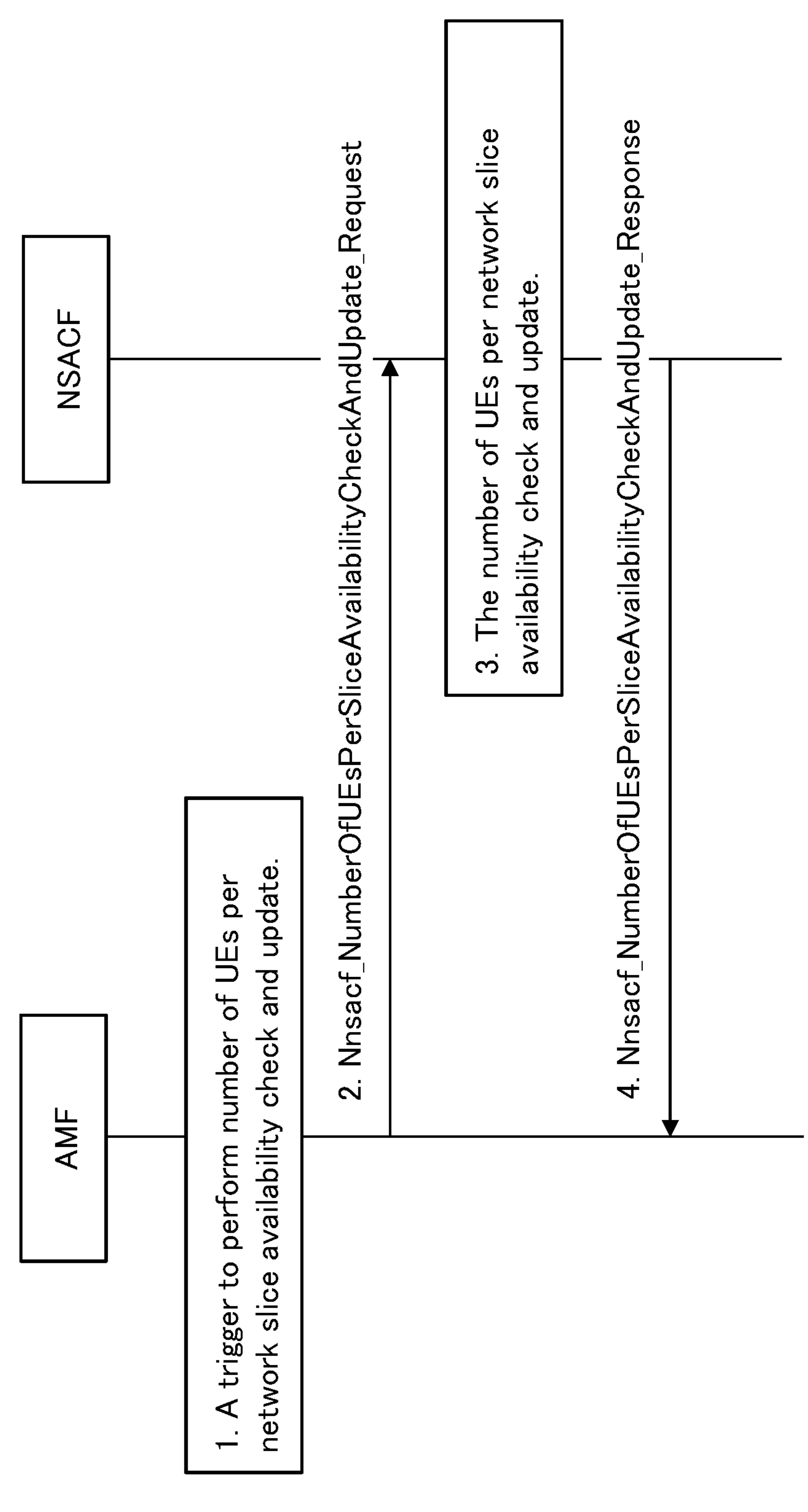
FIG. 1 illustrates an example of successful Network Slice Admission Control procedure.

For the purposes of the present document, the abbreviations given in NPL 1 and the following apply. An abbreviation defined in the present document takes precedence over the definition of the same abbreviation, if any, in NPL 1.

4G-GUTI 4G Globally Unique Temporary UE Identity
5GC 5G Core Network

5GLAN 5G Local Area Network
5GS 5G System
5G-AN 5G Access Network
5G-AN PDB 5G Access Network Packet Delay Budget
5G-EIR 5G-Equipment Identity Register
5G-GUTI 5G Globally Unique Temporary Identifier
5G-BRG 5G Broadband Residential Gateway
5G-CRG 5G Cable Residential Gateway
5G GM 5G Grand Master
5G-RG 5G Residential Gateway
5G-S-TMSI 5G S-Temporary Mobile Subscription Identifier
5G VN 5G Virtual Network
5QI 5G QOS Identifier
ABBA Anti-Bidding-down Between Architectures
AF Application Function
AMF Access and Mobility Management Function
API Application Programming Interface
AS Access Stratum
ATSSS Access Traffic Steering, Switching, Splitting
ATSSS-LL ATSSS Low-Layer
AUSF Authentication Server Function
AUTN Authentication token
BBF Broadband Forum
BMCABest Master Clock Algorithm
BSF Binding Support Function
CAG Closed Access Group
CAPIF Common API Framework for 3GPP northbound APIs
CHF Charging Function
CN PDB Core Network Packet Delay Budget
CP Control Plane
CU Centralized Unit
DAPS Dual Active Protocol Stacks
DL Downlink
DN Data Network
DNAI DN Access Identifier
DNN Data Network Name
DRX Discontinuous Reception
DS-TT Device-side TSN translator
DU Distributed Unit
ePDG evolved Packet Data Gateway
EAP Extensible Authentication Protocol
EBI EPS Bearer Identity
EPS Evolved Packet System
EUI Extended Unique Identifier
FAR Forwarding Action Rule
FN-BRG Fixed Network Broadband RG
FN-CRG Fixed Network Cable RG
FN-RG Fixed Network RG
FQDN Fully Qualified Domain Name
GFBR Guaranteed Flow Bit Rate
GMLCGateway Mobile Location Centre
GPSI Generic Public Subscription Identifier
GUAMI Globally Unique AMF Identifier
GUTI Globally Unique Temporary UE Identity
HR Home Routed (roaming)
IAB Integrated access and backhaul
IMEI International Mobile Equipment Identity
IMEI/TAC IMEI Type Allocation Code
IMS IP Multimedia Subsystem
IOWN Innovative Optical and Wireless Network
IPUPS Inter PLMN UP Security
I-SMF Intermediate SMF
I-UPF Intermediate UPF
LADN Local Area Data Network
LBO Local Break Out (roaming)

LMF Location Management Function
LoA Level of Automation
LPP LTE Positioning Protocol
LRF Location Retrieval Function
LTE Long Term Evolution
MAC Medium Access Control
MCC Mobile country code
MCX Mission Critical Service
MDBV Maximum Data Burst Volume
MFBR Maximum Flow Bit Rate
MICO Mobile Initiated Connection Only
MNC Mobile Network Code
MO Mobile Originated
MPS Multimedia Priority Service
MPTCP Multi-Path TCP Protocol
MT Mobile Terminated
MT Mobile Termination
N3IWF Non-3GPP Inter Working Function
N5CW Non-5G-Capable over WLAN
NAI Network Access Identifier
NAS Non-Access Stratum
NEF Network Exposure Function
NF Network Function
NGAP Next Generation Application Protocol
ngKSI Next Generation Key Set Identifier
NID Network identifier
NPN Non-Public Network
NR New Radio
NRF Network Repository Function
NSI ID Network Slice Instance Identifier
NSSAA Network Slice-Specific Authentication and Authorization
NSSAAF Network Slice-Specific Authentication and Authorization Function
NSSAI Network Slice Selection Assistance Information
NSSF Network Slice Selection Function
NSSP Network Slice Selection Policy
NW-TT Network-side TSN translator
NWDAF Network Data Analytics Function
O-RAN Open RAN Alliance
O-DU O-RAN Distributed Unit
O-CU O-RAN Centralized Unit
O-RU O-RAN Radio Unit
PCF Policy Control Function
PDB Packet Delay Budget
PDCP Packet Data Convergence Protocol
PDR Packet Detection Rule
PDU Protocol Data Unit
PEI Permanent Equipment Identifier
PER Packet Error Rate
PFD Packet Flow Description
PLMN Public Land Mobile Network
PNI-NPN Public Network Integrated Non-Public Network
PPD Paging Policy Differentiation
PPF Paging Proceed Flag
PPI Paging Policy Indicator
PSA PDU Session Anchor
PTP Precision Time Protocol
QFI QoS Flow Identifier
QoE Quality of Experience
QOS Quality of Service
RACS Radio Capabilities Signalling optimisation
(R)AN(Radio) Access Network
RG Residential Gateway
RU Radio Unit
RIM Remote Interference Management
RLC Radio Link Control
RQA Reflective QoS Attribute
RQI Reflective QoS Indication
RRC Radio Resource Control
RSN Redundancy Sequence Number
SA NR Standalone New Radio
SBA Service Based Architecture
SBI Service Based Interface
SCP Service Communication Proxy
SD Slice Differentiator
SDAP Service Data Adaptation Protocol
SEAF Security Anchor Functionality
SEPP Security Edge Protection Proxy
SMF Session Management Function
SMS Short Message Service
SMSF Short Message Service Function
SN Sequence Number
SN name Serving Network Name.
SNPN Stand-alone Non-Public Network
S-NSSAI Single Network Slice Selection Assistance Information
SOR Steering Of Roaming
SSC Session and Service Continuity
SSCMSP Session and Service Continuity Mode Selection Policy
SST Slice/Service Type
SUCI Subscription Concealed Identifier
SUPI Subscription Permanent Identifier
SV Software Version
TAI Tracking Area Identity
TCP Transmission Control Protocol
TNAN Trusted Non-3GPP Access Network
TNAP Trusted Non-3GPP Access Point
TNGF Trusted Non-3GPP Gateway Function
TNL Transport Network Layer
TNLA Transport Network Layer Association
TSC Time Sensitive Communication
TSCAI TSC Assistance Information
TSN Time Sensitive Networking
TSN GM TSN Grand Master
TSP Traffic Steering Policy
TT TSN Translator
TWIF Trusted WLAN Interworking Function
UCMFUE radio Capability Management Function
UDM Unified Data Management
UDR Unified Data Repository
UDSF Unstructured Data Storage Function
UE User Equipment
UL Uplink
UL CL Uplink Classifier
UP User Plane
UPF User Plane Function
URLLC Ultra Reliable Low Latency Communication
URRP-AMF UE Reachability Request Parameter for AMF
URSP UE Route Selection Policy
UU Interface between User Equipment and Radio Access Network
VID VLAN Identifier
VLAN Virtual Local Area Network
W-5GAN Wireline 5G Access Network
W-5GBAN Wireline BBF Access Network W-5GCAN Wireline 5G Cable Access Network
W-AGF Wireline Access Gateway Function
WLAN Wireless Local Area Network
WUS Wake Up Signal Definitions For the purposes of the present document, the terms and definitions given in NPL 1 and the following apply. A term defined in the present document takes precedence over the definition of the same term, if any, in NPL 1.

General

Those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the Aspects of the present disclosure so as not to obscure the figures with details that will be readily apparent to those skilled in the art having the benefit of the description herein.

For the purpose of promoting an understanding of the principles of the disclosure, reference will now be made to the Aspect illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms “comprises”, “comprising”, or any other variations thereof, are intended to cover a non-exclusive inclusion, such that a process or method that comprises a list of steps does not include only those steps but may include other steps not expressly listed or inherent to such a process or method. Similarly, one or more devices or entities or sub-systems or elements or structures or components preceded by “comprises . . . a” does not, without more constraints, preclude the existence of other devices, sub-systems, elements, structures, components, additional devices, additional sub-systems, additional elements, additional structures or additional components. Appearances of the phrase “in an Aspect”, “in another Aspect” and similar language throughout this specification may, but not necessarily do, all refer to the same Aspect.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms “a”, “an”, and “the” include plural references unless the context clearly dictates otherwise.

As used herein, information is associated with data and knowledge, as data is meaningful information and represents the values attributed to parameters. Further knowledge signifies understanding of an abstract or concrete concept. Note that this example system is simplified to facilitate description of the disclosed subject matter and is not intended to limit the scope of this disclosure. Other devices, systems, and configurations may be used to implement the Aspects disclosed herein in addition to, or instead of, a system, and all such Aspects are contemplated as within the scope of the present disclosure.

Each of Aspects and elements included in the each Aspects described below may be implemented independently or in combination with any other. These Aspects include novel characteristics different from one another. Accordingly, these Aspects contribute to achieving objects or solving problems different from one another and contribute to obtaining advantages different from one another.

This disclosure proposes solutions for some situations in the 3GPP nodes or some situations in the connection between the 3GPP nodes during the NSAC procedure.

The FIG. 1 illustrates an example of successful Network Slice Admission Control procedure when the AMF registers the UE to the NSACF.

1. The AMF triggers the NSAC procedure in order to register the UE with the NSACF. For example, when the AMF receives a Registration request message from the UE, the AMF performs the NSAC procedure. The AMF triggers the Number of UEs per network slice availability check and update procedure to update (i.e. increase) the number of UEs registered with a network slice when a S-NSSAI which is subject to NSAC.
2. The AMF sends, to the NSACF, an Nnsacf_NumberOfUEsPerSliceAvailabilityCheckAndUpdate_Reque st message. The AMF may include in the message the UE ID, access type, the S-NSSAI(s) to register the UE for the S-NSSAI(s), and the update flag. The UE ID may be an identity of the UE or an identifier of the UE. The access type may be 3GPP access or Non-3GPP access. The update flag may be as described in NPL 3.
3. Upon reception of the Nnsacf_NumberOfUEsPerSliceAvailabilityCheckAndUpdate_Reque st message, the NSACF registers the UE for the S-NSSAI and counts up or increases the number of the UEs registered with the S-NSSAI for quota control based on the information provided by the AMF.
4. The NSACF sends, to the AMF, an Nnsacf_NumberOfUEsPerSliceAvailabilityCheckAndUpdate_Respo nse message indicating successful NSAC for the UE.

In one example, the UDM in a supporting HPLMN may optionally keep a record of the PEIs or Type Allocation Codes values regarding UE ability to support NSAC feature. The UDM may, based on configuration or the optional PEI records, indicate the AMF that the UE supports NSAC feature. The UDM may indicate whether the UE support NSAC feature based on the PEI to an AMF in both HPLMN and VPLMN case.

First Aspect

The First aspect discloses registration procedure for S-NSSAI when the NSACF does not reply.

When the AMF sends a message to register the UE for S-NSSAI to the NSACF and does not receive a response from the NSACF during the registration procedure, then the AMF considers the S-NSSAI as not available for the registration for a certain period of time and indicates this to the UE.

This aspect discloses the AMF behavior when the AMF does not receive any response to register S-NSSAI to NSACF for the UE. There can be scenarios when the NSACF is receiving too many messages from the AMF to update UE registration for the S-NSSAI or the interface between the AMF and the NSACF is not working. In such scenarios the AMF may not receive response from the NSACF within a certain period of time or may not receive a response at all. The AMF is waiting for the response message from the NSACF in order to proceed with the registration procedure.

This aspect discloses that the AMF rejects the registration of the S-NSSAI when the AMF does not receive a response message from the NSACF within a predetermined period of time. In this case, the AMF sends a NAS message (e.g. a Registration Reject message or a Registration Accept message or a Configuration Update Command message) containing the S-NSSAI in the rejected NSSAI with a cause value indicating temporary failure. The NAS message may include a value of a back off timer. The value of the back off timer may be called as a back off timer value. When the UE receives the NAS message, the UE starts a timer T. The UE doesn't initiate another registration procedure to register for the S-NSSAI while the timer T is running.

Figure 2:
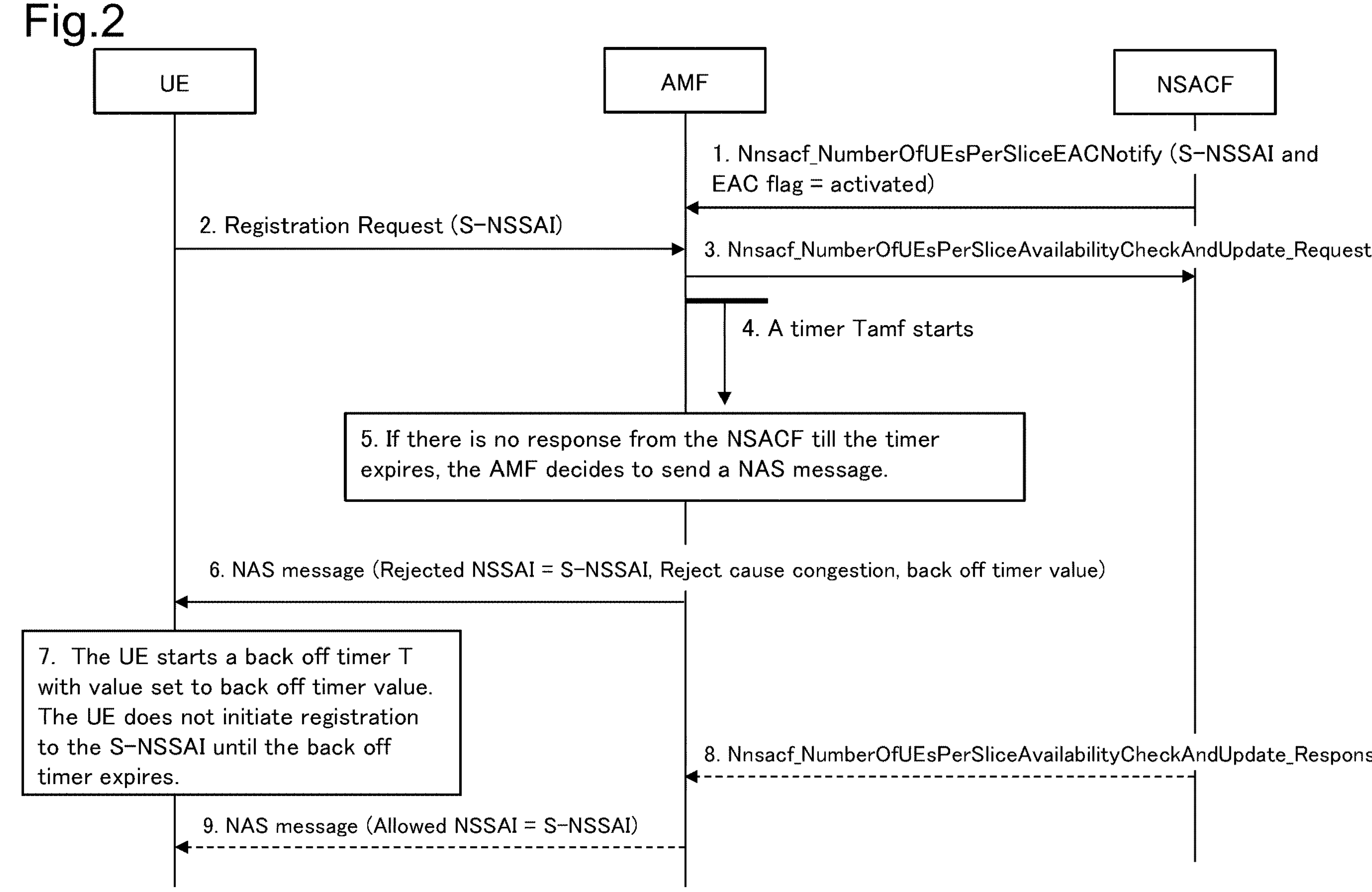
FIG. 2 illustrates Registration procedure for S-NSSAI when NSACF does not reply.

FIG. 2 illustrates the AMF handling of the S-NSSAI registration procedure when the AMF does not receive a response from the NSACF.

The detailed processes of the aspect are described as below.

1. In order to perform the Early Admission Control (EAC) procedure, the NSACF may send an Nnsacf_NumberOfUEsPerSliceEACNotify message with S-NSSAI to the AMF. The Nnsacf_NumberOfUEsPerSliceEACNotify message includes EAC flag which is set to "activated". The EAC flag may indicated whether an EAC mode is activated or deactivated. The EAC flag which is set to "activated" may indicate that the EAC mode is activated.
2. The UE initiates registration procedure to register the UE for the S-NSSAI by sending, to the AMF, a Registration Request message containing the S-NSSAI in the Requested NSSAI. The UE starts the timer T3510. The UE includes an indicator indicating whether the UE supports NSAC procedure or not in the Registration Request message. The indicator may indicate whether the UE supports NSAC feature or NSAC. The indicator is included in the 5GMM capability or as a separate designated parameter in the Registration Request message. The indicator may be called as a NSAC support indicator or NSACF support capability information.
3. When the AMF receives the Registration Request message from the UE, the AMF sends, to the NSACF, an Nnsacf_NumberOfUEsPerSliceAvailabilityCheckAndUpdate_Reque st message requesting the NSACF to register the UE for the S-NSSAI. The AMF stores the 5GMM capability and the NSACF support capability information. The AMF sends the Nnsacf_NumberOfUEsPerSliceAvailabilityCheckAndUpdate_Reque st message for both the UE supporting the NSAC feature and the UE not supporting the NSAC feature if the S-NSSAI is subject to NSAC. If the NSACF support capability information is not included in the Registration Request message or the NSACF support capability information from the UE indicates that the UE does not support the NSAC procedure, then the AMF determines that the UE doesn't support NSAC procedure or NSAC feature. If the NSACF support capability information is included in the Registration Request message, then the AMF determines that the UE supports the NSAC procedure or the NSAC feature.

The Nnsacf_NumberOfUEsPerSliceAvailabilityCheckAndUpdate_Reque st message may include the S-NSSAI.

4. When the AMF sends the Nnsacf_NumberOfUEsPerSliceAvailabilityCheckAndUpdate_Reque st message to the NSACF, the AMF starts a timer Tamf and the AMF waits an Nnsacf_NumberOfUEsPerSliceAvailabilityCheckAndUpdate_Respo nse message to come from the NSACF.

5-6. If the timer Tamf expires in the AMF and the AMF has not received a response (e.g. the Nnsacf_NumberOfUEsPerSliceAvailabilityCheckAndUpdate_Respo nse message) from the NSACF, the AMF sends, to the UE, a NAS message containing the S-NSSAI in the rejected NSSAI, a cause value indicating that the S-NSSAI is temporarily not available. The NAS message may include a value of a back off timer for the S-NSSAI. The NAS message can be one of the following messages.

The NAS message can be a Registration Reject message if the Requested NSSAI in the step 2 contains only the S-NSSAI for which the AMF did not receive a response from the NSACF. In this case the network (e.g. the AMF) maintains the UE context in the AMF. The UE context in the AMF indicates that the response to the Nnsacf_NumberOfUEsPerSliceAvailabilityCheckAndUpdate_Reque st message is pending for the S-NSSAI and the S-NSSAI is rejected for registration for the UE.

The NAS message can be a Registration Accept message if the Requested NSSAI in the step 2 also contains a second S-NSSAI other than the S-NSSAI for which the AMF did not receive a response from the NSACF and the second S-NSSAI is registered successfully in the 5GS. The S-NSSAI for which the AMF did not receive a response from the NSACF may be called as first S-NSSAI. The AMF indicates, by using the Registration Accept message, that the response to the Nnsacf_NumberOfUEsPerSliceAvailabilityCheckAndUpdate_Reque st message is pending for the first S-NSSAI and the first S-NSSAI is rejected for the UE.

7. On receiving the NAS message, the UE starts a timer T with a value set to the back off time value for the S-NSSAI received in the NAS message. The UE shall not initiate registration for the S-NSSAI to the network until the timer T expires. For example, in a case where the back off time value for the S-NSSAI is included in the NAS message, the UE starts a timer T with a value set to the back off time value, and the UE shall not initiate registration for the S-NSSAI to the network until the timer T expires. The back off time value may be called as a value of the timer to suppress registration procedure for the S-NSSAI. For example, the UE retains registration procedure for the S-NSSAI until the timer T expires.

8-9. When the AMF receives the Nnsacf_NumberOfUEsPerSliceAvailabilityCheckAndUpdate_Respo nse message from the NSACF after the NAS message in step 6 was sent to the UE, the AMF can take one of the following actions.

If the AMF determines that the S-NSSAI is rejected (e.g. if the AMF receives the Nnsacf_NumberOfUEsPerSliceAvailabilityCheckAndUpdate_Respo nse message indicating that the registration of the UE for the S-NSSAI fails), the AMF sends, to the NSACF, a message (e.g. an Nnsacf_NumberOfUEsPerSliceAvailabilityCheckAndUpdate_Reque st message) with update flag set to "decrease" in order to decrease the number of the UEs for the S-NSSAI, i.e. in order to deregister the UE for the S-NSSAI in the NSACF.

If the AMF determines that the UE is registered to the network (e.g. if the AMF receives the Nnsacf_NumberOfUEsPerSliceAvailabilityCheckAndUpdate_Respo nse message indicating that the UE is registered to the NSACF successfully or the AMF has sent registration accept message in step 6), the AMF initiates an existing mobile terminated NAS procedure (e.g. service request procedure) and sends, to the UE, a NAS message (e.g. a Configuration Update Command message) containing the S-NSSAI in the Allowed NSSAI information element. The Allowed NSSAI information element may be called as Allowed NSSAI.

When the UE receives the NAS message, the UE stops the timer T and stores the received S-NSSAI to the Allowed NSSAI in the UE and removes the received S-NSSAI from the rejected NSSAI in the UE.

First Variant of the First Aspect

In one example, if the NSACF sends an Nnsacf_NumberOfUEsPerSliceAvailabilityCheckAndUpdate_Respo nse message containing the UE ID and there is no UE context corresponding to the UE ID in the AMF, the AMF sends an Nnsacf_NumberOfUEsPerSliceAvailabilityCheckAndUpdate_Reque st message containing the UE ID, the S-NSSAI and update flag set to "decrease" in order to decrease the number of the UEs for the S-NSSAI i.e. in order to deregister the UE for the S-NSSAI in the NSACF.

Second Variant of the First Aspect

In one example, even the timer that has started in step 4 expires, the AMF does not send a Registration Accept message or a Registration Reject message till the AMF receives, from the NSACF, the Nnsacf_NumberOfUEsPerSliceAvailabilityCheckAndUpdate_Respo nse message. If the timer T3510 expires in the UE, the UE aborts the ongoing registration procedure.

Third Variant of the First Aspect

In one example, when the timer Tamf expires, the AMF re-sends the Nnsacf_NumberOfUEsPerSliceAvailabilityCheckAndUpdate_Reque st message of Step 3 to the NSACF.

If the number of resending the message exceeds a predefined number in the AMF, the AMF stops resending the message to the NSACF and continues from step 5.

Fourth Variant of the First Aspect

In one example, in step 5 the AMF accepts the UE registration for the S-NSSAI and sends the S-NSSAI in the Allowed NSSAI in the Registration Accept message. For example, the AMF may send the S-NSSAI in the Allowed NSSAI in the Registration Accept message if there is no response from the NSACF till the timer Tamf expires.

In step 8, when the AMF receives an Nnsacf_NumberOfUEsPerSliceAvailabilityCheckAndUpdate_Response message indicating the registration of the UE for the S-NSSAI failed, the AMF removes the S-NSSAI from the Allowed NSSAI list. The Allowed NSSAI list may be called as a list of the Allowed NSSAI, or Allowed NSSAI. The Allowed NSSAI list may be stored in the AMF. Then the AMF initiates generic UE configuration update procedure by sending a Configuration Update Command message containing a new Allowed NSSAI, a rejected NSSAI which contains the S-NSSAI, a cause value indicating that the S-NSSAI is not available due to maximum number of UEs reached and optional back off timer (e.g. a value of a back off timer) if the AMF determines that the UE has at least one Allowed S-NSSAI (e.g. if the AMF determines that the UE has at least the Allowed NSSAI that is sent in the Registration Accept message). For example, in a case where the AMF determines that the UE has at least one Allowed NSSAI based on UE context for the UE in the AMF, the AMF initiates the generic UE configuration update procedure by sending the Configuration Update Command message. For example, the new Allowed NSSAI does not include the S-NSSAI.

If the AMF determines that the UE does not have any Allowed NSSAI (e.g. the AMF determines that the UE does not have any Allowed NSSAI based on the UE context for the UE in the AMF), the AMF sends a deregistration request message containing the S-NSSAI in the Rejected NSSAI, a cause value indicating that the S-NSSAI is not available due to maximum number of UEs reached. The deregistration request message may include the back off timer value.

If the Nnsacf_NumberOfUEsPerSliceAvailabilityCheckAndUpdate_Respo nse message indicates that the registration of the UE for the S-NSSAI is successful, the AMF keeps the Allowed NSSAI list as it is for the UE.

Fifth Variant of the First Aspect

If the AMF determines that the UE does not support the NSAC feature, in step 6 the AMF sends the NAS message including the S-NSSAI in the Allowed NSSAI list. For example, if the AMF determines that the UE does not support the NSAC feature and the AMF does not receive the Nnsacf_NumberOfUEsPerSliceAvailabilityCheckAndUpdate_Respo nse message from the NSACF until the Tamf expires, in step 6 the AMF sends the NAS message including the S-NSSAI in the Allowed NSSAI list. For example, if the AMF determines that the UE does not support the NSAC feature regardless of reception of the Nnsacf_NumberOfUEsPerSliceAvailabilityCheckAndUpdate_Respo nse message from the NSACF and the Tamf, in step 6 the AMF sends the NAS message including the S-NSSAI in the Allowed NSSAI list.

In the step 8, if the AMF determines that the UE is not successfully registered (e.g. if the AMF receives the Nnsacf_NumberOfUEsPerSliceAvailabilityCheckAndUpdate_Respo nse message indicating that the registration of the UE for the S-NSSAI is not successful) and the AMF determines that the UE does not support the NSAC feature and the AMF determines that the UE has at least one Allowed NSSAI (e.g. the AMF determines that the UE has at least one Allowed NSSAI based on the UE context for the UE in the AMF), the AMF initiates generic UE configuration update procedure by sending a Configuration Update Command message. The Configuration Update Command message contains a new Allowed NSSAI and a rejected NSSAI containing the S-NSSAI with a cause value indicating that the S-NSSAI is not allowed in the Tracking area. For example, the new Allowed NSSAI does not include the S-NSSAI.

If the AMF determines that the UE does not have any Allowed NSSAI (e.g. the AMF determines that the UE does not have any Allowed NSSAI based on the UE context for the UE in the AMF), the AMF sends a deregistration request message containing the S-NSSAI in the Rejected NSSAI with a cause value indicating that the S-NSSAI is not allowed in the Tracking area. The AMF may determine whether the UE has at least one Allowed NSSAI based on UE context for the UE in the AMF.

The AMF periodically sends the Nnsacf_NumberOfUEsPerSliceAvailabilityCheckAndUpdate_Reque st message to register the UE for the S-NSSAI in the NSACF.

On receiving the Nnsacf_NumberOfUEsPerSliceAvailabilityCheckAndUpdate_Respo nse message indicating the successful operation (e.g. on receiving the Nnsacf_NumberOfUEsPerSliceAvailabilityCheckAndUpdate_Respo nse message indicating that the registration of the UE for the S-NSSAI is successful), the AMF initiates Configuration Update Command procedure by sending the Configuration Update Command message containing the S-NSSAI in the Allowed NSSAI list. When the UE receives the Configuration Update Command message, the UE stores the Allowed NSSAI and removes the S-NSSAI from the rejected NSSAI.

In one example if the AMF determines that the operation is not successful (e.g. if the AMF receives the Nnsacf_NumberOfUEsPerSliceAvailabilityCheckAndUpdate_Respo nse message indicating that the registration of the UE for the S-NSSAI is not successful) and the AMF determines that the UE does not support NSAC feature, the AMF keeps the S-NSSAI in the Allowed NSSAI list however, the AMF rejects a UL NAS Transport message containing a 5GSM message (e.g. the AMF rejects the establishment of the PDU session for the S-NSSAI). The AMF periodically sends the Nnsacf_NumberOfUEsPerSliceAvailabilityCheckAndUpdate_Reque st message to register the UE for the S-NSSAI in the NSACF. On receiving the Nnsacf_NumberOfUEsPerSliceAvailabilityCheckAndUpdate_Respo nse message indicating the successful operation (e.g. if the AMF receives the Nnsacf_NumberOfUEsPerSliceAvailabilityCheckAndUpdate_Respo nse message indicating that the registration of the UE for the S-NSSAI is successful), the AMF starts processing the 5GSM message received in the UL NAS Transport message and sends the 5GSM message to the SMF for processing.

Sixth Variant of the First Aspect

If the NSACF indicates "EAC is deactivated" at step 1 and the AMF receives the Registration request message at step 2, the AMF first finalizes the registration procedure by returning the Registration Accept message or the Registration Reject message to the UE in step 6 based on the outcome of the normal registration procedure as per NPL 3. If the AMF returned the S-NSSAI within the Allowed NSSAI to the UE and the S-NSSAI is subject to NSAC, after the end of the registration procedure the AMF triggers a request to the NSACF for NSAC on the number of UEs registered with the S-NSSAI. For example, the AMF sends the Nnsacf_NumberOfUEsPerSliceAvailabilityCheckAndUpdate_Reque st message. For example, the AMF sends the Nnsacf_NumberOfUEsPerSliceAvailabilityCheckAndUpdate_Reque st message and stats the Tamf in a case of sending the Nnsacf_NumberOfUEsPerSliceAvailabilityCheckAndUpdate_Reque st message. Then:

- if the AMF received, from the NSACF, a response with information indicating that the maximum number of UEs registered with the S-NSSAI has been reached or exceeded (e.g. if the AMF receives the Nnsacf_NumberOfUEsPerSliceAvailabilityCheckAndUpdate_Respo nse message indicating that the registration of the UE for the S-NSSAI is not successful), the AMF triggers the UE Configuration Update procedure and the AMF returns the S-NSSAI within the Rejected NSSAI for changing the S-NSSAI's status in the UE from "allowed" to "rejected". For example, the AMF sends, to the UE, the S-NSSAI within the Rejected NSSAI during the UE Configuration Update procedure. The AMF may return, to the UE, a reject cause indicating that the maximum number of registered UEs has been reached and the AMF may return, to the UE, also the value of a back off timer;
- if the AMF did not receive any response from the NSACF, the AMF returns, to the UE, the S-NSSAI within the Rejected NSSAI for changing the S-NSSAI's status in the UE from "allowed" to "rejected". The AMF may return, to the UE, a reject cause indicating that the maximum number of registered UEs has been reached and the AMF may return, to the UE, also the value of a back off timer;
- if the timer (e.g. the Tamf) in the AMF is running and the AMF did not receive a response from the NSACF before the timer expiry, the AMF may repeat the request for NSAC for the S-NSSAI several times (e.g. the repetition number defined in the AMF). For example the AMF may repeat sending the Nnsacf_NumberOfUEsPerSliceAvailabilityCheckAndUpdate_Reque st message for the S-NSSAI to the NSACF.

If the UE has gone into Idle Mode (e.g. N1 signaling connection was released) while the AMF was checking for NSAC for the S-NSSAI, the AMF may first page the UE and when the UE is connected again, the AMF updates the S-NSSAI's status in the UE with the UE Configuration Update procedure.

For example, the aspect 1 and the variants of the aspect 1 propose solutions for some situations in the 3GPP nodes or some situations in the connection between the 3GPP nodes during the NSAC procedure.

For example, the aspect 1 and the variants of the aspect 1 can solve outstanding issues related to some situations in the 3GPP nodes or some situations in the connection between 3GPP nodes during the NSAC procedure.

For example, the aspect 1 and the variants of the aspect 1 propose solutions for some situations where the 3GPP standard for the NSAC procedure have some ambiguous descriptions for some situations.

For example, the aspect 1 and the variants of the aspect 1 can solve a problem that it is unclear how the AMF is supposed to treat a UE during the Registration procedure if a Network Slice Admission Control Function (NSACF) does not respond to a request from the AMF.

Second Aspect

The Second aspect discloses that the AMF changes the registration status of S-NSSAI in UE when EAC flag is set to "Deactivated".

This aspect discloses the AMF behavior when the AMF has received, from the NSACF, a request to deactivate the EAC procedure for S-NSSAI. If the AMF does not receive a response message from the NSACF after sending, to NSACF, a request to register a UE for the S-NSSAI in the NSACF during the Registration procedure, the aspect discloses that the AMF updates the registration status of the S-NSSAI for the UE by initiating a mobile terminated procedure.

FIG. 3 illustrates the registration procedure for S-NSSAI which is subject to the NSAC and the EAC is deactivated at the AMF.

The detailed processes of the aspect are described as below.

1. In order to perform the Early Admission Control (EAC) procedure, the NSACF may send an Nnsacf_NumberOfUEsPerSliceEACNotify message for S-NSSAI to the AMF. If the NSACF may indicate EAC flag which is set to "Deactivated" in the Nnsacf_NumberOfUEsPerSliceEACNotify message, it means that EAC mode is deactivated. The EAC flag which is set to "Deactivated" may be called as EAC flag which is set to "not activated". This typically happens when the number of UEs registered with the network slice is below certain operator defined threshold. In this case, the AMF deactivates the EAC procedure. In one example, the EAC is deactivated by default in the AMF.
2. The UE initiates registration procedure for the S-NSSAI by sending a Registration Request message containing the S-NSSAI in the Requested NSSAI.
3. The AMF sends a Registration Accept message containing the S-NSSAI in the Allowed NSSAI.
4. The AMF sends, to the NSACF, an Nnsacf_NumberOfUEsPerSliceAvailabilityCheckAndUpdate_Reque st message to register the UE for the S-NSSAI in the NSACF. The Nnsacf_NumberOfUEsPerSliceAvailabilityCheckAndUpdate_Reque st message may include the S-NSSAI.
5. When the AMF sends the Nnsacf_NumberOfUEsPerSliceAvailabilityCheckAndUpdate_Reque st message to the NSACF, the AMF starts a timer Tamf and the AMF waits an Nnsacf_NumberOfUEsPerSliceAvailabilityCheckAndUpdate_Respo nse message to come from the NSACF.

Note that the step 3 and steps 4 and 5 take place in any order. For example, the AMF may send the Registration Accept message after sending the Nnsacf_NumberOfUEsPerSliceAvailabilityCheckAndUpdate_Reque st message and before starting the timer Tamf.

For example, the AMF may send the Registration Accept message after starting the timer Tamf.

6. The AMF receives a Registration Complete message from the UE.

If the AMF receives a UL NAS transport message containing a 5GSM message with the S-NSSAI that is being registered to the NSACF while Tamf is running, then the AMF performs one of the following action.

The AMF rejects the 5GSM message as a response to the Nnsacf_NumberOfUEsPerSliceAvailabilityCheckAndUpdate_Reque st message is not yet confirmed.

The AMF accepts the UL NAS transport message and sends the 5GSM message contained in the UL TRANSPORT message to the SMF for the processing.

7-8. If the timer Tamf expires in the AMF and the AMF has not received, from the NSACF, a response (e.g. the Nnsacf_NumberOfUEsPerSliceAvailabilityCheckAndUpdate_Respo nse message), the AMF sends, to the UE, a NAS message containing the S-NSSAI in the rejected NSSAI, a cause value indicating that the S-NSSAI is temporarily not available. The cause value may indicate that the S-NSSAI is temporarily not available due to congestion. The NAS message may include a value of a back off timer. The NAS message can be one of the following messages.

The NAS message can be a Deregistration request message. The AMF initiates network initiated deregistration procedure and sends the Deregistration request message if the S-NSSAI is the only network slice (or the only entry) in the Allowed NSSAI list of the UE. The AMF may determine that the S-NSSAI is the only network slice (or the only entry) in the Allowed NSSAI list of the UE based on UE context for the UE in the AMF. The Deregistration request message contains the S-NSSAI in the rejected NSSAI with a cause value indicating that the network slice (or the S-NSSAI) is temporary not available. The Deregistration request message may include a value of a back off timer. The AMF may initiate the network initiated deregistration procedure if the timer Tamf expires in the AMF and the AMF has not received, from the NSACF, a response (e.g. the Nnsacf_NumberOfUEsPerSliceAvailabilityCheckAndUpdate_Respo nse message).

The NAS message can be a Configuration Update Command message. The AMF initiates general UE configuration update procedure and sends the Configuration Update Command message containing a rejected NSSAI which contains the S-NSSAI, a cause value indicating that the network slice (or the S-NSSAI) is temporary not available and a value of a back off time. If the UE has gone into Idle Mode (e.g. when the N1 signaling connection is released) while the AMF was checking for NSAC for the S-NSSAI, the AMF may first page the UE and when the UE is connected again, the AMF updates the S-NSSAI's status in the UE with the UE Configuration Update procedure. In a case where there are active PDU session(s) with the S-NSSAI, the AMF initiates the PDU Session Release procedure(s) for those active PDU session(s). The AMF may initiate the general UE configuration update procedure if the timer Tamf expires in the AMF and the AMF has not received, from the NSACF, a response (e.g. the Nnsacf_NumberOfUEsPerSliceAvailabilityCheckAndUpdate_Respo nse message). The AMF may initiate the general UE configuration update procedure if the timer Tamf expires in the AMF and the AMF has not received, from the NSACF, a response (e.g. the Nnsacf_NumberOfUEsPerSliceAvailabilityCheckAndUpdate_Respo nse message).

The NAS message can be Registration Accept message. If the AMF has received a new registration request message containing the S-NSSAI in the Requested NSSAI, the AMF sends a Registration Accept message containing the S-NSSAI in the rejected NSSAI, a cause value indicating that the network slice is temporarily not available and a value of a back off timer. The AMF may send the Registration Accept message if the timer Tamf expires in the AMF and the AMF has not received, from the NSACF, a response (e.g. the Nnsacf_NumberOfUEsPerSliceAvailabilityCheckAndUpdate_Respo nse message) and the AMF has received, from the UE, a new registration request message containing the S-NSSAI in the Requested NSSAI.

9. When the UE receives the NAS message, the UE starts a timer T with a value set to the back off timer value for the S-NSSAI. The UE shall not initiate registration procedure to register for the S-NSSAI in the network until the timer T expires. For example, in a case where the back off time value for the S-NSSAI is included in the NAS message, the UE starts a timer T with a value set to the back off time value, and the UE shall not initiate registration for the S-NSSAI to the network until the timer T expires. The back off time value may be called as a value of the timer to suppress registration procedure for the S-NSSAI. For example, the UE retains registration procedure for the S-NSSAI until the timer T expires.

When the UE receives Allowed NSSAI in the Configuration Update Command message the UE stores the received Allowed NSSAI and executes a NAS procedure as per the stored Allowed NSSAI.

10. When the AMF receives the Nnsacf_NumberOfUEsPerSliceAvailabilityCheckAndUpdate_Respo nse message from the NSACF after the NAS message in step 8 was sent to the UE, the AMF initiates one of the following procedure:

The AMF initiates generic UE configuration update procedure. The Configuration Update Command message sent by the AMF during the generic UE configuration update procedure contains Allowed NSSAI including the S-NSSAI.

For example, in a case where the AMF receives the Nnsacf_NumberOfUEsPerSliceAvailabilityCheckAndUpdate_Respo nse message indicating that the registration of the UE for the S-NSSAI is successful, the AMF initiates generic UE configuration update procedure by sending the Configuration Update Command message including the Allowed NSSAI which includes the S-NSSAI.

11. Upon reception of the Configuration Update Command message from the AMF, the UE stores the Allowed NSSAI and executes the NAS procedure accordingly. The UE removes the S-NSSAI from the rejected NSSAI.

First Variant of the Second Aspect

In step 7 of the FIG. 3, if the AMF did not receive, from the NSACF, a response to the Nnsacf_NumberOfUEsPerSliceAvailabilityCheckAndUpdate_Reque st message and the Tamf expires, the AMF may repeat sending the Nnsacf_NumberOfUEsPerSliceAvailabilityCheckAndUpdate_Reque st message to the NSACF as illustrated in step 4 several times (e.g. the number of times defined in the AMF by the standards or configured by the operator). If there is still no response from the NSACF, the AMF may continue from step 8 onwards.

For example, the aspect 2 and the variant of the aspect 2 propose solutions for some situations in the 3GPP nodes or some situations in the connection between the 3GPP nodes during the NSAC procedure.

For example, the aspect 2 and the variant of the aspect 2 can solve outstanding issues related to some situations in the 3GPP nodes or some situations in the connection between 3GPP nodes during the NSAC procedure.

For example, the aspect 2 and the variant of the aspect 2 propose solutions for some situations where the 3GPP standard for the NSAC procedure have some ambiguous descriptions for some situations.

For example, the aspect 2 and the variant of the aspect 2 can solve a problem that it is unclear how the AMF is supposed to treat a UE during the Registration procedure if a Network Slice Admission Control Function (NSACF) does not respond to a request from the AMF.

Third Aspect

Third aspect discloses the AMF changes the registration status of S-NSSAI in UE when EAC flag is set to "Activated".

This aspect discloses the AMF behavior when the AMF has received, from the NSACF, a request to activate the EAC procedure for S-NSSAI.

If the AMF does not receive a response message from the NSACF after sending a request to NSACF to register a UE for the S-NSSAI in the NSACF during the Registration procedure, this aspect discloses that the AMF assigns an intermediate status to the S-NSSAI and sends this status in the Registration Accept message. The AMF further initiates a NSAC procedure to register the UE in the NSACF. When the NSAC procedure completes, the NSACF updates the S-NSSAI as allowed if the outcome of the NSAC procedure is successful or as rejected if the outcome of the NSAC procedure is not successful. The AMF initiates a NAS procedure to update the S-NSSAI status in the UE.

FIG. 4 illustrate the AMF behavior when the AMF receives a registration request message containing the S-NSSAI in the Requested NSSAI, the S-NSSAI is subject to NSAC and the EAC is activated to the S-NSSAI at the AMF.

The detailed processes of the aspect are described as below.

1a. In order to perform the Early Admission Control (EAC) procedure, the NSACF may send, to the AMF, an Nnsacf_NumberOfUEsPerSliceEACNotify message for S-NSSAI. If the NSACF may indicate EAC flag which is set to "Activated" in the Nnsacf_NumberOfUEsPerSliceEACNotify message, it means that EAC mode is activated. For example, the EAC flag which is set to "Activated" means that the EAC mode is activated in the NSACF. This typically happens when the number of UEs registered with the network slice is above certain operator defined threshold (e.g. a percentage of the maximum number of UEs allowed to register with the network slice).

1b. The NSACF determines that the number of UEs for the S-NSSAI reached the maximum threshold for a prolonged time (or a predetermined time) and more UEs cannot be registered in the NSACF for the S-NSSAI. Then the NSACF sends an Nnsacf_NumberOfUEsPerSliceEACNotify message or a new message containing the S-NSSAI, and information (e.g. information of Overload Control) containing an Information Element (IE) indicating that the number of UEs has reached a maximum threshold for the S-NSSAI. The message optionally includes a value of a back off time. In one example the NSACF also sends this message when the NSACF determines that the NSACF is receiving, from the AMF or the SMF, a high number of messages related to the NSAC procedure and the NSACF cannot process all of the messages and becomes overloaded. In this case, the NSACF may indicate that the NSACF is overloaded in this message. For example, the NSACF may indicate that the NSACF is not reachable from the AMF in this message.

For example, the NSACF may performs at least one of the process of step 1a and the process of step 1b.

2. The UE initiates registration procedure to register the UE for the S-NSSAI by sending a Registration Request message containing the S-NSSAI in the Requested NSSAI. The UE starts the timer T3510.

3-4. When the EAC is activated for the UE (e.g. when the AMF received the Nnsacf_NumberOfUEsPerSliceEACNotify message including the EAC flag which is set to "Activated") or when the AMF received, from the NSACF, the message indicating that the NSACF is overloaded or that the number of UEs has reached the maximum for the S-NSSAI or that the NSACF is not reachable from the AMF, the AMF sets the S-NSSAI status as pending for the NSAC registration procedure. The AMF sends, to the UE, a Registration Accept message including an NSAC registration pending NSSAI IE containing the S-NSSAI. The Registration Accept message may include a value of a back off timer.

The NSAC registration pending NSSAI IE contains the S-NSSAI for which the registration to the NSACF is pending as the AMF is waiting for the outcome of the registration procedure of the UE for the S-NSSAI to the NSACF or registration of the UE to the NSACF is not possible temporarily due to reason listed above in this step. For example, the reason may include that there are a high number of messages related to the NSAC procedure, the NSACF cannot process all of the messages and becomes overloaded or the NSACF is not reachable from the AMF. The NSAC registration pending NSSAI IE may be called as information indicating the registration of the UE for the S-NSSAI to the NSACF is pending.

Upon reception of the Registration Accept message, the UE stores the NSAC registration pending NSSAI IE. The UE shall not initiate a registration procedure to register the UE for the S-NSSAI which is present in the NSAC registration pending IE. The UE shall not initiate a 5GSM procedure to establish a PDU session for the S-NSSAI which is present in the NSAC registration pending IE.

For example, upon reception of the Registration Accept message, the UE stores the NSAC registration pending NSSAI IE and starts a timer with a value which is set to the value of the back off timer received in the Registration Accept message, and the UE shall not initiate a registration procedure to register the UE for the S-NSSAI which is present in the NSAC registration pending IE while the timer is running. In addition, for example, the UE shall not initiate a 5GSM procedure to establish a PDU session for the S-NSSAI which is present in the NSAC registration pending IE while the timer is running. The back off time value may be called as a value of a timer to suppress procedure related to the S-NSSAI.

5. When the AMF receives a registration request message (e.g. the UE doesn't receive response of the registration request message sent in the step 2 and UE retries the Registration Request message when timer T3511 expires), the AMF sends an Nnsacf_NumberOfUEs-PerSliceAvailabilityCheckAndUpdate_Request message to the NSACF handling the S-NSSAI to register the UE to the NSACF. For example, the registration request message may include the S-NSSAI in the Requested NSSAI, and may be sent from the UE after the timer which starts in step 4 expires. For example, the registration request message may include the S-NSSAI in the Requested NSSAI, and may be sent from another UE which is different from the UE which sends the registration request message in step 2.

In a case where the AMF has received the message of step 1b, then the AMF shall not send the Nnsacf_NumberOfUEs-PerSliceAvailabilityCheckAndUpdate_Reque st message to the NSACF for the S-NSSAI.

The Nnsacf_NumberOfUEsPerSliceAvailabilityCheck-AndUpdate_Reque st message may include the S-NSSAI and update flag which is set to "increase". The update flag which is set to "increase" may indicate that the AMF requests to increase the number of UEs for the S-NSSAI. The update flag which is set to "increase" may be interpreted as a request to increase the number of UEs for the S-NSSAI.

Note that Steps 3 and 4 and step 5 may take place in any order. For example, the AMF performs processes in steps 3 and 4 after performing the process in step 5.

6. The UE sends a Registration complete message to the AMF. For example, the UE sends the Registration complete message in a case where the UE receives the Registration Accept message of step 4.
7. The AMF receives the Nnsacf_NumberOfUEs-PerSliceAvailabilityCheckAndUpdate_Respo nse message form the NSACF. Then the AMF takes one of the following actions in steps 8a and 8*b* depending on whether UE registration is successful or not.

8a. If the Nnsacf_NumberOfUEsPerSliceAvailability-CheckAndUpdate_Respo nse message indicates that the UE is registered successfully to the NSACF for the S-NSSAI, the AMF sends, to the UE, a first NAS message containing the S-NSSAI in the Allowed NSSAI list. The first NAS message can be a Registration Accept message or a Configuration Update Command message.

8b. If the Nnsacf_NumberOfUEsPerSliceAvailability-CheckAndUpdate_Respo nse message indicates that the UE is not registered successfully to the NSACF for the S-NSSAI, the AMF sends, to the UE, a second NAS message containing the S-NSSAI in the rejected NSSAI with a cause value indicating that the maximum number of UEs reached and a value of a back off timer. The second NAS message can be a deregistration message, a deregistration request message, a Configuration Update Command message or a Registration Accept message.

9. Upon reception of the first NAS message, the UE removes the S-NSSAI from the NSAC registration pending NSSAI IE. The UE stores the S-NSSAI in the Allowed NSSAI and may execute the NAS procedure with the S-NSSAI.

Upon reception of the second NAS message the UE starts a timer T with a value set to the back off timer value. The UE shall not initiate a registration procedure to register the UE for the S-NSSAI while the timer T is running. The back off time value may be called as a value of the timer to suppress registration procedure for the S-NSSAI. For example, the UE retains the registration procedure for the S-NSSAI until the timer T expires.

First Variant of the Third Aspect

In one example, the NSAC registration pending NSSAI IE is same as the pending NSSAI defined in NPL 6.

For example, the aspect 3 and the variant of the aspect 3 propose solutions for some situations in the 3GPP nodes or some situations in the connection between the 3GPP nodes during the NSAC procedure.

For example, the aspect 3 and the variant of the aspect 3 can solve outstanding issues related to some situations in the 3GPP nodes or some situations in the connection between 3GPP nodes during the NSAC procedure.

For example, the aspect 3 and the variant of the aspect 3 propose solutions for some situations where the 3GPP standard for the NSAC procedure have some ambiguous descriptions for some situations.

For example, the aspect 3 and the variant of the aspect 3 can solve a problem that it is unclear how the AMF is supposed to treat a UE during the Registration procedure if a Network Slice Admission Control Function (NSACF) does not respond to a request from the AMF.

Fourth Aspect

The Fourth aspect discloses PDU session establishment procedure when NSACF does not reply.

This aspect discloses the SMF behavior when the SMF does not receive, from the NSACF, a response for a request to increase the number of PDU sessions for an S-NSSAI.

This aspect discloses that when the SMF doesn't receive a response to an Nnsacf_NumberOfPDUsPerSliceAvailabilityCheckAndUpdate_Request message for the S-NSSAI within a period of time during the PDU session establishment procedure the SMF rejects the PDU session establishment procedure for the S-NSSAI and sends a PDU session establishment reject message with a 5GSM cause value set to an existing value (e.g. 5GSM #69) or a new value indicating that there is no response from the NSACF. The PDU session establishment reject message includes a value of a back off timer. When the UE receives the PDU session establishment reject message then the UE starts a timer T with a value set to the back off timer value and the UE doesn't initiate PDU session establishment procedure for the S-NSSAI. The back off time value may be called as a value of the timer to suppress procedure for establishing a PDU Session for the S-NSSAI.

FIG. 5 illustrates the SMF behavior when the SMF doesn't receive any response from the NSACF.

The detailed processes of the aspect are described as below.

1. A UE is registered to a PLMN with S-NSSAI in the Allowed NSSAI.
2. The UE initiates PDU session establishment procedure as described in NPL 3 for the S-NSSAI by sending a PDU session establishment request message containing the S-NSSAI.
3. When the SMF receives the PDU session establishment request message for the S-NSSAI, the SMF sends, to the NSACF, an Nnsacf_NumberOfPDUsPerSliceAvailabilityCheckAndUpdate_Request message to increase the number of PDU sessions for the S-NSSAI. The Nnsacf_NumberOfPDUsPerSliceAvailabilityCheckAndUpdate_Request message includes the S-NSSAI and update flag which is set to "increase". The update flag which is set to "increase" may indicate that the SMF requests to increase the number of PDU sessions for the S-NSSAI. The update flag which is set to "increase" may be interpreted as a request to increase the number of PDU sessions for the S-NSSAI.

In a case where the SMF acknowledges that the NSACF for the S-NSSAI is not reachable or the NSACF sends, to the SMF, a message indicating that the NSACF is currently encountering the overload and does not accept any request message, then the SMF shall not send, to the NSACF, the Nnsacf_NumberOfPDUsPerSliceAvailabilityCheckAndUpdate_Request message for the S-NSSAI.

For example, the NSACF sends the message indicating that the NSACF is currently encountering the overload and does not accept any request message in a case where the NSACF determines that the NSACF is receiving, from the AMF or the SMF, a high number of messages related to the NSAC procedure and the NSACF cannot process all of the messages and becomes overloaded. For example, the SMF acknowledges or knows that the NSACF for the S-NSSAI is not reachable or the NSACF for the S-NSSAI is overloaded, the SMF shall not send, to the NSACF, the Nnsacf_NumberOfPDUsPerSliceAvailabilityCheckAndUpdate_Request message for the S-NSSAI and may proceed to step 6.

4. When the SMF sends the Nnsacf_NumberOfPDUsPerSliceAvailabilityCheckAndUpdate_Request message to the NSACF, the SMF starts a timer Tsmf and the SMF waits an Nnsacf_NumberOfPDUsPerSliceAvailabilityCheckAndUpdate_Response message to come from the NSACF.

5-6. If the timer Tsmf expires in the SMF and the SMF has not received a response (e.g. the Nnsacf_NumberOfPDUsPerSliceAvailabilityCheckAndUpdate_Response message) from the NSACF or the SMF determines that the SMF is not reachable, the SMF sends, to the UE, a PDU session establishment reject message including a 5GSM cause value set to an existing value (e.g. 5GSM #69) or a new value indicating that there is no response from the NSACF. The PDU session establishment reject message includes a value of a back off timer.

For example, in a case where the SMF does not send, to the NSACF, the Nnsacf_NumberOfPDUsPerSliceAvailabilityCheckAndUpdate_Request message for the S-NSSAI in step 3, the SMF sends, to the UE, the PDU session establishment reject message.

7. Upon receiving the PDU session establishment reject message, the UE starts a timer T (an existing SM timer or a new timer) and the UE does not initiate any PDU session establishment procedure for the S-NSSAI till the timer T expires. The timer T has a value corresponding to the value received in the PDU session establishment reject message. The value may be called as a value of the timer to suppress procedure for establishing a PDU Session for the S-NSSAI. For example, the UE retains any PDU session establishment procedure for the S-NSSAI until the timer T expires.
8. When the SMF receives an Nnsacf_NumberOfPDUsPerSliceAvailabilityCheckAndUpdate_Response message indicating successful operation (e.g. successful increment of the number of PDU sessions for the S-NSSAI), then SMF takes one of the following actions in steps 9a-1 and 9b. The Nnsacf_NumberOfPDUsPerSliceAvailabilityCheckAndUpdate_Response message may indicate that the registration or counting of the PDU session for the S-NSSAI is successful. The Nnsacf_NumberOfPDUsPerSliceAvailabilityCheckAndUpdate_Response message may indicate that the number of PDU sessions for the S-NSSAI successfully increased.

9a-1. The SMF sends an Nnsacf_NumberOfPDUsPerSliceAvailabilityCheckAndUpdate_Request message with the S-NSSAI and the update flag set to "decrease". The update flag which is set to "decrease" may indicate that the AMF requests to decrease the number of PDU sessions for the S-NSSAI. The update flag which is set to "decrease" may be interpreted as a request to decrease the number of PDU sessions for the S-NSSAI.

9a-2. Upon reception of the Nnsacf_NumberOfPDUsPerSliceAvailabilityCheckAndUpdate_Request message the NSACF decreases the number of PDU session for the S-NSSAI and sends a message e.g. an Nnsacf_NumberOfPDUsPerSliceAvailabilityCheckAndUpdate_Response message. The Nnsacf_NumberOfPDUsPerSliceAvailabilityCheckAndUpdate_Response message may indicate successful decrement of the number of PDU sessions for the S-NSSAI. The Nnsacf_NumberOfPDUsPerSliceAvailabilityCheck- AndUpdate_Response message may indicate that the number of PDU sessions for the S-NSSAI successfully decreased.

9b. The SMF initiates the Network Triggered Service Request procedure as described in NPL 3 in order to establish the PDU session that has once rejected in step 6.

First Variant of the Fourth Aspect

In one example, the UE retries PDU session establishment procedure by sending a PDU session establishment request message for the same combination of S-NSSAI and DNN after expiry of a retry timer (e.g. the timer T).

When the SMF receives the PDU session establishment request message and sends, to the NSACF, an Nnsacf_NumberOfPDUsPerSliceAvailabilityCheckAndUpdate_Request message for the S-NSSAI. If there is no response from the NSACF for the Nnsacf_NumberOfPDUsPerSliceAvailabilityCheckAndUpdate_Request message, the SMF does not send another Nnsacf_NumberOfPDUsPerSliceAvailabilityCheckAndUpdate_Request message to the NSACF to increase the number of the PDU sessions for the S-NSSAI and waits for the response from the NSACF.

In one example when the SMF sends an Nnsacf_NumberOfPDUsPerSliceAvailabilityCheckAndUpdate_Request message with update flag set to "increase" and on receiving response indicating that the successful operation of the NSAC, the SMF proceeds the PDU session establishment procedure. For example, if the SMF receives the response indicating that successful operation of the NSAC (e.g. the response indicating that the number of PDU sessions for the S-NSSAI successfully increased) after sending the Nnsacf_NumberOfPDUsPerSliceAvailabilityCheckAndUpdate_Request message of the step 3 in FIG. 5, then the SMF proceeds the PDU session establishment procedure.

For example, the aspect 4 and the variant of the aspect 4 propose solutions for some situations in the 3GPP nodes or some situations in the connection between the 3GPP nodes during the NSAC procedure.

For example, the aspect 4 and the variant of the aspect 4 can solve outstanding issues related to some situations in the 3GPP nodes or some situations in the connection between 3GPP nodes during the NSAC procedure.

For example, the aspect 4 and the variant of the aspect 4 propose solutions for some situations where the 3GPP standard for the NSAC procedure have some ambiguous descriptions for some situations.

For example, the aspect 4 and the variant of the aspect 4 can solve a problem that it is unclear how the SMF is supposed to treat a PDU session during the PDU session establishment procedure if a Network Slice Admission Control Function (NSACF) does not respond to a request from the SMF.

<System Overview>

Figure 6:
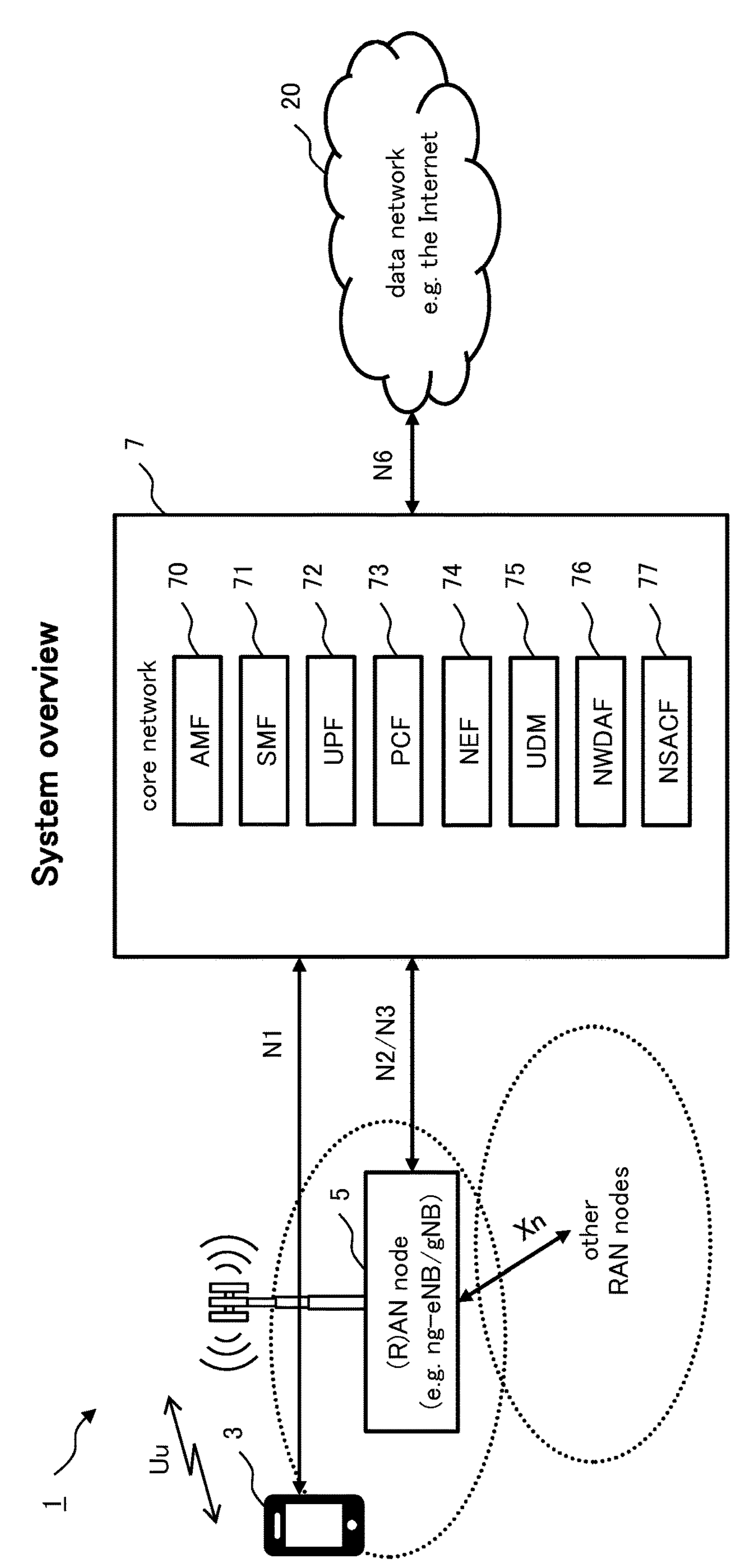
FIG. 6 illustrates System overview.

FIG. 6 schematically illustrates a telecommunication system 1 for a mobile (cellular or wireless) device (known as a user equipment (UE)) to which the above aspects are applicable.

The telecommunication system 1 represents a system overview in which an end to end communication is possible. For example, UE 3 (or user equipment, 'mobile device' 3) communicates with other UEs 3 or service servers in the data network 20 via respective (R)AN nodes 5 and a core network 7.

The (R)AN node 5 supports any radio accesses including a 5G radio access technology (RAT), an E-UTRA radio access technology, a beyond 5G RAT, a 6G RAT and non-3GPP RAT including wireless local area network (WLAN) technology as defined by the Institute of Electrical and Electronics Engineers (IEEE).

The (R)AN node 5 may split into a Radio Unit (RU), Distributed Unit (DU) and Centralized Unit (CU). In some aspects, each of the units may be connected to each other and structure the (R)AN node 5 by adopting an architecture as defined by the Open RAN (O-RAN) Alliance, where the units above are referred to as O-RU, O-DU and O-CU respectively.

The (R)AN node 5 may be split into one or more control plane functions and one or more user plane functions. Further, multiple user plane functions can be allocated to support a communication. In some aspects, user traffic may be distributed to multiple user plane functions and user traffic over each user plane function is aggregated in both the UE 3 and the (R)AN node 5. This split architecture may be called 'dual connectivity' or 'Multi connectivity'.

The (R)AN node 5 can also support a communication using the satellite access. In some aspects, the (R)AN node 5 may support a satellite access and a terrestrial access.

In addition, the (R)AN node 5 can also be referred as an access node for a non-wireless access. The non-wireless access includes a fixed line access as defined by the Broadband Forum (BBF) and an optical access as defined by the Innovative Optical and Wireless Network (IOWN).

The core network 7 may include logical nodes (or 'functions') for supporting a communication in the telecommunication system 1. For example, the core network 7 may be 5G Core Network (5GC) that includes, amongst other functions, control plane functions and user plane functions. Each function in a logical node can be considered as a network function. The network function may be provided to another node by adapting the Service Based Architecture (SBA).

A Network Function can be deployed as distributed, redundant, stateless, and scalable that provides the services from several locations and several execution instances in each location by adapting the network virtualization technology as defined by the European Telecommunications Standards Institute, Network Functions Virtualization (ETSI NFV).

The core network 7 may support the Non-Public Network (NPN). The NPN may be a Stand-alone Non-Public Network (SNPN) or a Public Network Integrated NPN (PNI-NPN).

As is well known, a UE 3 may enter and leave the areas (i.e. radio cells) served by the (R)AN node 5 as the UE 3 is moving around in the geographical area covered by the telecommunication system 1. In order to keep track of the UE 3 and to facilitate movement between the different (R)AN nodes 5, the core network 7 comprises at least one access and mobility management function (AMF) 70. The AMF 70 is in communication with the (R)AN node 5 coupled to the core network 7. In some core networks, a mobility management entity (MME) or a mobility management node for beyond 5G or a mobility management node for 6G may be used instead of the AMF 70.

The core network 7 also includes, amongst others, a Session Management Function (SMF) 71, a User Plane Function (UPF) 72, a Policy Control Function (PCF) 73, a Network Exposure Function (NEF) 74, a Unified Data Management (UDM) 75, a Network Data Analytics Function (NWDAF) 76 and NSACF (Network Slice Admission Control Function) 77. When the UE 3 is roaming to a visited Public Land Mobile Network (VPLMN), a home Public Land Mobile Network (HPLMN) of the UE 3 provides the UDM 75 and at least some of the functionalities of the SMF 71, UPF 72, and PCF 73 for the roaming-out UE 3.

The UE 3 and a respective serving (R)AN node 5 are connected via an appropriate air interface (for example the so-called "Uu" interface and/or the like). Neighboring (R)AN nodes 5 are connected to each other via an appropriate (R)AN node 5 to (R)AN node interface (such as the so-called "Xn" interface and/or the like). Each (R)AN node 5 is also connected to nodes in the core network 7 (such as the so-called core network nodes) via an appropriate interface (such as the so-called "N2"/"N3" interface(s) and/or the like). From the core network 7, connection to a data network 20 is also provided. The data network 20 can be an internet, a public network, an external network, a private network or an internal network of the PLMN. In case that the data network 20 is provided by a PLMN operator or Mobile Virtual Network Operator (MVNO), the IP Multimedia Subsystem (IMS) service may be provided by that data network 20. The UE 3 can be connected to the data network 20 using IPv4, IPV6, IPv4v6, Ethernet or unstructured data type.

The "Uu" interface may include a Control plane and User plane.

The User plane of the Uu interface is responsible to convey user traffic between the UE 3 and a serving (R)AN node 5. The User plane of the Uu interface may have a layered structure with SDAP, PDCP, RLC and MAC sublayer over the physical connection.

The Control plane of the Uu interface is responsible to establish, modify and release a connection between the UE 3 and a serving (R)AN node 5. The Control plane of the Uu interface may have a layered structure with RRC, PDCP, RLC and MAC sublayers over the physical connection.

For example, the following messages are communicated over the RRC layer to support AS signaling.

- RRC Setup Request message: This message is sent from the UE 3 to the (R)AN node 5. In addition to the parameters that are disclosed by aspects in this disclosure, any of the following parameters may be included together in the RRC Setup Request message.
  - establishmentCause and ue-Identity. The ue-Identity may have a value of ng-5G-S-TMSI-Part1 or a random Value.
- RRC Setup message: This message is sent from the (R)AN node 5 to the UE 3. In addition to the parameters that are disclosed by aspects in this disclosure, any of the following parameters may be included together in the RRC Setup message.
  - masterCellGroup and radioBearerConfig
- RRC Setup Complete message: This message is sent from the UE 3 to the (R)AN node 5. In addition to the parameters that are disclosed by aspects in this disclosure, any of the following parameters may be included together in the RRC Setup Complete message.
  - guami-Type, iab-NodeIndication, idleMeasAvailable, mobilityState, ng-5G-S-TMSI-Part2, registeredAMF, selectedPLMN-Identity The UE 3 and the AMF 70 are connected via an appropriate interface (for example the so-called N1 interface and/or the like). The N1 interface is responsible for providing a communication between the UE 3 and the AMF 70 to support NAS signaling. The N1 interface may be established over a 3GPP access and over a non-3GPP access. For example, the following messages are communicated over the N1 interface.

- Registration Request message: This message is sent from the UE 3 to the AMF 70. In addition to the parameters that are disclosed by aspects in this disclosure, any of the following parameters may be included together in the Registration Request message.
  - 5GS registration type, ngKSI, 5GS mobile identity, Non-current native NAS key set identifier, 5GMM capability, UE security capability, Requested NSSAI, Last visited registered TAI, S1 UE network capability, Uplink data status, PDU session status, MICO indication, UE status, Additional GUTI, Allowed PDU session status, UE's usage setting, Requested DRX parameters, EPS NAS message container, LADN indication, Payload container type, Payload container, Network slicing indication, 5GS update type, Mobile station classmark 2, Supported codecs, NAS message container, EPS bearer context status, Requested extended DRX parameters, a T3324 value, UE radio capability ID, Requested mapped NSSAI, Additional information requested, Requested WUS assistance information, N5GC indication and Requested NB-N1 mode DRX parameters.
- Registration Accept message: This message is sent from the AMF 70 to the UE 3. In addition to the parameters that are disclosed by aspects in this disclosure, any of the following parameters may be included together in the Registration Accept message.
  - 5GS registration result, 5G-GUTI, Equivalent PLMNs, TAI list, Allowed NSSAI, Rejected NSSAI, Configured NSSAI, 5GS network feature support, PDU session status, PDU session reactivation result, PDU session reactivation result error cause, LADN information, MICO indication, Network slicing indication, Service area list, a T3512 value, a Non-3GPP de-registration timer value, a T3502 value, Emergency number list, Extended emergency number list, SOR transparent container, EAP message, NSSAI inclusion mode, Operator-defined access category definitions, Negotiated DRX parameters, Non-3GPP NW policies, EPS bearer context status, Negotiated extended DRX parameters, a T3447 value, a T3448 value, a T3324 value, UE radio capability ID, UE radio capability ID deletion indication, Pending NSSAI, Ciphering key data, CAG information list, Truncated 5G-S-TMSI configuration, Negotiated WUS assistance information, Negotiated NB-N1 mode DRX parameters and Extended rejected NSSAI.
- Registration Complete message: This message is sent from the UE 3 to the AMF 70. In addition to the parameters that are disclosed by aspects in this disclosure, the following parameter may be included together in the Registration Complete message.
  - SOR transparent container.
- Authentication Request message: This message is sent from the AMF 70 to the UE 3. In addition to the parameters that are disclosed by aspects in this disclosure, any of the following parameters may be included together in the Authentication Request message.
  - ngKSI, ABBA, Authentication parameter RAND (5G authentication challenge), Authentication parameter AUTN (5G authentication challenge) and EAP message.
- Authentication Response message: This message is sent from the UE 3 to the AMF 70. In addition to the parameters that are disclosed by aspects in this disclosure, any of the following parameters may be populated together in the Authentication Response message.

Authentication response message identity, Authentication response parameter and EAP message.

Authentication Result message: This message is sent from the AMF 70 to the UE 3. In addition to the parameters that are disclosed by aspects in this disclosure, any of the following parameters may be populated together in the Authentication Result message.

ngKSI, EAP message and ABBA.

Authentication Failure message: This message is sent from the UE 3 to the AMF 70. In addition to the parameters that are disclosed by aspects in this disclosure, any of the following parameters may be populated together in the Authentication Failure message.

Authentication failure message identity, 5GMM cause and Authentication failure parameter.

Authentication Reject message: This message is sent from the AMF 70 to the UE 3. In addition to the parameters that are disclosed by aspects in this disclosure, the following parameter may be populated together in the Authentication Reject message.

EAP message.

Service Request message: This message is sent from the UE 3 to the AMF 70. In addition to the parameters that are disclosed by aspects in this disclosure, any of the following parameters may be populated together in the Service Request message.

ngKSI, Service type, 5G-S-TMSI, Uplink data status, PDU session status, Allowed PDU session status, NAS message container.

Service Accept message: This message is sent from the AMF 70 to the UE 3. In addition to the parameters that are disclosed by aspects in this disclosure, any of the following parameters may be populated together in the Service Accept message.

PDU session status, PDU session reactivation result, PDU session reactivation result error cause, EAP message and a T3448 value.

Service Reject message: This message is sent from the AMF 70 to the UE 3. In addition to the parameters that are disclosed by aspects in this disclosure, any of the following parameters may be populated together in the Service Reject message.

5GMM cause, PDU session status, a T3346 value, EAP message, a T3448 value and CAG information list.

Configuration Update Command message: This message is sent from the AMF 70 to the UE 3. In addition to the parameters that are disclosed by aspects in this disclosure, any of the following parameters may be populated together in the Configuration Update Command message.

Configuration update indication, 5G-GUTI, TAI list, Allowed NSSAI, Service area list, Full name for network, Short name for network, Local time zone, Universal time and local time zone, Network daylight saving time, LADN information, MICO indication, Network slicing indication, Configured NSSAI, Rejected NSSAI, Operator-defined access category definitions, SMS indication, a T3447 value, CAG information list, UE radio capability ID, UE radio capability ID deletion indication, 5GS registration result, Truncated 5G-S-TMSI configuration, Additional configuration indication and Extended rejected NSSAI.

Configuration Update Complete message: This message is sent from the UE 3 to the AMF 70. In addition to the parameters that are disclosed by aspects in this disclosure, the following parameter may be populated together in the Configuration Update Complete message.

Configuration update complete message identity.

<User Equipment (UE) >

Figure 7:
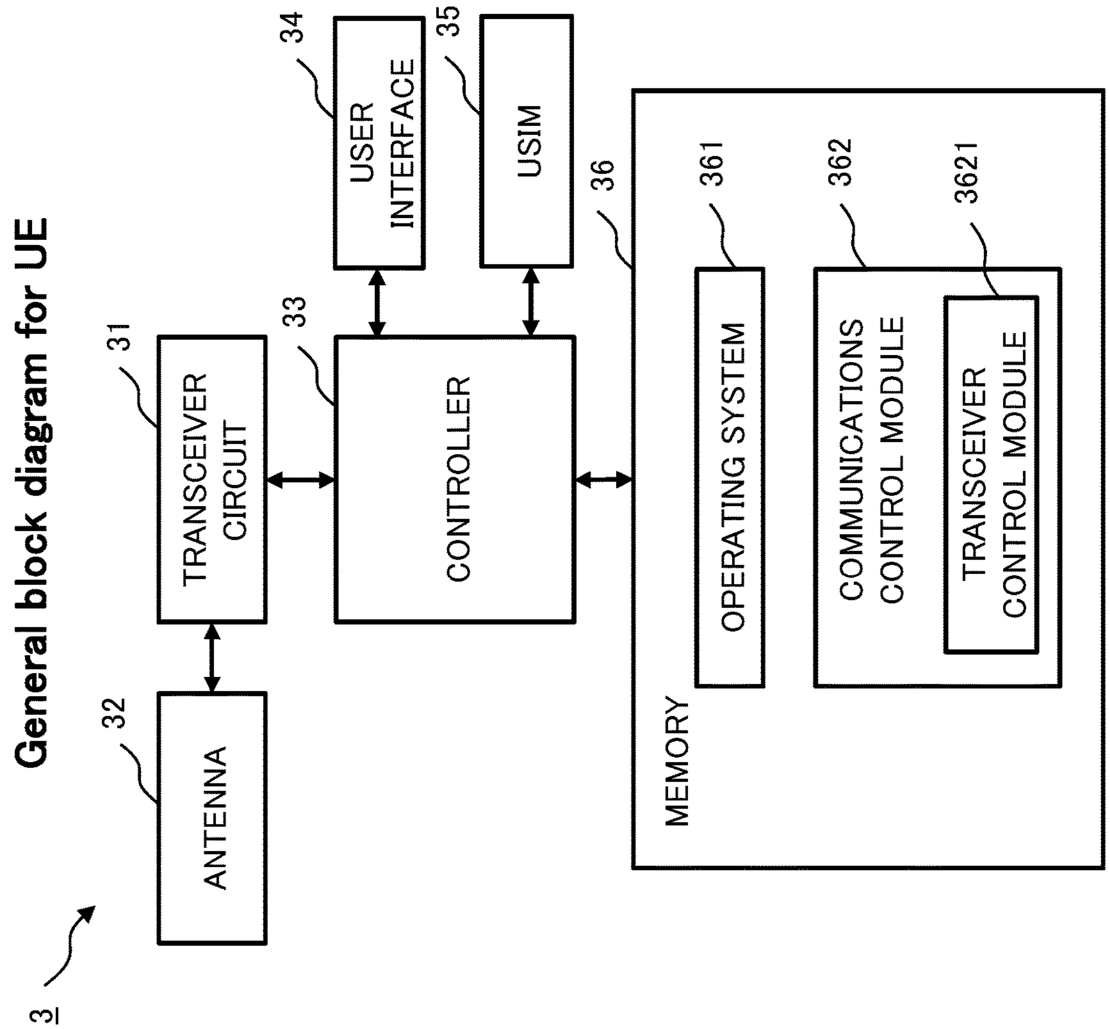
FIG. 7 is a block diagram for a User equipment (UE).

FIG. 7 is a block diagram illustrating the main components of the UE 3 (mobile device 3). As shown, the UE 3 includes a transceiver circuit 31 which is operable to transmit signals to and to receive signals from the connected node(s) via one or more antennas 32. Further, the UE 3 may include a user interface 34 for inputting information from outside or outputting information to outside. Although not necessarily shown in the Figure, the UE 3 may have all the usual functionality of a conventional mobile device and this may be provided by any one or any combination of hardware, software and firmware, as appropriate. Software may be pre-installed in the memory and/or may be downloaded via the telecommunication network or from a removable data storage device (e.g. a removable memory device (RMD)), for example. A controller 33 controls the operation of the UE 3 in accordance with software stored in a memory 36. The software includes, among other things, an operating system 361 and a communications control module 362 having at least a transceiver control module 3621. The communications control module 362 (using its transceiver control module 3621) is responsible for handling (generating/sending/receiving) signalling and uplink/downlink data packets between the UE 3 and other nodes, such as the (R) AN node 5 and the AMF 70. Such signalling may include, for example, appropriately formatted signalling messages (e.g. a registration request message and associated response messages) relating to access and mobility management procedures (for the UE 3). The controller 33 interworks with one or more Universal Subscriber Identity Module (USIM) 35. If there are multiple USIMs 35 equipped, the controller 33 may activate only one USIM 35 or may activate multiple USIMs 35 at the same time.

The UE 3 may, for example, support the Non-Public Network (NPN), The NPN may be a Stand-alone Non-Public Network (SNPN) or a Public Network Integrated NPN (PNI-NPN).

The UE 3 may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

The UE 3 may, for example, be an item of transport equipment (for example transport equipment such as: rolling stocks; motor vehicles; motor cycles; bicycles; trains; buses;

carts; rickshaws; ships and other watercraft; aircraft; rockets; satellites; drones; balloons etc.).

The UE 3 may, for example, be an item of information and communication equipment (for example information and communication equipment such as: electronic computer and related equipment; communication and related equipment; electronic components etc.).

The UE 3 may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

The UE 3 may, for example, be an electrical application system or equipment (for example an electrical application system or equipment such as: an x-ray system; a particle accelerator; radio isotope equipment; sonic equipment; electromagnetic application equipment; electronic power application equipment etc.).

The UE 3 may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

The UE 3 may, for example, be a wireless-equipped personal digital assistant or related equipment (such as a wireless card or module designed for attachment to or for insertion into another electronic device (for example a personal computer, electrical measuring machine)).

The UE 3 may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE 3 may support one or more IoT or MTC applications.

The UE 3 may be a smart phone or a wearable device (e.g. smart glasses, a smart watch, a smart ring, or a hearable device).

The UE 3 may be a car, or a connected car, or an autonomous car, or a vehicle device, or a motorcycle or V2X (Vehicle to Everything) communication module (e.g. Vehicle to Vehicle communication module, Vehicle to Infrastructure communication module, Vehicle to People communication module and Vehicle to Network communication module).

<(R)AN Node>

Figure 8:
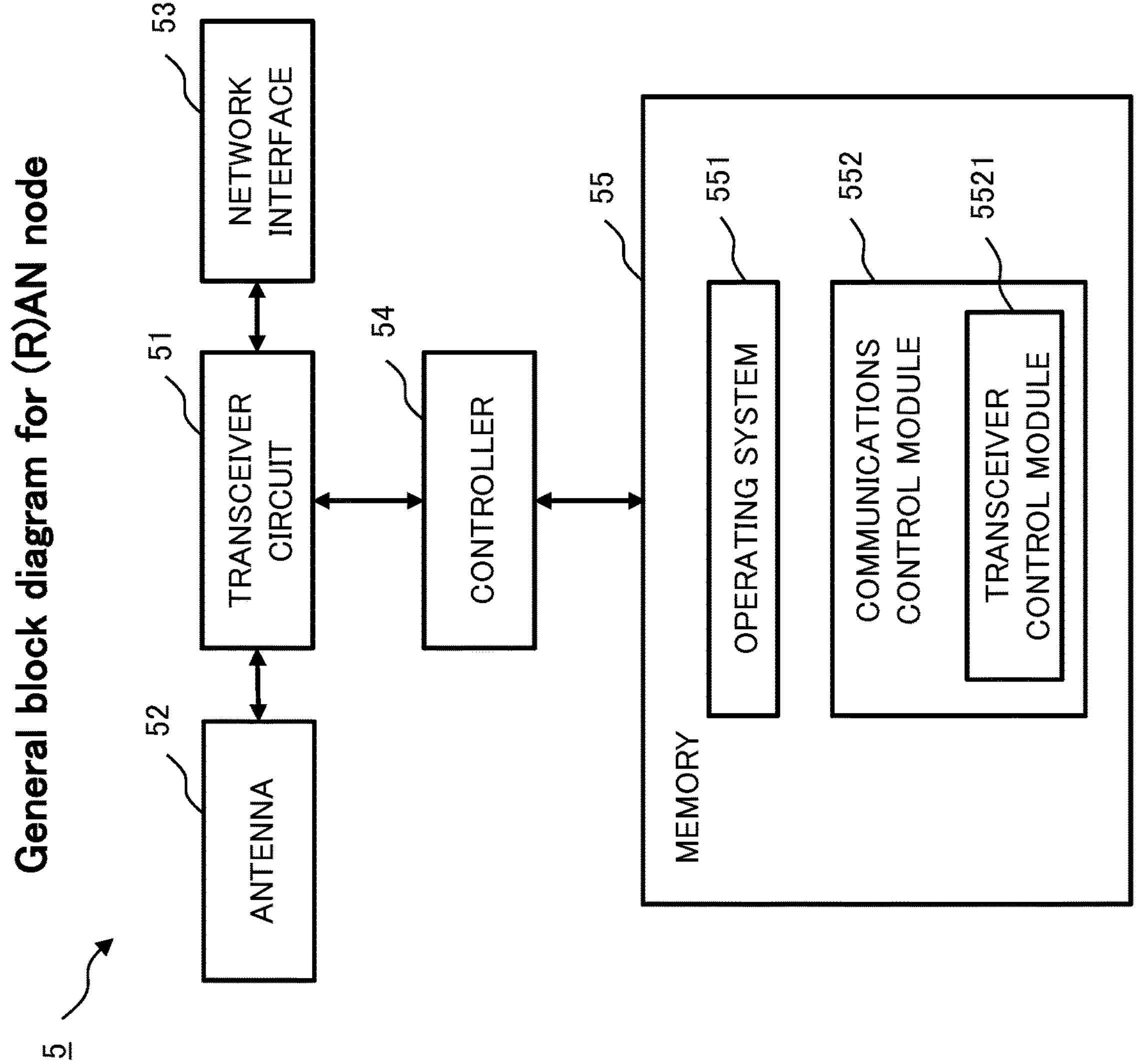
FIG. 8 is a block diagram for a (R)AN node.

FIG. 8 is a block diagram illustrating the main components of an exemplary (R)AN node 5, for example a base station ('eNB' in LTE, 'gNB' in 5G, a base station for 5G beyond, a base station for 6G). As shown, the (R)AN node 5 includes a transceiver circuit 51 which is operable to transmit signals to and to receive signals from connected UE(s) 3 via one or more antennas 52 and to transmit signals to and to receive signals from other network nodes (either directly or indirectly) via a network interface 53. A controller 54 controls the operation of the (R)AN node 5 in accordance with software stored in a memory 55. Software may be pre-installed in the memory and/or may be downloaded via the telecommunication network or from a removable data storage device (e.g an RMD), for example. The software includes, among other things, an operating system 551 and a communications control module 552 having at least a transceiver control module 5521.

The communications control module 552 (using its transceiver control sub-module) is responsible for handling (generating/sending/receiving) signalling between the (R)AN node 5 and other nodes, such as the UE 3, another (R)AN node 5, the AMF 70 and the UPF 72 (e.g. directly or indirectly). The signalling may include, for example, appropriately formatted signalling messages relating to a radio connection and a connection with the core network 7 (for a particular UE 3), and in particular, relating to connection establishment and maintenance (e.g. RRC connection establishment and other RRC messages), NG Application Protocol (NGAP) messages (i.e. messages by N2 reference point) and Xn application protocol (XnAP) messages (i.e. messages by Xn reference point), etc. Such signalling may also include, for example, broadcast information (e.g. Master Information and System information) in a sending case.

The controller 54 is also configured (by software or hardware) to handle related tasks such as, when implemented, UE mobility estimation and/or moving trajectory estimation.

The (R)AN node 5 may support the Non-Public Network (NPN), The NPN may be a Stand-alone Non-Public Network (SNPN) or a Public Network Integrated NPN (PNI-NPN).

<System Overview of (R)AN Node 5 Based on O-RAN Architecture>

Figure 9:
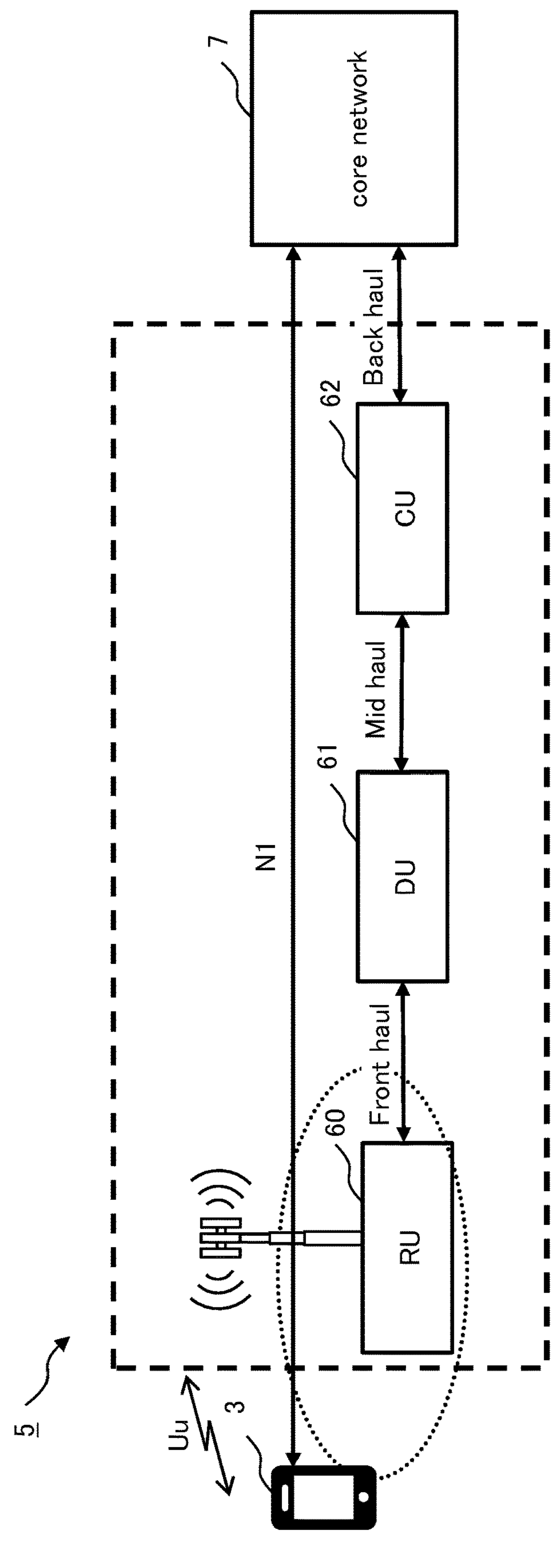
FIG. 9 illustrates System overview of (R)AN node based on O-RAN architecture.

FIG. 9 schematically illustrates a (R)AN node 5 based on O-RAN architecture to which the (R)AN node 5 aspects are applicable.

The (R)AN node 5 based on O-RAN architecture represents a system overview in which the (R)AN node is split into a Radio Unit (RU) 60, Distributed Unit (DU) 61 and Centralized Unit (CU) 62. In some aspects, each unit may be combined. For example, the RU 60 can be integrated/combined with the DU 61 as an integrated/combined unit, the DU 61 can be integrated/combined with the CU 62 as another integrated/combined unit. Any functionality in the description for a unit (e.g. one of RU 60, DU 61 and CU 62) can be implemented in the integrated/combined unit above.

Further, CU 62 can separate into two functional units such as CU Control plane (CP) and CU User plane (UP). The CU CP has a control plane functionality in the (R)AN node 5. The CU UP has a user plane functionality in the (R)AN node 5. Each CU CP is connected to the CU UP via an appropriate interface (such as the so-called “E1” interface and/or the like).

The UE 3 and a respective serving RU 60 are connected via an appropriate air interface (for example the so-called “Uu” interface and/or the like). Each RU 60 is connected to the DU 61 via an appropriate interface (such as the so-called “Front haul”, “Open Front haul”, “F1” interface and/or the like). Each DU 61 is connected to the CU 62 via an appropriate interface (such as the so-called “Mid haul”, “Open Mid haul”, “E2” interface and/or the like). Each CU 62 is also connected to nodes in the core network 7 (such as the so-called core network nodes) via an appropriate interface (such as the so-called “Back haul”, “Open Back haul”, “N2”/“N3” interface(s) and/or the like). In addition, a user plane part of the DU 61 can also be connected to the core network nodes 7 via an appropriate interface (such as the so-called “N3” interface(s) and/or the like).

Depending on functionality split among the RU 60, DU 61 and CU 62, each unit provides some of the functionality that is provided by the (R)AN node 5. For example, the RU 60 may provide a functionality to communicate with a UE 3 over air interface, the DU 61 may provide functionalities to support MAC layer and RLC layer, the CU 62 may provide functionalities to support PDCP layer, SDAP layer and RRC layer.

<Radio Unit (RU)>

Figure 10:
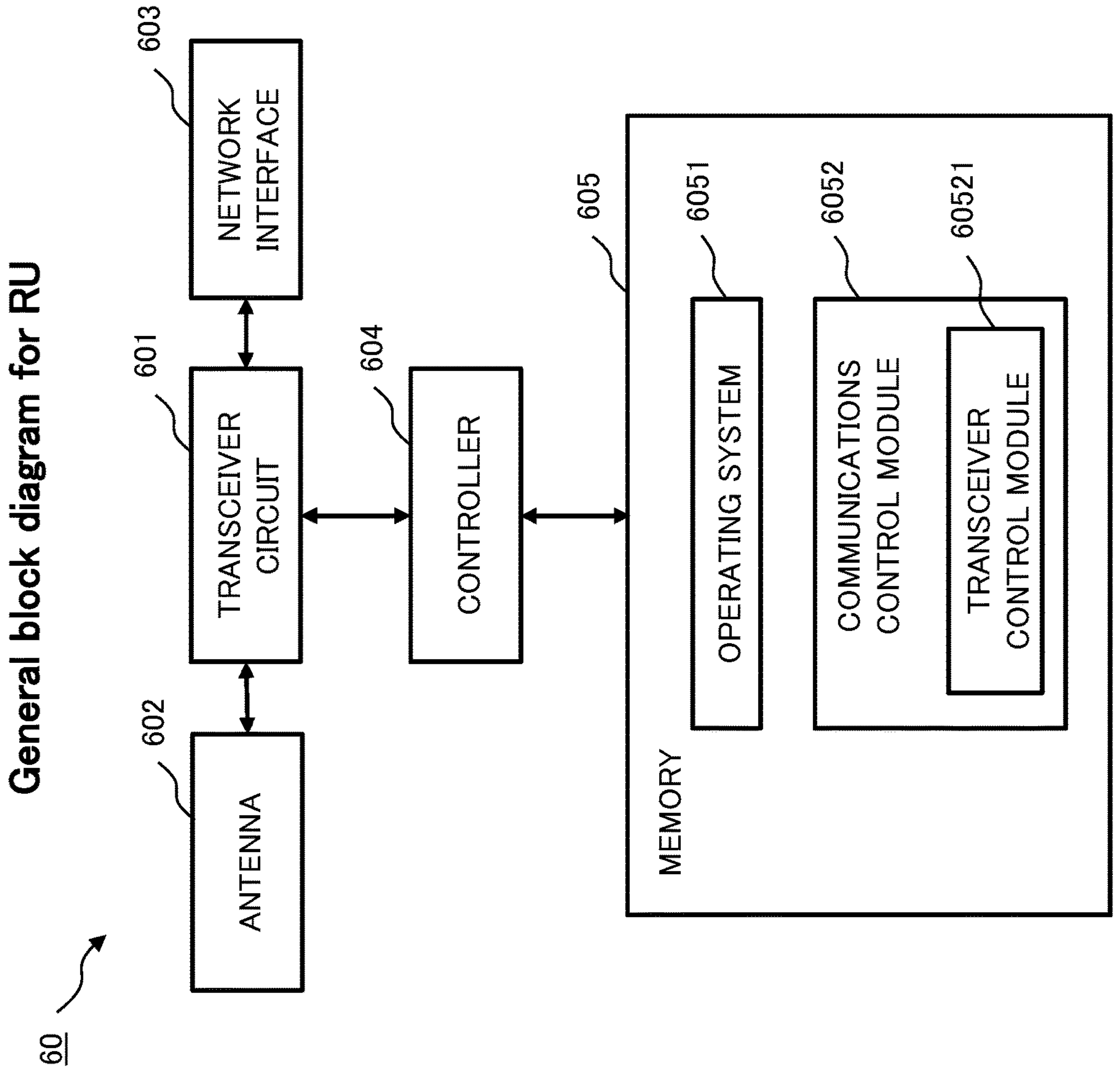
FIG. 10 is a block diagram for a Radio Unit (RU).

FIG. 10 is a block diagram illustrating the main components of an exemplary RU 60, for example a RU part of base station ('eNB' in LTE, ‘gNB’ in 5G, a base station for 5G beyond, a base station for 6G). As shown, the RU 60 includes a transceiver circuit 601 which is operable to transmit signals to and to receive signals from connected UE(s) 3 via one or more antennas 602 and to transmit signals to and to receive signals from other network nodes or network unit (either directly or indirectly) via a network interface 603. A controller 604 controls the operation of the RU 60 in accordance with software stored in a memory 605. Software may be pre-installed in the memory and/or may be downloaded via the telecommunication network or from a removable data storage device (e.g. a removable memory device (RMD)), for example. The software includes, among other things, an operating system 6051 and a communications control module 6052 having at least a transceiver control module 60521.

The communications control module 6052 (using its transceiver control sub-module) is responsible for handling (generating/sending/receiving) signalling between the RU 60 and other nodes or units, such as the UE 3, another RU 60 and DU 61 (e.g. directly or indirectly). The signalling may include, for example, appropriately formatted signalling messages relating to a radio connection and a connection with the RU 60 (for a particular UE 3), and in particular, relating to MAC layer and RLC layer.

The controller 604 is also configured (by software or hardware) to handle related tasks such as, when implemented, UE mobility estimates and/or moving trajectory estimation.

The RU 60 may support the Non-Public Network (NPN), The NPN may be a Stand-alone Non-Public Network (SNPN) or a Public Network Integrated NPN (PNI-NPN).

As described above, the RU 60 can be integrated/combined with the DU 61 as an integrated/combined unit. Any functionality in the description for the RU 60 can be implemented in the integrated/combined unit above.

<Distributed Unit (DU)>

Figure 11:
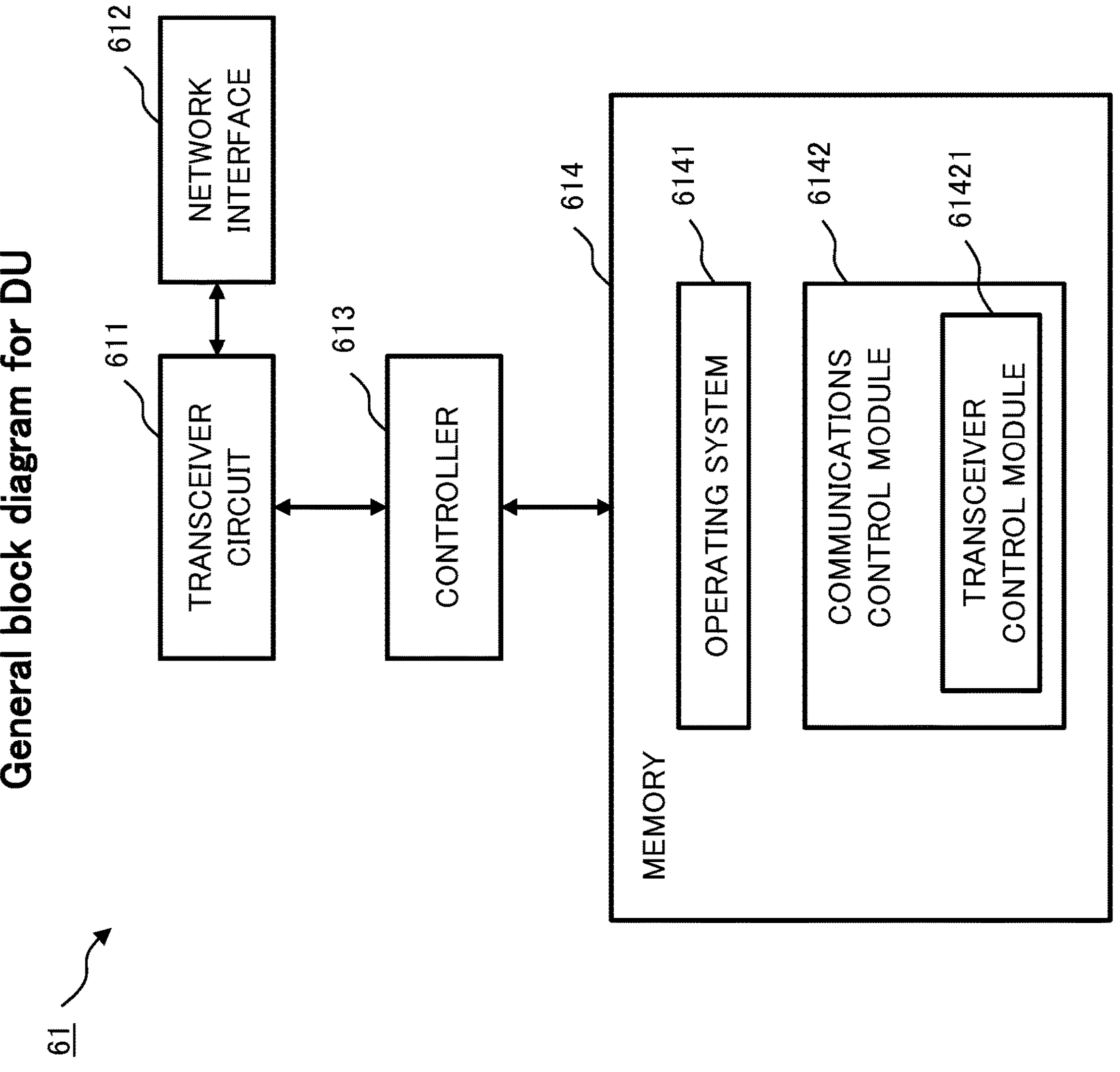
FIG. 11 is a block diagram for a Distributed Unit (DU).

FIG. 11 is a block diagram illustrating the main components of an exemplary DU 61, for example a DU part of a base station ('eNB' in LTE, ‘gNB’ in 5G, a base station for 5G beyond, a base station for 6G). As shown, the apparatus includes a transceiver circuit 611 which is operable to transmit signals to and to receive signals from other nodes or units (including the RU 60) via a network interface 612. A controller 613 controls the operation of the DU 61 in accordance with software stored in a memory 614. Software may be pre-installed in the memory 614 and/or may be downloaded via the telecommunication network or from a removable data storage device (e.g. a removable memory device (RMD)), for example. The software includes, among other things, an operating system 6141 and a communications control module 6142 having at least a transceiver control module 61421. The communications control module 6142 (using its transceiver control module 61421 is responsible for handling (generating/sending/receiving) signalling between the DU 61 and other nodes or units, such as the RU 60 and other nodes and units.

The DU 61 may support the Non-Public Network (NPN), The NPN may be a Stand-alone Non-Public Network (SNPN) or a Public Network Integrated NPN (PNI-NPN).

As described above, the DU 61 can be integrated/combined with the RU 60 or CU 62 as an integrated/combined unit. Any functionality in the description for DU 61 can be implemented in one of the integrated/combined unit above.

<Centralized Unit (CU)>

FIG. 12 is a block diagram illustrating the main components of an exemplary CU 62, for example a CU part of base station ('eNB' in LTE, ‘gNB’ in 5G, a base station for 5G beyond, a base station for 6G). As shown, the apparatus includes a transceiver circuit 621 which is operable to transmit signals to and to receive signals from other nodes or units (including the DU 61) via a network interface 622. A controller 623 controls the operation of the CU 62 in accordance with software stored in a memory 624. Software may be pre-installed in the memory 624 and/or may be downloaded via the telecommunication network or from a removable data storage device (e.g. a removable memory device (RMD)), for example. The software includes, among other things, an operating system 6241 and a communications control module 6242 having at least a transceiver control module 62421. The communications control module 6242 (using its transceiver control module 62421 is responsible for handling (generating/sending/receiving) signalling between the CU 62 and other nodes or units, such as the DU 61 and other nodes and units.

The CU 62 may support the Non-Public Network (NPN), The NPN may be a Stand-alone Non-Public Network (SNPN) or a Public Network Integrated NPN (PNI-NPN).

As described above, the CU 62 can be integrated/combined with the DU 61 as an integrated/combined unit. Any functionality in the description for the CU 62 can be implemented in the integrated/combined unit above.

<AMF>

FIG. 13 is a block diagram illustrating the main components of the AMF 70. As shown, the apparatus includes a transceiver circuit 701 which is operable to transmit signals to and to receive signals from other nodes (including the UE 3) via a network interface 702. A controller 703 controls the operation of the AMF 70 in accordance with software stored in a memory 704. Software may be pre-installed in the memory 704 and/or may be downloaded via the telecommunication network or from a removable data storage device (e.g. a removable memory device (RMD)), for example. The software includes, among other things, an operating system 7041 and a communications control module 7042 having at least a transceiver control module 70421. The communications control module 7042 (using its transceiver control module 70421 is responsible for handling (generating/sending/receiving) signalling between the AMF 70 and other nodes, such as the UE 3 (e.g. via the (R)AN node 5) and other core network nodes (including core network nodes in the HPLMN of the UE 3 when the UE 3 is roaming-in. Such signalling may include, for example, appropriately formatted signalling messages (e.g. a registration request message and associated response messages) relating to access and mobility management procedures (for the UE 3).

The AMF 70 may support the Non-Public Network (NPN), The NPN may be a Stand-alone Non-Public Network (SNPN) or a Public Network Integrated NPN (PNI-NPN).

<SMF>

FIG. 14 is a block diagram illustrating the main components of the SMF 71. As shown, the apparatus includes a transceiver circuit 711 which is operable to transmit signals to and to receive signals from other nodes (including the AMF 70) via a network interface 712. A controller 713 controls the operation of the SMF 71 in accordance with software stored in a memory 714. Software may be pre-installed in the memory 714 and/or may be downloaded via the telecommunication network or from a removable memory device (RMD), for example. The software includes, among other things, an operating system 7141 and a communications control module 7142 having at least a transceiver control module 71421. The communications control module 7142 (using its transceiver control module 71421 is responsible for handling (generating/sending/receiving) signalling between the SMF 71 and other nodes, such as the UPF 72 and other core network nodes (including core network nodes in the HPLMN of the UE 3 when the UE 3 is roaming-in. Such signalling may include, for example, appropriately formatted signalling messages (e.g. a Hypertext Transfer Protocol (HTTP) restful methods based on the service based interfaces) relating to session management procedures (for the UE 3).

The SMF 71 may support the Non-Public Network (NPN), The NPN may be a Stand-alone Non-Public Network (SNPN) or a Public Network Integrated NPN (PNI-NPN).

UPF

FIG. 15 is a block diagram illustrating the main components of the UPF 72. As shown, the apparatus includes a transceiver circuit 721 which is operable to transmit signals to and to receive signals from other nodes (including the SMF 71) via a network interface 722. A controller 723 controls the operation of the UPF 72 in accordance with software stored in a memory 724. Software may be pre-installed in the memory 724 and/or may be downloaded via the telecommunication network or from a removable data storage device (e.g. a removable memory device (RMD)), for example. The software includes, among other things, an operating system 7241 and a communications control module 7242 having at least a transceiver control module 72421. The communications control module 7242 (using its transceiver control module 72421 is responsible for handling (generating/sending/receiving) signalling between the UPF 72 and other nodes, such as the SMF 71 and other core network nodes (including core network nodes in the HPLMN of the UE 3 when the UE 3 is roaming-in. Such signalling may include, for example, appropriately formatted signalling messages (e.g. a GPRS Tunneling Protocol (GTP) for User plane) relating to User data handling (for the UE 3).

The UPF 72 may support the Non-Public Network (NPN), The NPN may be a Stand-alone Non-Public Network (SNPN) or a Public Network Integrated NPN (PNI-NPN).

PCF

Figure 16:
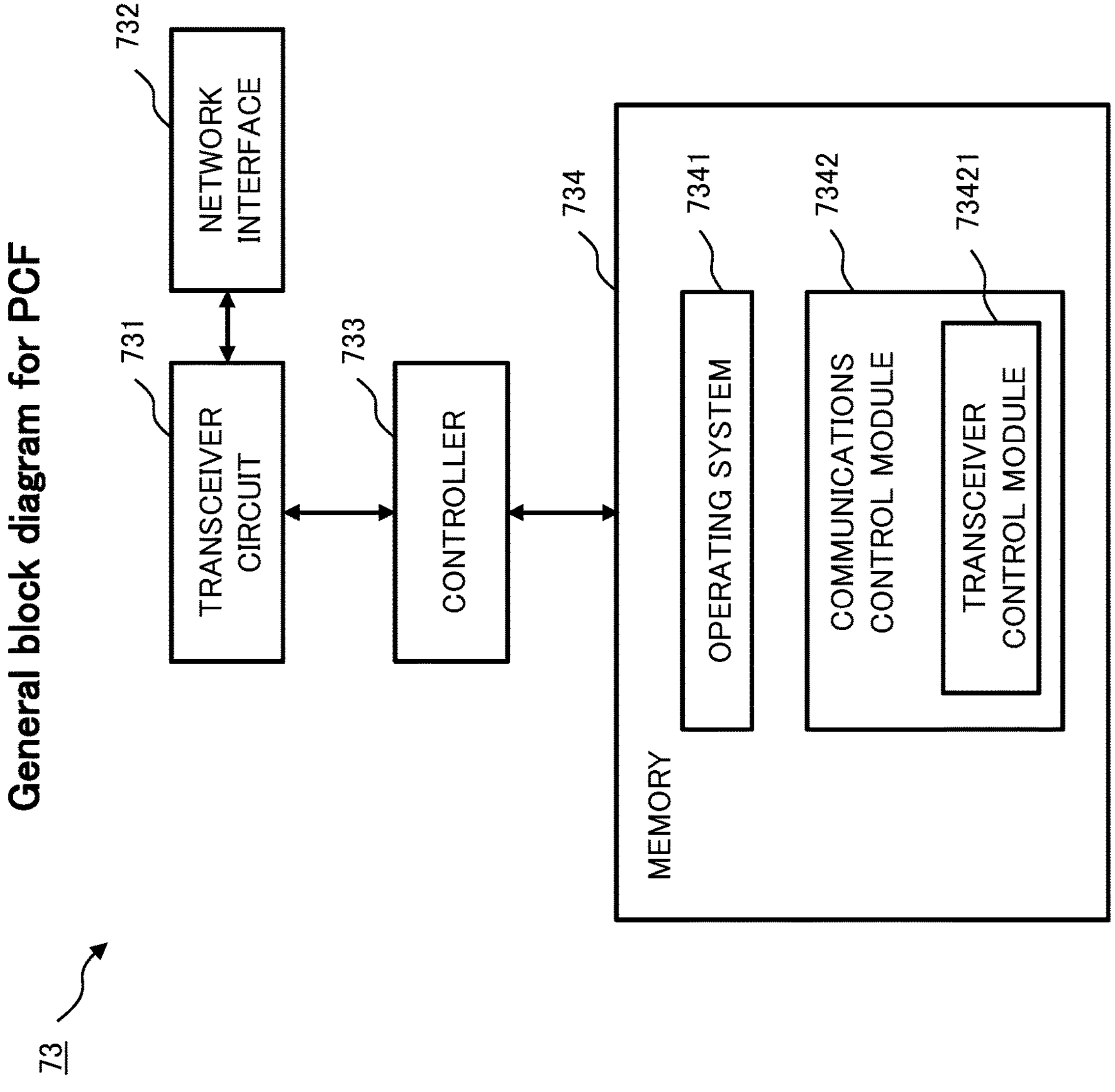
FIG. 16 is a block diagram for a PCF.

FIG. 16 is a block diagram illustrating the main components of the PCF 73. As shown, the apparatus includes a transceiver circuit 731 which is operable to transmit signals to and to receive signals from other nodes (including the AMF 70) via a network interface 732. A controller 733 controls the operation of the PCF 73 in accordance with software stored in a memory 734. Software may be pre-installed in the memory 734 and/or may be downloaded via the telecommunication network or from a removable data storage device (e.g. a removable memory device (RMD)), for example. The software includes, among other things, an operating system 7341 and a communications control module 7342 having at least a transceiver control module 73421. The communications control module 7342 (using its transceiver control module 73421 is responsible for handling (generating/sending/receiving) signalling between the PCF 73 and other nodes, such as the AMF 70 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to policy management procedures (for the UE 3).

The PCF 73 may support the Non-Public Network (NPN), The NPN may be a Stand-alone Non-Public Network (SNPN) or a Public Network Integrated NPN (PNI-NPN).

<NEF>

Figure 17:
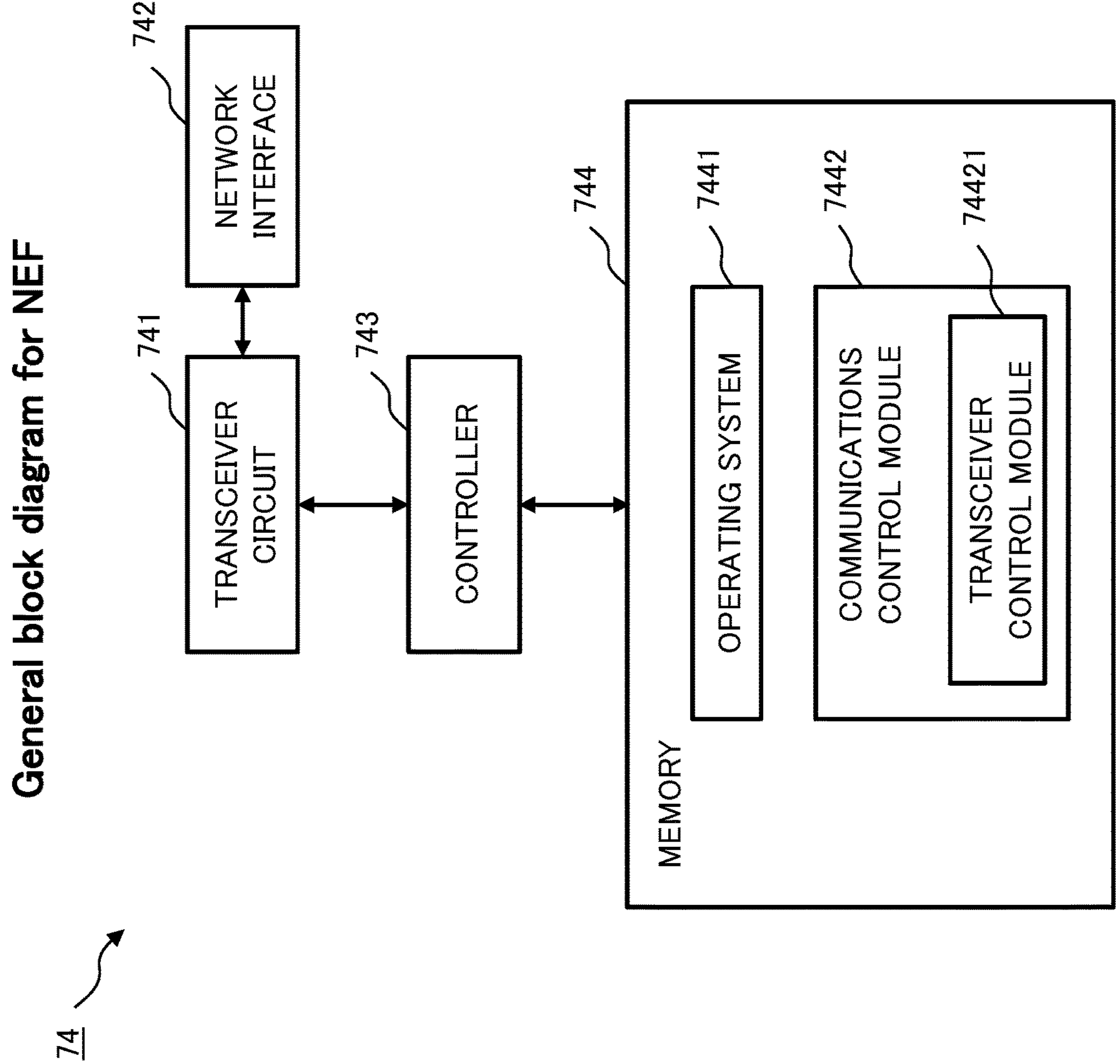
FIG. 17 is a block diagram for an NEF.

FIG. 17 is a block diagram illustrating the main components of the NEF 74. As shown, the apparatus includes a transceiver circuit 741 which is operable to transmit signals to and to receive signals from other nodes (including the UDM 75) via a network interface 742. A controller 743 controls the operation of the NEF 74 in accordance with software stored in a memory 744. Software may be pre-installed in the memory 744 and/or may be downloaded via the telecommunication network or from a removable data storage device (e.g. a removable memory device (RMD)), for example. The software includes, among other things, an operating system 7441 and a communications control module 7442 having at least a transceiver control module 74421. The communications control module 7442 (using its transceiver control module 74421 is responsible for handling (generating/sending/receiving) signalling between the NEF 74 and other nodes, such as the UDM 75 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to network exposure function procedures (for the UE 3).

The NEF 74 may support the Non-Public Network (NPN), The NPN may be a Stand-alone Non-Public Network (SNPN) or a Public Network Integrated NPN (PNI-NPN).

<UDM>

Figure 18:
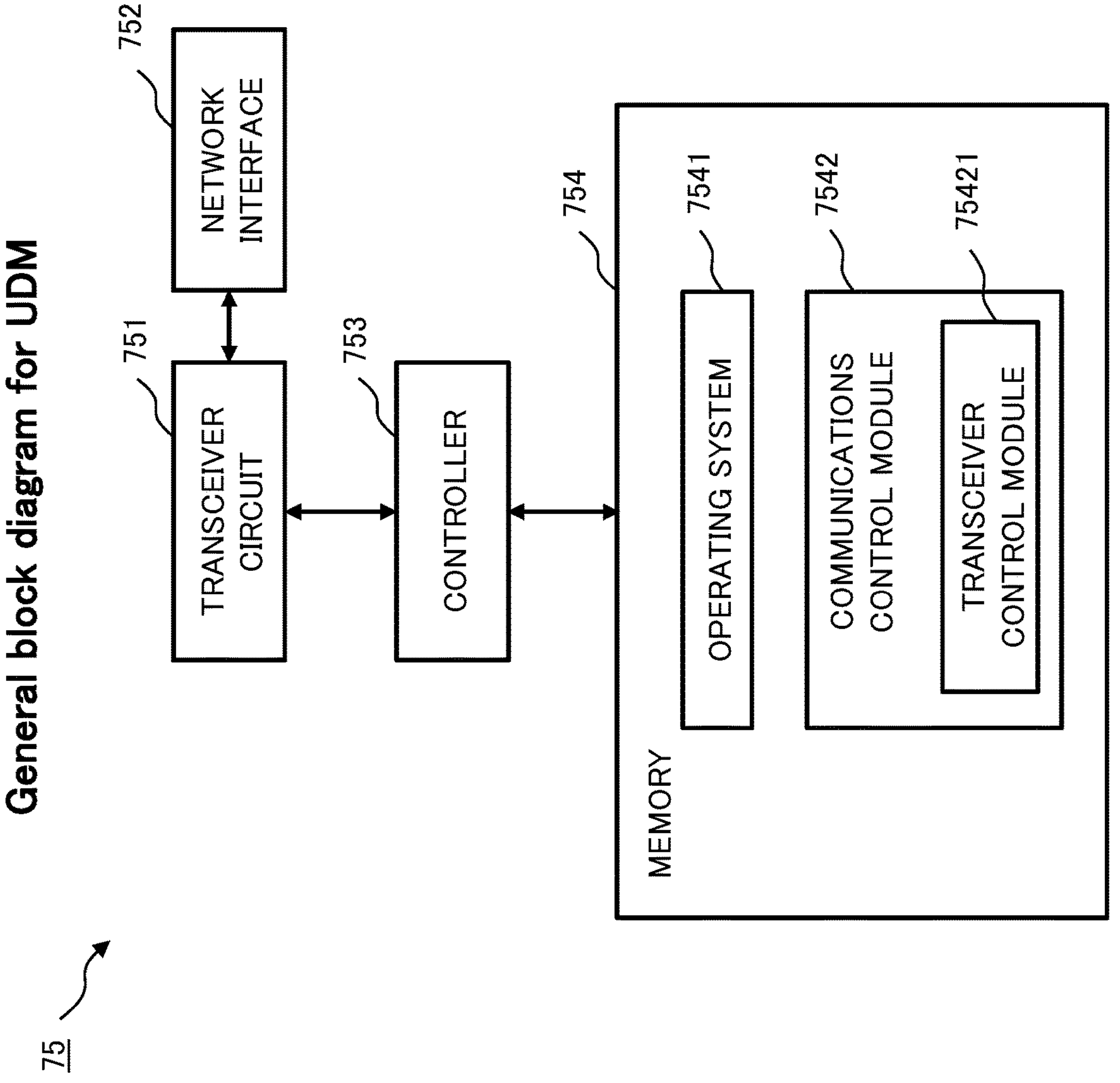
FIG. 18 is a block diagram for a UDM.

FIG. 18 is a block diagram illustrating the main components of the UDM 75. As shown, the apparatus includes a transceiver circuit 751 which is operable to transmit signals to and to receive signals from other nodes (including the AMF 70) via a network interface 752. A controller 753 controls the operation of the UDM 75 in accordance with software stored in a memory 754. Software may be pre-installed in the memory 754 and/or may be downloaded via the telecommunication network or from a removable data storage device (e.g. a removable memory device (RMD)), for example. The software includes, among other things, an operating system 7541 and a communications control module 7542 having at least a transceiver control module 75421. The communications control module 7542 (using its transceiver control module 75421 is responsible for handling (generating/sending/receiving) signalling between the UDM 75 and other nodes, such as the AMF 70 and other core network nodes (including core network nodes in the VPLMN of the UE 3 when the UE 3 is roaming-out. Such signalling may include, for example, appropriately formatted signalling messages (e.g. a HTTP restful methods based on the service based interfaces) relating to mobility management procedures (for the UE 3).

The UDM 75 may support the Non-Public Network (NPN), The NPN may be a Stand-alone Non-Public Network (SNPN) or a Public Network Integrated NPN (PNI-NPN).

<NWDAF>

Figure 19:
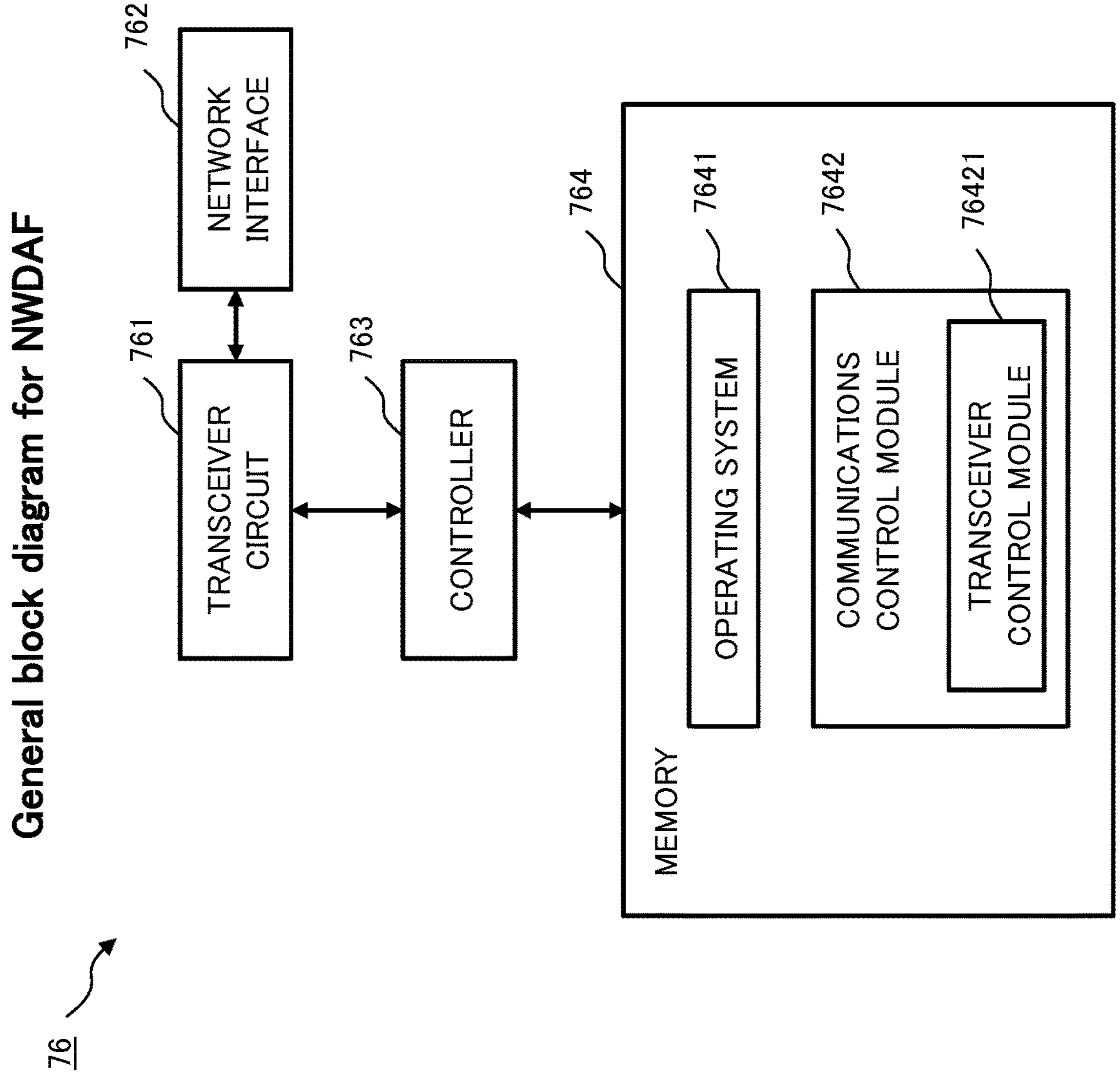
FIG. 19 is a block diagram for an NWDAF.

FIG. 19 is a block diagram illustrating the main components of the NWDAF 76. As shown, the apparatus includes a transceiver circuit 761 which is operable to transmit signals to and to receive signals from other nodes (including the AMF 70) via a network interface 762. A controller 763 controls the operation of the NWDAF 76 in accordance with the software stored in a memory 764. The Software may be pre-installed in the memory 764 and/or may be downloaded via the telecommunication network or from a removable data storage device (e.g. a removable memory device (RMD)), for example. The software includes, among other things, an operating system 7641 and a communications control module 7642 having at least a transceiver control module 76421. The communications control module 7642 (using its transceiver control module 76421 is responsible for handling (generating/sending/receiving) signalling between the NWDAF 76 and other nodes, such as the AMF 70 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to network data analytics function procedures (for the UE 3).

The NWDAF 76 may support the Non-Public Network (NPN), The NPN may be a Stand-alone Non-Public Network (SNPN) or a Public Network Integrated NPN (PNI-NPN).

NSACF

Figure 20:
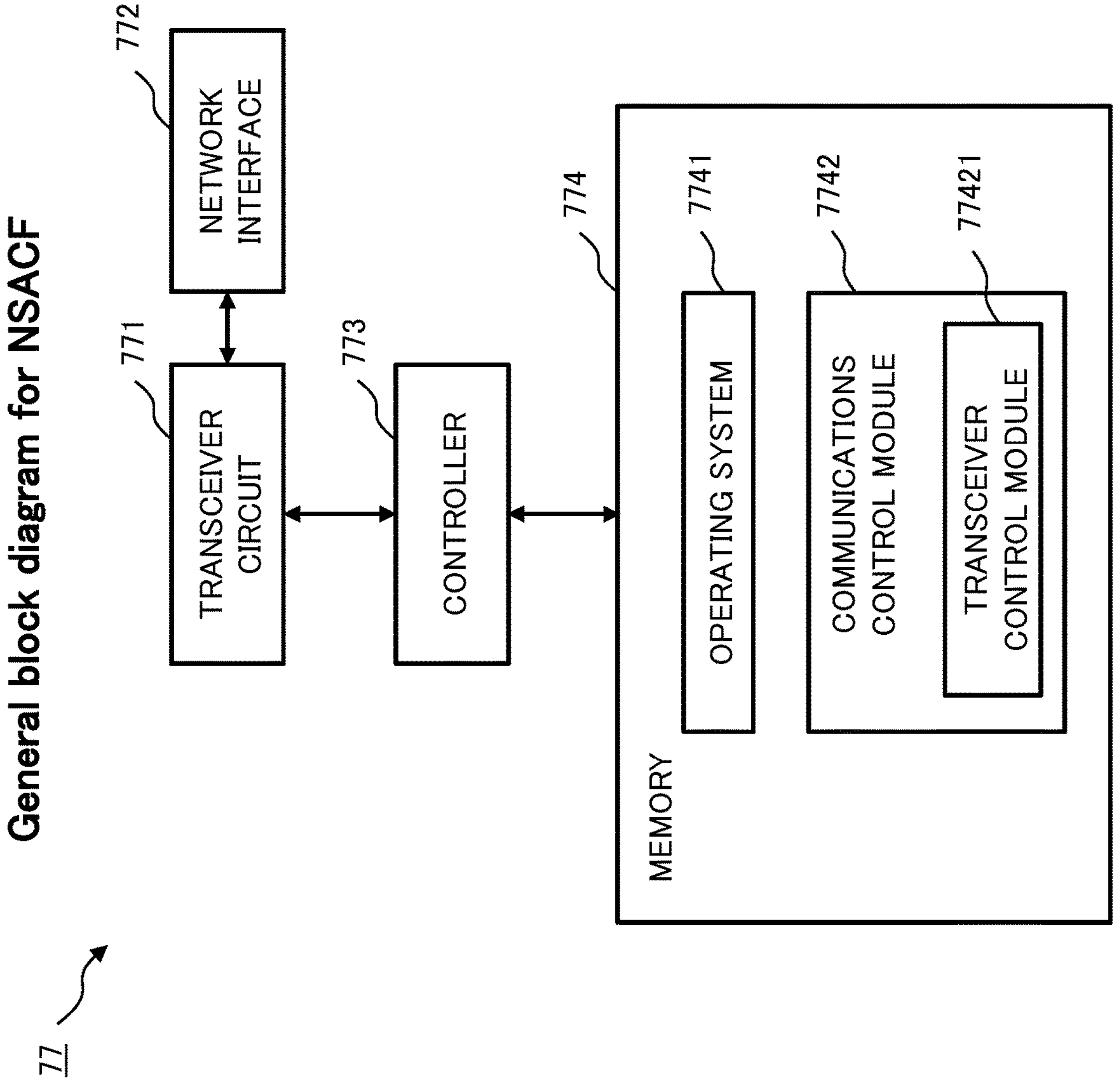
FIG. 20 is a block diagram for an NSACF.

FIG. 20 is a block diagram illustrating the main components of the NSACF 77. As shown, the apparatus includes a transceiver circuit 771 which is operable to transmit signals to and to receive signals from other nodes (including the AMF 70, SMF 71 and SMF +PGW-C) via a network interface 772. A controller 773 controls the operation of the NSACF 77 in accordance with the software stored in a memory 774. The Software may be pre-installed in the memory 774 and/or may be downloaded via the telecommunication network or from a removable data storage device (RMD), for example. The software includes, among other things, an operating system 7741 and a communications control module 7742 having at least a transceiver control module 77421. The communications control module 7742 (using its transceiver control module 77421 is responsible for handling (generating/sending/receiving) signalling between the NSACF 77 and other nodes, such as the AMF 70 and other core network nodes (including core network nodes in the HPLMN of the UE 3 when the UE 3 is roaming-in. Such signalling may include, for example, appropriately formatted signalling messages (e.g. a HTTP restful methods based on the service based interfaces) relating to network data analytics function procedures (for the UE 3).

The NSACF 77 may support the Non-Public Network (NPN), The NPN may be a Stand-alone Non-Public Network (SNPN) or a Public Network Integrated NPN (PNI-NPN).

Modifications and Alternatives

Detailed aspects have been described above. As those skilled in the art will appreciate, a number of modifications and alternatives can be made to the above aspects whilst still benefiting from the disclosures embodied therein. By way of illustration only a number of these alternatives and modifications will now be described.

In the above description, the UE 3 and the network apparatus are described for ease of understanding as having a number of discrete modules (such as the communication control modules). Whilst these modules may be provided in this way for certain applications, for example where an existing system has been modified to implement the disclosure, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above aspects, a number of software modules were described. As those skilled in the art will appreciate, the software modules may be provided in compiled or un-compiled form and may be supplied to the UE 3 and the network apparatus as a signal over a computer network, or on a recording medium. Further, the functionality performed by part or all of this software may be performed using one or more dedicated hardware circuits. However, the use of software modules is preferred as it facilitates the updating of the UE 3 and the network apparatus in order to update their functionalities.

In the above aspects, a 3GPP radio communications (radio access) technology is used. However, any other radio communications technology (e.g. WLAN, Wi-Fi, WiMAX, Bluetooth, etc.) and other fix line communications technology (e.g. BBF Access, Cable Access, optical access, etc.) may also be used in accordance with the above aspects.

Items of user equipment might include, for example, communication devices such as mobile telephones, smartphones, user equipment, personal digital assistants, laptop/tablet computers, web browsers, e-book readers and/or the like. Such mobile (or even generally stationary) devices are typically operated by a user, although it is also possible to connect so-called 'Internet of Things' (IoT) devices and similar machine-type communication (MTC) devices to the network. For simplicity, the present application refers to mobile devices (or UEs) in the description, but it will be appreciated that the technology described can be implemented on any communication devices (mobile and/or generally stationary) that can connect to a communications network for sending/receiving data, regardless of whether such communication devices are controlled by human input or software instructions stored in memory.

Various other modifications will be apparent to those skilled in the art and will not be described in further detail here.

The whole or part of the example Aspects disclosed above can be described as, but not limited to, the following.

4.2.11.2 Number of UEs per network slice availability check and update procedure The number of UEs per network slice availability check and update procedure is to update (i.e. increase or decrease) the number of UEs registered with a S-NSSAI which is subject to NSAC. The AMF is configured with the information indicating which network slice is subject to NSAC.

Figure 21:
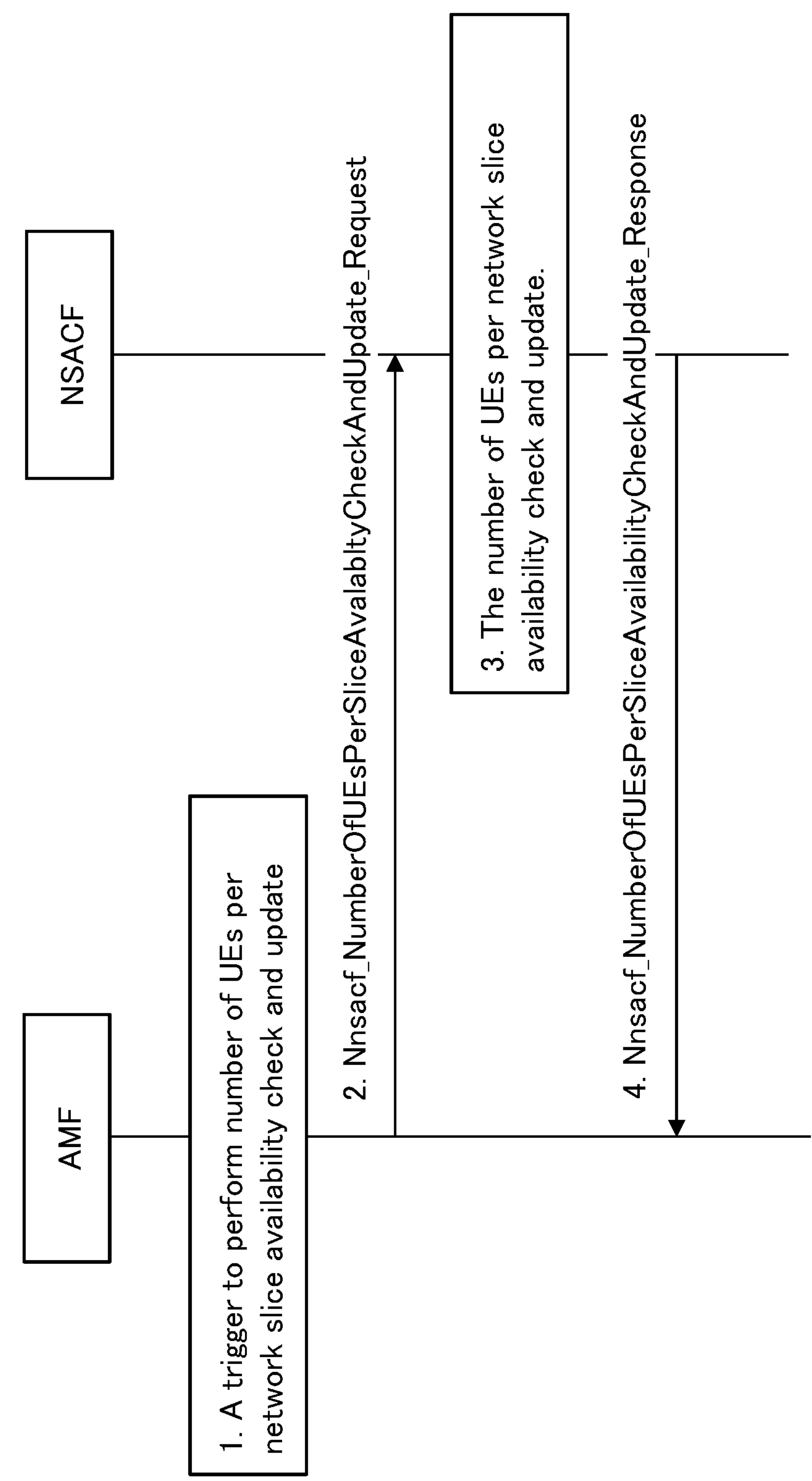
FIG. 21 illustrates Number of UEs per network slice availability check and update procedure.

FIG. 4.2.11.2-1: Number of UEs per network slice availability check and update procedure (See FIG. 21)

1. If the AMF is not aware of which NSACF to communicate, the AMF performs NSACF discovery as described in clause 6.3.22 of TS 23.501 [2] and in clause 5.2.7.3.2. The AMF triggers the Number of UEs per network slice availability check and update procedure to update the number of UEs registered with a network slice when a network slice subject to NSAC is included in the Allowed NSSAI (i.e. the AMF requests to register the UE with the S-NSSAI) or removed from the Allowed NSSAI for a UE. The trigger event at the AMF also includes the change of Allowed NSSAI in case of inter-AMF mobility. The procedure is triggered in the following cases:
   - At UE Registration procedure, according to clause 4.2.2.2.2 (including Registration types of Initial Registration or Mobility Registration Update in inter-AMF mobility in CM-CONNECTED or CM-IDLE state):
     - before the Registration Accept in step 21 if the EAC mode is active; or
     - after the Registration Accept message if the EAC mode is not active;
   - At UE Deregistration procedure, as per clause 4.2.2.3, after the Deregistration procedure is completed;
   - At UE Configuration Update procedure (which may result from NSSAA procedure or subscribed S-NSSAI change):
     - before the UE Configuration Update message if the EAC mode is active; or
     - after the UE Configuration Update message if the EAC mode is not active;

NOTE 1: Depending on the deployment, there may be different NSACF for different S-NSSAI subject to NSAC, and hence, during the registration, AMF triggers the Number of UEs per network slice availability check and update procedure to multiple NSACFs.

2. The AMF sends Nnsacf_NumberOfUEsPerSliceAvailabilityCheckAndUpdate_Reque st message to the NSACF. The AMF includes in the message the UE ID, access type, the S-NSSAI(s) and the update flag which indicates whether the number of UEs registered with the S-NSSAI(s) is to be increased when the UE has gained registration to network slice(s) subject to NSAC or the number of UEs registered with the S-NSSAI(s) is to be decreased when the UE has deregistered from S-NSSAI(s) or could not renew its registration to an S-NSSAI subject to NSAC.
3. The NSACF updates the current number of UEs registered for the S-NSSAI, i.e. increases or decrease the number of UEs registered per network slice based on the information provided by the AMF in the update flag parameter.

If the update flag parameter from the AMF indicates increase, the following applies:

If the UE ID is already in the list of UEs registered with the network slice, the current number of UEs is not increased as the UE has already been counted as registered with the network slice. The NSACF creates a new entry associated with this new update and shall also temporarily maintains the old entry associated with previous update. The NSACF removes the old entry upon reception of a request having update flag indicating decrease.

NOTE 2: The use case of having two entries temporarily in the NSACF for the same UE can happen during inter-AMF mobility when there is no UE context transfer and the UE requests to register with S-NSSAI(s) subject to NSAC already used in the old AMF. The old entry in the NSACF is removed by the old AMF.

If the UE ID is not in the list of UE IDs registered with the network slice and the maximum number of UEs registered with the network slice has not been reached yet, the NSACF adds the UE ID in the list of UEs registered with the network slice and increases the current number of the UEs registered with the network slice. If the UE ID is not in the list of UEs registered with that S-NSSAI and the maximum number of UEs for that S-NSSAI has already been reached, then the NSACF returns a result parameter indicating that the maximum number of UEs registered with the network slice has been reached.

If the update flag parameter from the AMF indicates decrease and if there is only one entry associated with the UE ID, the NSACF removes the UE ID from the list of UEs registered with the network slice for each of the S-NSSAI(s) indicated in the request from the AMF and also the NSACF decreases the number of UEs per network slice that is maintained by the NSACF for each of these network slices. If there are two entries associated with the UE ID, the NSACF removes the old entry and keeps the new entry.

The NSACF takes access type into account for increasing and decreasing the number of UEs per network slice as described in clause 5.15.11.1 of TS 23.501 [2].

4. The NSACF returns the Nnsacf_NumberOfUEsPerSliceAvailabilityCheckAndUpdate_Respo nse in which the NSACF includes the S-NSSAI(s) for which the maximum number of UEs per network slice has already been reached along with a result parameter indicating that the maximum number of UEs registered with the network slice has been reached.

At UE Registration procedure, if only some of the S-NSSAIs reached the maximum number of UEs per S-NSSAI or the AMF has not received Nnsacf_NumberOfUEsPerSliceAvailabilityCheckAndUpdate_Respo nse for a certain time, the AMF sends a Registration Accept message to the UE in which the AMF includes the rejected S-NSSAI(s) in the rejected NSSAI list for which the NSACF has indicated that the maximum number of UEs per network slice has been reached or the AMF has not received Nnsacf_NumberOfUEsPerSliceAvailabilityCheckAndUpdate_Respo nse for a certain time for the S-NSSAI, and for each rejected S-NSSAI the AMF includes a reject cause set to 'maximum number of UEs per network slice reached' and optionally a back-off timer.

When for all the Requested S-NSSAI(s) provided in step 2 the NSACF returned the maximum number of UEs per network slice has been reached and if one or more subscribed S-NSSAIs are marked as default in the subscription data and not subject to Network Slice Admission Control, the AMF can decide to include these Default Subscribed S-NSSAIs in the Allowed NSSAI. Otherwise, the AMF rejects the UE request for registration. In the Registration Reject message the AMF includes the rejected S-NSSAI(s) in the rejected NSSAI parameter, and for each rejected S-NSSAI the AMF includes a reject cause to indicate that the maximum number of UEs per network slice has been reached and optionally a back-off timer.

NOTE 3: If the use case requires the UE to remain reachable at all times with at least one slice, it is recommended that at least one of the Subscribed S-NSSAIs is marked as the default S-NSSAI which is not subject to Network Slice Admission Control. This will ensure the UE is able to access to services even when maximum number of UEs per network slice has been reached.

Editor's note: It is FFS whether and how to restrict the signalling sent from the AMFs to the NSACF in case the maximum number of UEs has been reached for prolonged time.

While the disclosure has been particularly shown and described with reference to exemplary Aspects thereof, the disclosure is not limited to these Aspects. It will be understood by those of ordinary skill in the art that various changes in form and details may be made therein without departing from the spirit and scope of the present disclosure as defined by this document. For example, the Aspects above are not limited to 5GS, and the Aspects are also applicable to communication system other than 5GS (e.g., 6G system, 5G beyond system).

The whole or part of the example Aspects disclosed above can be described as, but not limited to, the following supplementary notes.

First Supplementary Notes supplementary note 1. A method of a core network apparatus comprising:

receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

receiving a Registration Request message, wherein the Registration Request message includes the S-NSSAI;

sending an Nnsacf_NumberOfUEsPerSliceAvailabilityCheckAndUpdate_Reque st message;

starting a first timer in a case of sending the Nnsacf_NumberOfUEsPerSliceAvailabilityCheckAndUpdate_Reque st message; and sending a Non-Access Stratum (NAS) message in a case where the core network apparatus does not receive an Nnsacf_NumberOfUEsPerSliceAvailabilityCheckAndUpdate_Respo nse message until the first timer expires, wherein the NAS message includes a value of a second timer to suppress registration procedure for the S-NSSAI.

supplementary note 2. The method according to supplementary note 1, further comprising:

receiving the Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating whether registration of a User Equipment (UE) to a Network Slice Admission Control Function (NSACF) apparatus is successful;

sending another Nnsacf_NumberOfUEsPerSliceAvailabilityCheckAndUpdate_Reque st message to decrease the number of UEs for the S-NSSAI in a case where the information indicating that the registration of the User Equipment to the NSACF apparatus is not successful; and sending a message in a case where the information indicating that the registration of the User Equipment to the NSACF apparatus is successful, wherein the message includes Allowed NSSAI including the S-NSSAI.

supplementary note 3. The method according to supplementary note 1, further comprising:

receiving the Nnsacf_NumberOfUEsPerSliceAvailabilityCheckAndUpdate_Response message, wherein the Nnsacf_NumberOfUEsPerSliceAvailabilityCheckAndUpdate_Response message includes information indicating a User Equipment (UE); and sending another Nnsacf_NumberOfUEsPerSliceAvailabilityCheckAndUpdate_Request message to decrease the number of UEs for the S-NSSAI in a case where the core network apparatus does not have UE context of the UE.

supplementary note 4. The method according to supplementary note 1, wherein the NAS message is sent in a case where the first timer expires and the core network apparatus receives a response to the Nnsacf_NumberOfUEsPerSliceAvailabilityCheckAndUpdate_Reque st message.

supplementary note 5. The method according to supplementary note 1, further comprising:

sending the Nnsacf_NumberOfUEsPerSliceAvailabilityCheckAndUpdate_Reque st message in a case where the first timer expires.

supplementary note 6. A method of a core network apparatus comprising:

receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

receiving a Registration Request message,
wherein the Registration Request message includes the S-NSSAI;
sending an Nnsacf_NumberOfUEsPerSliceAvailabilityCheckAndUpdate_Reque st message;
starting a timer in a case of sending the Nnsacf_NumberOfUEsPerSliceAvailabilityCheckAndUpdate_Reque st message;
sending a Non-Access Stratum (NAS) message in a case where the core network apparatus does not receive an Nnsacf_NumberOfUEsPerSliceAvailabilityCheckAndUpdate_Respo nse message until the timer expires,
wherein the NAS message includes Allowed NSSAI including the S-NSSAI;
receiving the Nnsacf_NumberOfUEsPerSliceAvailabilityCheckAndUpdate_Respo nse message,
wherein the Nnsacf_NumberOfUEsPerSliceAvailabilityCheckAndUpdate_Respo nse message includes information indicating that registration of a User Equipment (UE) to a Network Slice Admission Control Function (NSACF) apparatus is not successful; and
sending a message in a case where the UE has the Allowed NSSAI,
wherein the message includes rejected NSSAI including the S-NSSAI.

supplementary note 7. A method of a core network apparatus comprising:
receiving an Nnsacf_NumberOfUEsPerSliceEACNotify message,
wherein the Nnsacf_NumberOfUEsPerSliceEACNotify message includes Single Network Slice Selection Assistance Information (S-NSSAI) and information indicating that Early Admission Control (EAC) mode is activated;
receiving a Registration Request message from a User Equipment (UE),
wherein the Registration Request message includes the S-NSSAI;
sending an Nnsacf_NumberOfUEsPerSliceAvailabilityCheckAndUpdate_Reque st message;
starting a timer in a case of sending the Nnsacf_NumberOfUEsPerSliceAvailabilityCheckAndUpdate_Reque st message;
sending a Non-Access Stratum (NAS) message in a case where the core network apparatus determines that the UE does not support a Network Slice Admission Control, wherein the NAS message includes Allowed NSSAI including the S-NSSAI;
receiving an Nnsacf_NumberOfUEsPerSliceAvailabilityCheckAndUpdate_Respo nse message,
wherein the Nnsacf_NumberOfUEsPerSliceAvailabilityCheckAndUpdate_Respo nse message includes information indicating that registration of the UE to a Network Slice Admission Control Function (NSACF) apparatus is not successful; and
sending a message in a case where the UE has the Allowed NSSAI,
wherein the message includes rejected NSSAI including the S-NSSAI.

supplementary note 8. A method of a core network apparatus comprising:
receiving an Nnsacf_NumberOfUEsPerSliceEACNotify message,
wherein the Nnsacf_NumberOfUEsPerSliceEACNotify message includes Single Network Slice Selection Assistance Information (S-NSSAI) and information indicating that Early Admission Control (EAC) mode is deactivated;
receiving a Registration Request message,
wherein the Registration Request message includes the S-NSSAI;
sending a first message,
wherein the first message includes Allowed NSSAI including the S-NSSAI;
sending an Nnsacf_NumberOfUEsPerSliceAvailabilityCheckAndUpdate_Reque st message;
receiving an Nnsacf_NumberOfUEsPerSliceAvailabilityCheckAndUpdate_Respo nse message,
wherein the Nnsacf_NumberOfUEsPerSliceAvailabilityCheckAndUpdate_Respo nse message includes information indicating whether registration of a User Equipment (UE) to a Network Slice Admission Control Function (NSACF) apparatus is successful; and
sending a second message in a case where the information indicating that the registration of the UE to the NSACF apparatus is not successful,
wherein the second message includes Rejected NSSAI including the S-NSSAI.

supplementary note 9. The method according to supplementary note 8, further comprising:
sending a third message in a case where the core network apparatus does not receive the Nnsacf_NumberOfUEsPerSliceAvailabilityCheckAndUpdate_Respo nse message,
wherein the third message includes Rejected NSSAI including the S-NSSAI.

supplementary note 10. The method according to supplementary note 8, further comprising:
starting a timer in a case of sending the Nnsacf_NumberOfUEsPerSliceAvailabilityCheckAndUpdate_Reque st message; and
sending the Nnsacf_NumberOfUEsPerSliceAvailabilityCheckAndUpdate_Reque st message in a case where the core network apparatus does not
receive the Nnsacf_NumberOfUEsPerSliceAvailabilityCheckAndUpdate_Respo nse message until the timer expires.

supplementary note 11. A method of a User Equipment (UE) comprising:
sending a Registration Request message,
wherein the Registration Request message includes Single Network Slice Selection Assistance Information (S-NSSAI);
receiving a Non-Access Stratum (NAS) message in a case where there is no response regarding a registration of the UE to a Network Slice Admission Control Function (NSACF) apparatus,
wherein the NAS message includes a value of a timer to suppress registration procedure for the S-NSSAI; and
retaining the registration procedure until the timer expires.

supplementary note 12. A method of a core network apparatus comprising:
receiving an Nnsacf_NumberOfUEsPerSliceEACNotify message,
wherein the Nnsacf_NumberOfUEsPerSliceEACNotify message includes Single Network Slice Selection Assistance Information (S-NSSAI) and information indicating that Early Admission Control (EAC) mode is deactivated;
receiving a Registration Request message, wherein the Registration Request message includes the S-NSSAI;

sending a message, wherein the message includes Allowed NSSAI including the S-NSSAI;

sending an Nnsacf_NumberOfUEsPerSliceAvailability-CheckAndUpdate_Reque st message;

starting a first timer in a case of sending the Nnsacf_NumberOfUEsPerSliceAvailabilityCheckAndUpdate_Reque st message; and sending a Non-Access Stratum (NAS) message in a case where the core network apparatus does not receive an Nnsacf_NumberOfUEsPerSliceAvailabilityCheck-AndUpdate_Respo nse message until the first timer expires, wherein the NAS message includes a value of a second timer to suppress registration procedure for the S-NSSAI and rejected NSSAI including the S-NSSAI.

supplementary note 13. The method according to supplementary note 12, further comprising:

receiving the Nnsacf_NumberOfUEsPerSliceAvailabilityCheckAndUpdate_Respo nse message, wherein the Nnsacf_NumberOfUEsPerSliceAvailability-CheckAndUpdate_Respo nse message includes information indicating that registration of a User Equipment (UE) to a Network Slice Admission Control Function (NSACF) apparatus is successful; and sending another message in a case of receiving the Nnsacf_NumberOfUEsPerSliceAvailabilityCheck-AndUpdate_Respo nse message, wherein the another message includes the Allowed NSSAI including the S-NSSAI.

supplementary note 14. The method according to supplementary note 12, wherein the NAS message is sent in a case where the core network apparatus does not receive the Nnsacf_NumberOfUEsPerSliceAvailabilityCheckAndUpdate_Respo nse message until the first timer expires and there is no response after the core network apparatus sends another Nnsacf_NumberOfUEsPerSliceAvailability-CheckAndUpdate_Reque st message.

supplementary note 15. A method of a core network apparatus comprising:

receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

receiving a Registration Request message, wherein the Registration Request message includes the S-NSSAI;

sending a first message, wherein the first message includes information indicating that registration of a User Equipment (UE) for the S-NSSAI to a Network Slice Admission Control Function (NSACF) apparatus is pending;

sending an Nnsacf_NumberOfUEsPerSliceAvailability-CheckAndUpdate_Reque st message, wherein the Nnsacf_NumberOfUEsPerSliceAvailability-CheckAndUpdate_Reque st message includes the S-NSSAI and a request to increase the number of UEs for the S-NSSAI;

receiving an Nnsacf_NumberOfUEsPerSliceAvailability-CheckAndUpdate_Respo nse message, wherein the Nnsacf_NumberOfUEsPerSliceAvailability-CheckAndUpdate_Respo nse message includes information indicating whether the registration is successful;

sending a second message in a case where the information indicating that the registration is successful, wherein the second message includes Allowed NSSAI including the S-NSSAI; and sending a third message in a case where the information indicating that the registration is not successful, wherein the third message includes rejected NSSAI including the S-NSSAI and a value of a timer to suppress registration procedure for the S-NSSAI.

supplementary note 16. A method of a core network apparatus comprising:

receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that a Network Slice Admission Control Function (NSACF) apparatus is overloaded;

receiving a Registration Request message, wherein the Registration Request message includes the S-NSSAI; and sending a message, wherein the message includes information indicating that registration of a User Equipment (UE) for the S-NSSAI to the NSACF apparatus is pending and a value of a timer to suppress procedure related to the S-NSSAI.

supplementary note 17. A method of a core network apparatus comprising:

receiving a Protocol Data Unit (PDU) Session establishment Request message, wherein the PDU Session establishment Request message includes Single Network Slice Selection Assistance Information (S-NSSAI);

sending an Nnsacf_NumberOfPDUsPerSliceAvailability-CheckAndUpdate_Request message, wherein the Nnsacf_NumberOfPDUsPerSliceAvailabilityCheckAndUpdate_Request message includes the S-NSSAI and a request to increase the number of PDU sessions for the S-NSSAI;

starting a first timer in a case of sending the Nnsacf_NumberOfPDUsPerSliceAvailabilityCheckAndUpdate_Request message; and sending a PDU Session establishment Reject message in a case where the core network apparatus does not receive an Nnsacf_NumberOfPDUsPerSliceAvailabilityCheckAndUpdate_Response message until the first timer expires, wherein the PDU Session establishment Reject message includes a value of a second timer to suppress procedure for establishing a PDU Session for the S-NSSAI.

supplementary note 18. The method according to supplementary note 17, further comprising:

receiving an Nnsacf_NumberOfPDUsPerSliceAvailabilityCheckAndUpdate_Response message indicating that the number of PDU sessions for the S-NSSAI successfully increased; and sending another Nnsacf_NumberOfPDUsPerSliceAvailabilityCheckAndUpdate_Request message, wherein the another Nnsacf_NumberOfPDUsPerSliceAvailabilityCheckAndUpdate_Request message includes the S-NSSAI and a request to decrease the number of PDU sessions for the S-NSSAI.

supplementary note 19. The method according to supplementary note 17, further comprising:

receiving an Nnsacf_NumberOfPDUsPerSliceAvailabilityCheckAndUpdate_Response message indicating that the number of PDU sessions for the S-NSSAI successfully increased; and performing Network Triggered Service Request procedure after receiving the Nnsacf_NumberOfPDUsPerSliceAvailabilityCheckAndUpdate_Response message.

supplementary note 20. A method of a core network apparatus comprising:

receiving a Protocol Data Unit (PDU) Session establishment Request message, wherein the PDU Session establishment Request message includes Single Network Slice Selection Assistance Information (S-NSSAI); and sending a PDU Session establishment Reject message in a case where the core network apparatus knows that a Network Slice Admission Control Function (NSACF) apparatus is overloaded, wherein the PDU Session establishment Reject message includes a value of a second timer to suppress procedure for establishing a PDU Session for the S-NSSAI.

supplementary note 21. A method of a User Equipment (UE) comprising:

sending a Protocol Data Unit (PDU) Session establishment Request message, wherein the PDU Session establishment Request message includes Single Network Slice Selection Assistance Information (S-NSSAI);

receiving a PDU Session establishment Reject message in a case where there is no response regarding a registration of a PDU Session to a Network Slice Admission Control Function (NSACF) apparatus, wherein the PDU Session establishment Reject message includes a value of a timer to suppress procedure for establishing a PDU Session for the S-NSSAI; and retaining the procedure until the timer expires.

supplementary note 22. A method of a User Equipment (UE) comprising:

sending a Protocol Data Unit (PDU) Session establishment Request message, wherein the PDU Session establishment Request message includes Single Network Slice Selection Assistance Information (S-NSSAI);

receiving a PDU Session establishment Reject message in a case where a Network Slice Admission Control Function (NSACF) apparatus is overloaded, wherein the PDU Session establishment Reject message includes a value of a timer to suppress procedure for establishing a PDU Session for the S-NSSAI; and retaining the procedure until the timer expires.

supplementary note 23. A core network apparatus comprising:

means for receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

means for receiving a Registration Request message, wherein the Registration Request message includes the S-NSSAI;

means for sending an Nnsacf_NumberOfUEsPerSliceAvailabilityCheckAndUpdate_Reque st message;

means for starting a first timer in a case of sending the Nnsacf_NumberOfUEsPerSliceAvailabilityCheckAndUpdate_Reque st message; and means for sending a Non-Access Stratum (NAS) message in a case where the core network apparatus does not receive an Nnsacf_NumberOfUEsPerSliceAvailabilityCheckAndUpdate_Respo nse message until the first timer expires, wherein the NAS message includes a value of a second timer to suppress registration procedure for the S-NSSAI.

supplementary note 24. The core network apparatus according to supplementary note 23, further comprising:

means for receiving the Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating whether registration of a User Equipment (UE) to a Network Slice Admission Control Function (NSACF) apparatus is successful;

means for sending another Nnsacf_NumberOfUEsPerSliceAvailabilityCheckAndUpdate_Reque st message to decrease the number of UEs for the S-NSSAI in a case where the information indicating that the registration of the User Equipment to the NSACF apparatus is not successful; and means for sending a message in a case where the information indicating that the registration of the User Equipment to the NSACF apparatus is successful, wherein the message includes Allowed NSSAI including the S-NSSAI.

supplementary note 25. The core network apparatus according to supplementary note 23, further comprising:

means for receiving the Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating a User Equipment (UE); and means for sending another Nnsacf_NumberOfUEsPerSliceAvailabilityCheckAndUpdate_Reque st message to decrease the number of UEs for the S-NSSAI in a case where the core network apparatus does not have UE context of the UE.

supplementary note 26. The core network apparatus according to supplementary note 23, wherein the NAS message is sent in a case where the first timer expires and the core network apparatus receives a response to the Nnsacf_NumberOfUEsPerSliceAvailabilityCheckAndUpdate_Reque st message.

supplementary note 27. The core network apparatus according to supplementary note 23, further comprising:

means for sending the Nnsacf_NumberOfUEsPerSliceAvailabilityCheckAndUpdate_Reque st message in a case where the first timer expires.

supplementary note 28. A core network apparatus comprising:

means for receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

means for receiving a Registration Request message, wherein the Registration Request message includes the S-NSSAI;

means for sending an Nnsacf_NumberOfUEsPerSliceAvailabilityCheckAndUpdate_Reque st message;

means for starting a timer in a case of sending the Nnsacf_NumberOfUEsPerSliceAvailabilityCheckAndUpdate_Reque st message;

means for sending a Non-Access Stratum (NAS) message in a case where the core network apparatus does not receive an Nnsacf_NumberOfUEsPerSliceAvailabilityCheckAndUpdate_Respo nse message until the timer expires, wherein the NAS message includes Allowed NSSAI including the S-NSSAI;

means for receiving the Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating that registration of a User Equipment (UE) to a Network Slice Admission Control Function (NSACF) apparatus is not successful; and means for sending a message in a case where the UE has the Allowed NSSAI, wherein the message includes rejected NSSAI including the S-NSSAI.

supplementary note 29. A core network apparatus comprising:

means for receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is activated;

means for receiving a Registration Request message from a User Equipment (UE), wherein the Registration Request message includes the S-NSSAI;

means for sending an Nnsacf_NumberOfUEsPerSliceAvailabilityCheckAndUpdate_Reque st message;

means for starting a timer in a case of sending the Nnsacf_NumberOfUEsPerSliceAvailabilityCheckAndUpdate_Reque st message;

means for sending a Non-Access Stratum (NAS) message in a case where the core network apparatus determines that the UE does not support a Network Slice Admission Control, wherein the NAS message includes Allowed NSSAI including the S-NSSAI;

means for receiving an Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating that registration of the UE to a Network Slice Admission Control Function (NSACF) apparatus is not successful; and means for sending a message in a case where the UE has the Allowed NSSAI, wherein the message includes rejected NSSAI including the S-NSSAI.

supplementary note 30. A core network apparatus comprising:

means for receiving an Nnsacf_NumberOfUEsPerSliceEACNotify message, wherein the Nnsacf_NumberOfUEsPerSliceEACNotify message includes Single Network Slice Selection Assistance Information (S-NSSAI) and information indicating that Early Admission Control (EAC) mode is deactivated;

means for receiving a Registration Request message, wherein the Registration Request message includes the S-NSSAI;

means for sending a first message, wherein the first message includes Allowed NSSAI including the S-NSSAI;

means for sending an Nnsacf_NumberOfUEsPerSliceAvailabilityCheckAndUpdate_Reque st message;

means for receiving an Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating whether registration of a User Equipment (UE) to a Network Slice Admission Control Function (NSACF) apparatus is successful; and means for sending a second message in a case where the information indicating that the registration of the UE to the NSACF apparatus is not successful, wherein the second message includes Rejected NSSAI including the S-NSSAI.

supplementary note 31. The core network apparatus according to supplementary note 30, further comprising:

means for sending a third message in a case where the core network apparatus does not receive the Nnsacf_NumberOfUEsPerSliceAvailabilityCheckAndUpdate_Respo nse message, wherein the third message includes Rejected NSSAI including the S-NSSAI.

supplementary note 32. The core network apparatus according to supplementary note 30, further comprising:

means for starting a timer in a case of sending the Nnsacf_NumberOfUEsPerSliceAvailabilityCheckAndUpdate_Reque st message; and means for sending the Nnsacf_NumberOfUEsPerSliceAvailabilityCheckAndUpdate_Reque st message in a case where the core network apparatus does not receive the Nnsacf_NumberOfUEsPerSliceAvailabilityCheckAndUpdate_Respo nse message until the timer expires.

supplementary note 33. A User Equipment (UE) comprising:

means for sending a Registration Request message, wherein the Registration Request message includes Single Network Slice Selection Assistance Information (S-NSSAI);

means for receiving a Non-Access Stratum (NAS) message in a case where there is no response regarding a registration of the UE to a Network Slice Admission Control Function (NSACF) apparatus, wherein the NAS message includes a value of a timer to suppress registration procedure for the S-NSSAI; and means for retaining the registration procedure until the timer expires.

supplementary note 34. A core network apparatus comprising:

means for receiving an Nnsacf_NumberOfUEsPerSliceE-ACNotify message, wherein the Nnsacf_NumberOfUEsPerSliceEACNotify message includes Single Network Slice Selection Assistance Information (S-NSSAI) and information indicating that Early Admission Control (EAC) mode is deactivated;

means for receiving a Registration Request message, wherein the Registration Request message includes the S-NSSAI;

means for sending a message, wherein the message includes Allowed NSSAI including the S-NSSAI;

means for sending an Nnsacf_NumberOfUEsPerSliceAvailabilityCheckAndUpdate_Reque st message;

means for starting a first timer in a case of sending the Nnsacf_NumberOfUEsPerSliceAvailabilityCheckAndUpdate_Reque st message; and means for sending a Non-Access Stratum (NAS) message in a case where the core network apparatus does not receive an Nnsacf_NumberOfUEsPerSliceAvailabilityCheckAndUpdate_Respo nse message until the first timer expires, wherein the NAS message includes a value of a second timer to suppress registration procedure for the S-NSSAI and rejected NSSAI including the S-NSSAI.

supplementary note 35. The core network apparatus according to supplementary note 34, further comprising:

means for receiving the Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating that registration of a User Equipment (UE) to a Network Slice Admission Control Function (NSACF) apparatus is successful; and means for sending another message in a case of receiving the Nnsacf_NumberOfUEsPerSliceAvailabilityCheckAndUpdate_Respo nse message, wherein the another message includes the Allowed NSSAI including the S-NSSAI.

supplementary note 36. The core network apparatus according to supplementary note 34, wherein the NAS message is sent in a case where the core network apparatus does not receive the Nnsacf_NumberOfUEsPerSliceAvailabilityCheckAndUpdate_Respo nse message until the first timer expires and there is no response after the core network apparatus sends another Nnsacf_NumberOfUEsPerSliceAvailabilityCheckAndUpdate_Reque st message.

supplementary note 37. A core network apparatus comprising:

means for receiving an Nnsacf_NumberOfUEsPerSliceE-ACNotify message, wherein the Nnsacf_NumberOfUEsPerSliceEACNotify message includes Single Network Slice Selection Assistance Information (S-NSSAI) and information indicating that Early Admission Control (EAC) mode is activated;

means for receiving a Registration Request message, wherein the Registration Request message includes the S-NSSAI;

means for sending a first message, wherein the first message includes information indicating that registration of a User Equipment (UE) for the S-NSSAI to a Network Slice Admission Control Function (NSACF) apparatus is pending;

means for sending an Nnsacf_NumberOfUEsPerSliceAvailabilityCheckAndUpdate_Reque st message, wherein the Nnsacf_NumberOfUEsPerSliceAvailabilityCheckAndUpdate_Reque st message includes the S-NSSAI and a request to increase the number of UEs for the S-NSSAI;

means for receiving an Nnsacf_NumberOfUEsPerSliceAvailabilityCheckAndUpdate_Respo nse message, wherein the Nnsacf_NumberOfUEsPerSliceAvailabilityCheckAndUpdate_Respo nse message includes information indicating whether the registration is successful;

means for sending a second message in a case where the information indicating that the registration is successful, wherein the second message includes Allowed NSSAI including the S-NSSAI; and means for sending a third message in a case where the information indicating that the registration is not successful, wherein the third message includes rejected NSSAI including the S-NSSAI and a value of a timer to suppress registration procedure for the S-NSSAI.

supplementary note 38. A core network apparatus comprising:

means for receiving an Nnsacf_NumberOfUEsPerSliceE-ACNotify message, wherein the Nnsacf_NumberOfUEsPerSliceEACNotify message includes Single Network Slice Selection Assistance Information (S-NSSAI) and information indicating that a Network Slice Admission Control Function (NSACF) apparatus is overloaded;

means for receiving a Registration Request message, wherein the Registration Request message includes the S-NSSAI; and means for sending a message, wherein the message includes information indicating that registration of a User Equipment (UE) for the S-NSSAI to the NSACF apparatus is pending and a value of a timer to suppress procedure related to the S-NSSAI.

supplementary note 39. A core network apparatus comprising:

means for receiving a Protocol Data Unit (PDU) Session establishment Request message, wherein the PDU Session establishment Request message includes Single Network Slice Selection Assistance Information (S-NSSAI);

means for sending an Nnsacf_NumberOfPDUsPerSliceAvailabilityCheckAndUpdate_Request message, wherein the Nnsacf_NumberOfPDUsPerSliceAvailabilityCheckAndUpdate_Request message includes the S-NSSAI and a request to increase the number of PDU sessions for the S-NSSAI;

means for starting a first timer in a case of sending the Nnsacf_NumberOfPDUsPerSliceAvailabilityCheckAndUpdate_Request message; and means for sending a PDU Session establishment Reject message in a case where the core network apparatus does not receive an Nnsacf_NumberOfPDUsPerSliceAvailabilityCheckAndUpdate_Response message until the first timer expires, wherein the PDU Session establishment Reject message includes a value of a second timer to suppress procedure for establishing a PDU Session for the S-NSSAI.

supplementary note 40. The core network apparatus according to supplementary note 39, further comprising:

means for receiving an Nnsacf_NumberOfPDUsPerSliceAvailabilityCheckAndUpdate_Response message indicating that the number of PDU sessions for the S-NSSAI successfully increased; and means for sending another Nnsacf_NumberOfPDUsPerSliceAvailabilityCheckAndUpdate_Request message, wherein the another Nnsacf_NumberOfPDUsPerSliceAvailabilityCheckAndUpdate_Request message includes the S-NSSAI and a request to decrease the number of PDU sessions for the S-NSSAI.

supplementary note 41. The core network apparatus according to supplementary note 39, further comprising:

means for receiving an Nnsacf_NumberOfPDUsPerSliceAvailabilityCheckAndUpdate_Response message indicating that the number of PDU sessions for the S-NSSAI successfully increased; and means for performing Network Triggered Service Request procedure after receiving the Nnsacf_NumberOfPDUsPerSliceAvailabilityCheckAndUpdate_Response message.

supplementary note 42. A core network apparatus comprising:

means for receiving a Protocol Data Unit (PDU) Session establishment Request message, wherein the PDU Session establishment Request message includes Single Network Slice Selection Assistance Information (S-NSSAI); and means for sending a PDU Session establishment Reject message in a case where the core network apparatus knows that a Network Slice Admission Control Function (NSACF) apparatus is overloaded, wherein the PDU Session establishment Reject message includes a value of a second timer to suppress procedure for establishing a PDU Session for the S-NSSAI.

supplementary note 43. A User Equipment (UE) comprising:

means for sending a Protocol Data Unit (PDU) Session establishment Request message, wherein the PDU Session establishment Request message includes Single Network Slice Selection Assistance Information (S-NSSAI);

means for receiving a PDU Session establishment Reject message in a case where there is no response regarding a registration of a PDU Session to a Network Slice Admission Control Function (NSACF) apparatus, wherein the PDU Session establishment Reject message includes a value of a timer to suppress procedure for establishing a PDU Session for the S-NSSAI; and means for retaining the procedure until the timer expires.

supplementary note 44. A User Equipment (UE) comprising:

means for sending a Protocol Data Unit (PDU) Session establishment Request message, wherein the PDU Session establishment Request message includes Single Network Slice Selection Assistance Information (S-NSSAI);

means for receiving a PDU Session establishment Reject message in a case where a Network Slice Admission Control Function (NSACF) apparatus is overloaded, wherein the PDU Session establishment Reject message includes a value of a timer to suppress procedure for establishing a PDU Session for the S-NSSAI; and means for retaining the procedure until the timer expires.

Second Supplementary Notes supplementary note 1. An Access and Mobility Management Function (AMF) device for communicating with a User equipment (UE) and a Network Slice Admission Control Function (NSACF) device, the AMF device comprising:

a receiver; and a transmitter, wherein the receiver is configured to receive, from the UE, a Registration Request message including first information indicating whether the UE supports a first function and requested Network Slice Selection Assistance Information (NSSAI), wherein the transmitter is configured to transmit, to the UE, a Non-Access Stratum (NAS) message including a rejected NSSAI including a first cause value and a back-off timer value if the UE supports the first function, and wherein the transmitter is configured to transmit, to the UE, the NAS message including a rejected NSSAI including a second cause value if the UE does not support the first function.

supplementary note 2. The AMF device according to supplementary note 1, wherein the NAS message includes a CONFIGURATION UPDATE COMMAND message if the UE has at least one Allowed NSSAI, and wherein the NAS message includes a DEREGISTRATION REQUEST message if the UE does not have any Allowed NSSAI.

supplementary note 3. The AMF device according to supplementary note 1 or supplementary note 2, wherein the first cause value indicates that Single-NSSAI (S-NSSAI) is not available due to maximum number of the UEs reached, and wherein the second cause value indicates that the S-NSSAI is not allowed in a Tracking area.

supplementary note 4. The AMF device according to any one of supplementary notes 1 to 3, wherein the first function indicates that the UE supports NSACF.

supplementary note 5. The AMF device according to any one of supplementary notes 1 to 4, wherein the AMF device transmits, to the NSACF device, a request, and wherein the AMF processes the NAS message while the AMF device is waiting for a response from the NSACF device.

supplementary note 6. The AMF device according to any one of supplementary notes 1 to 5, wherein the AMF device transmits, to the NSACF device, the Nnsacf_NumberOfUEsPerSliceAvailabilityCheckAndUpdate_Reque st message including at least one of UE ID, an access type, the S-NSSAI(s) and an update flag, and wherein the AMF device receives, from the NSACF device, an Nnsacf_NumberOfUEsPerSliceAvailabilityCheckAndUpdate_Respo nse message indicating either maximum number of the UEs registered with network slice reached or the maximum number of the UEs registered with network slice not reached.

supplementary note 7. A User equipment (UE) for communicating with an Access and Mobility Management Function (AMF) device communicating with a Network Slice Admission Control Function (NSACF) device, the UE comprising:

a receiver; and a transmitter, wherein the transmitter is configured to transmit, to the AMF device, a Registration Request message including first information indicating whether the UE supports a first function and requested Network Slice Selection Assistance Information (NSSAI), wherein the receiver is configured to receive, from the AMF device, a Non-Access Stratum (NAS) message including a rejected NSSAI including a first cause value and a back-off timer value if the UE supports the first function, and wherein the receiver is configured to receive, from the AMF device, the NAS message including a rejected NSSAI including a second cause value if the UE does not support the first function.

supplementary note 8. The UE according to supplementary note 7, wherein the NAS message includes a CONFIGURATION UPDATE COMMAND message if the UE has at least one Allowed NSSAI, and wherein the NAS message includes a DEREGISTRATION REQUEST message if the UE does not have any Allowed NSSAI.

supplementary note 9. The UE according to supplementary note 7 or 8, wherein the first cause value indicates that Single-NSSAI (S-NSSAI) is not available due to maximum number of the UEs reached, and wherein the second cause value indicates that the S-NSSAI is not allowed in a Tracking area.

supplementary note 10. The UE according to any one of supplementary notes 7 to 9, wherein the first function indicates that the UE supports NSACF.

supplementary note 11. The UE according to any one of supplementary notes 7 to 10, wherein if the UE receives the rejected NSSAI including the first cause value and the back-off timer value, the UE updates the NSSAI included in the UE based on the rejected NSSAI including the first cause and the back-off timer value.

supplementary note 12. The UE according to any one of supplementary notes 7 to 11, wherein if the UE receives the rejected NSSAI including the second cause value, the UE updates the NSSAI included in the UE based on the rejected NSSAI including the second cause.

supplementary note 13. A method of an Access and Mobility Management Function (AMF) device for communicating with a User equipment (UE) and a Network Slice Admission Control Function (NSACF) device, the method comprising:

receiving, from the UE, a Registration Request message including first information indicating whether the UE supports a first function and requested Network Slice Selection Assistance Information (NSSAI);

transmitting, to the UE, a Non-Access Stratum (NAS) message including a rejected NSSAI including a first cause value and a back-off timer value if the UE supports the first function; and transmitting, to the UE, the NAS message including a rejected NSSAI including a second cause value if the UE does not support the first function.

supplementary note 14. The method according to supplementary note 13, wherein the NAS message includes a CONFIGURATION UPDATE COMMAND message if the UE has at least one Allowed NSSAI, and wherein the NAS message includes a DEREGISTRATION REQUEST message if the UE does not have any Allowed NSSAI.

supplementary note 15. The method according to supplementary note 13 or 14, wherein the first cause value indicates that Single-NSSAI (S-NSSAI) is not available due to maximum number of the UEs reached, and wherein the second cause value indicates that the S-NSSAI is not allowed in a Tracking area.

supplementary note 16. The method according to any one of supplementary notes 13 to 15, wherein the first function indicates that the UE supports NSACF.

supplementary note 17. The method according to any one of supplementary notes 13 to 16, wherein the AMF device transmits, to the NSACF device, a request, and wherein the AMF device processes the NAS message while the AMF device is waiting for a response from the NSACF device.

supplementary note 18. The method according to any one of supplementary notes 13 to 17, wherein the AMF device transmits, to the NSACF device, an Nnsacf_NumberOfUEsPerSliceAvailabilityCheckAndUpdate_Reque st message including at least one of UE ID, an access type, the S-NSSAI(s) and an update flag, and wherein the AMF device receives, from the NSACF device, an Nnsacf_NumberOfUEsPerSliceAvailabilityCheckAndUpdate_Respo nse message indicating either maximum number of the UEs registered with network slice reached or the maximum number of the UEs registered with network slice not reached.

supplementary note 19. A method of a User equipment (UE) for communicating with an Access and Mobility Management Function (AMF) device communicating with a Network Slice Admission Control Function (NSACF) device, the method comprising:

transmitting, to the AMF device, a Registration Request message including first information indicating whether the UE supports a first function and requested Network Slice Selection Assistance Information (NSSAI);

receiving, from the AMF device, a Non-Access Stratum (NAS) message including a rejected NSSAI including a first cause value and a back-off timer value if the UE supports the first function; and receiving, from the AMF device, the NAS message including a rejected NSSAI including a second cause value if the UE does not support the first function.

supplementary note 20. The method according to supplementary note 19, wherein the NAS message includes a CONFIGURATION UPDATE COMMAND message if the UE has at least one Allowed NSSAI, and wherein the NAS message includes a DEREGISTRATION REQUEST message if the UE does not have any Allowed NSSAI.

supplementary note 21. The method according to supplementary note 19 or 20, wherein the first cause value indicates that Single-NSSAI (S-NSSAI) is not available due to maximum number of the UEs reached, and wherein the second cause value indicates that the S-NSSAI is not allowed in a Tracking area.

supplementary note 22. The method according to any one of supplementary notes 19 to 21, wherein the first function indicates that the UE supports NSACF.

supplementary note 23. The method according to any one of supplementary notes 19 to 21, wherein if the UE receives the rejected NSSAI including the first cause value and a back-off timer value, the UE updates the NSSAI included in the UE based on the rejected NSSAI including the first cause value and the back-off timer value.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Indian provisional patent application No. 202111032979, filed on Jul. 22, 2021, the disclosure of which is incorporated herein in its entirety by reference.

REFERENCE SIGNS LIST

1 telecommunication system
3 UE
5 (R)AN node
7 core network
20 data network
31 transceiver circuit
32 antenna
33 controller
34 user interface
35 USIM
36 memory
51 transceiver circuit
52 antenna
53 network interface
54 controller
55 memory
60 RU
61 DU
62 CU
70 AMF
71 SMF
72 UPF
73 PCF
74 NEF
75 UDM
76 NWDAF
77 NSACF
361 operating system
362 communications control module
551 operating system
552 communications control module
601 transceiver circuit
602 antenna
603 network interface
604 controller
605 memory
611 transceiver circuit
612 network interface
613 controller
614 memory
621 transceiver circuit
622 network interface
623 controller
624 memory
701 transceiver circuit
702 network interface
703 controller
704 memory
711 transceiver circuit
712 network interface
713 controller
714 memory
721 transceiver circuit
722 network interface
723 controller
724 memory
731 transceiver circuit
732 network interface
733 controller
734 memory
741 transceiver circuit
742 network interface
743 controller
744 memory
751 transceiver circuit
752 network interface
753 controller
754 memory
761 transceiver circuit
762 network interface
763 controller
764 memory
771 transceiver circuit
772 network interface
773 controller
774 memory
3621 transceiver control module
5521 transceiver control module
6051 operating system
6052 communications control module
6141 operating system
6142 communications control module
6241 operating system
6242 communications control module
7041 operating system
7042 communications control module
7141 operating system
7142 communications control module
7241 operating system
7242 communications control module
7341 operating system
7342 communications control module
7441 operating system
7442 communications control module
7541 operating system
7542 communications control module
7641 operating system
7642 communications control module
7741 operating system
7742 communications control module
60521 transceiver control module
61421 transceiver control module
62421 transceiver control module
70421 transceiver control module
71421 transceiver control module

72421 transceiver control module
73421 transceiver control module
74421 transceiver control module
75421 transceiver control module
76421 transceiver control module
77421 transceiver control module

What is claimed is:

1. A method of an Access and Mobility Management Function (AMF) comprising:

receiving, from a Network Slice Admission Control Function (NSACF), a message including information indicating that an Early Admission Control (EAC) mode is deactivated for Single Network Slice Selection Assistance Information (S-NSSAI);

receiving, from a User equipment (UE), a registration request message, wherein the registration request message includes requested Network Slice Selection Assistance Information (NSSAI), and wherein the requested NSSAI includes Single Network Slice Selection Assistance Information (S-NSSAI);

sending, to the UE, allowed NSSAI, wherein the allowed NSSAI includes the S-NSSAI;

sending, to the NSACF, a request message;

processing a first Non-Access Stratum (NAS) message related to the S-NSSAI while the AMF waits, from the NSACF, for a response being related to the S-NSSAI; and sending, to the UE, a de-registration request message after the AMF waits, from the NSACF, for the response, wherein the de-registration request message includes rejected NSSAI, and wherein the rejected NSSAI includes the S-NSSAI.

2. The method of the AMF according to the claim 1, wherein the allowed NSSAI is included in a registration accept message, and wherein the request message is sent after the registration accept message is sent.

3. The method of the AMF according to the claim 1, wherein the response is responsive to the request message.

4. A method of a User equipment (UE) comprising:

sending, to an Access and Mobility Management Function (AMF), a registration request message after the AMF receives, from a Network Slice Admission Control Function (NSACF), a message including information indicating that an Early Admission Control (EAC) mode is deactivated for Single Network Slice Selection Assistance Information (S-NSSAI), wherein the registration request message includes requested Network Slice Selection Assistance Information (NSSAI), and wherein the requested NSSAI includes Single Network Slice Selection Assistance Information (S-NSSAI);

receiving, from the AMF, allowed NSSAI, wherein the allowed NSSAI includes the S-NSSAI, and wherein the AMF sends, to the NSACF, a request message after the UE receives, from the AMF, the allowed NSSAI; and receiving, from the AMF, a de-registration request message after a response, from the NSACF is waited, the response being related to the S-NSSAI, wherein the de-registration request message includes rejected NSSAI, and wherein the rejected NSSAI includes the S-NSSAI.

5. The method of the UE according to the claim 4, wherein the allowed NSSAI is included in a registration accept message, and wherein the request message is sent after the registration accept message is sent.

6. The method of the UE according to the claim 4, wherein the response is responsive to the request message.

7. An Access and Mobility Management Function (AMF) comprising one or more memories storing instructions and one or more processors configured to execute the instructions to:

receive, from a Network Slice Admission Control Function (NSACF), a message including information indicating that an Early Admission Control (EAC) mode is deactivated for Single Network Slice Selection Assistance Information (S-NSSAI);

receive, from a User equipment (UE), a registration request message, wherein the registration request message includes requested Network Slice Selection Assistance Information (NSSAI), and wherein the requested NSSAI includes Single Network Slice Selection Assistance Information (S-NSSAI);

send, to the UE, allowed NSSAI wherein the allowed NSSAI includes the S-NSSAI;

send, to the NSACF, a request message;

process a first Non-Access Stratum (NAS) message related to the S-NSSAI while the AMF waits, from the NSACF, for a response being related to the S-NSSAI; and send, to the UE, a de-registration request message after the AMF waits, from the NSACF, for the response, wherein the de-registration request message includes rejected NSSAI, and wherein the rejected NSSAI includes the S-NSSAI.

8. A User equipment (UE) comprising one or more memories storing instructions and one or more processors configured to execute the instructions to:

send, to an Access and Mobility Management Function (AMF), a registration request message after the AMF receives, from a Network Slice Admission Control Function (NSACF), a message including information indicating that an Early Admission Control (EAC) mode is deactivated for Single Network Slice Selection Assistance Information (S-NSSAI), wherein the registration request message includes requested Network Slice Selection Assistance Information (NSSAI), and wherein the requested NSSAI includes Single Network Slice Selection Assistance Information (S-NSSAI);

receive, from the AMF, allowed NSSAI, wherein the allowed NSSAI includes the S-NSSAI, and wherein the AMF sends, to the NSACF, a request message after the UE receives, from the AMF, the allowed NSSAI; and receive, from the AMF, a de-registration request message after a response, from the NSACF is waited, the response being related to the S-NSSAI, wherein the de-registration request message includes rejected NSSAI, and wherein the rejected NSSAI includes the S-NSSAI.

* * * * *